(12) United States Patent
Fukasawa

(10) Patent No.: US 11,176,522 B2
(45) Date of Patent: Nov. 16, 2021

(54) CONFERENCE INFORMATION MANAGEMENT SYSTEM, INFORMATION PROCESSING APPARATUS, AND CONTROL METHOD

(71) Applicant: Naoki Fukasawa, Kanagawa (JP)

(72) Inventor: Naoki Fukasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/805,985

(22) Filed: Mar. 2, 2020

(65) Prior Publication Data

US 2020/0295959 A1  Sep. 17, 2020

(30) Foreign Application Priority Data

Mar. 14, 2019  (JP) .............................. JP2019-047689

(51) Int. Cl.
*G06Q 10/10* (2012.01)
*H04L 12/18* (2006.01)
*H04L 29/08* (2006.01)

(52) U.S. Cl.
CPC ......... *G06Q 10/1093* (2013.01); *G06Q 10/10* (2013.01); *G06Q 10/109* (2013.01); *G06Q 10/1095* (2013.01); *H04L 12/1818* (2013.01); *H04L 12/1822* (2013.01); *H04L 67/24* (2013.01); *H04L 67/306* (2013.01); *H04L 12/1831* (2013.01)

(58) Field of Classification Search
CPC ...... G06Q 10/00; G06Q 10/02; G06Q 10/025; G06Q 10/06; G06Q 10/10; G06Q 10/103; G06Q 10/109; G06Q 10/1093; G06Q 10/1095; H04L 67/00; H04L 67/22; H04L 67/24; H04L 67/30; H04L 67/306; H04L 12/00; H04L 12/1818; H04L 12/1822
See application file for complete search history.

(56) References Cited

U.S. PATENT DOCUMENTS 3,675,204 A  *  7/1972  Miehle ................... G06Q 10/02
340/525
7,447,608 B1 * 11/2008  Poston ................ H04L 12/1822
702/177
7,826,101 B2 * 11/2010  Yano ....................... G06F 16/93
358/403

(Continued)

FOREIGN PATENT DOCUMENTS

JP  2014-232342  12/2014
JP  2015-177464  10/2015

(Continued)

OTHER PUBLICATIONS

Extended European Search Report for 20159920.6 dated Aug. 14, 2020.

*Primary Examiner* — Boris D Grijalva Lobos
(74) *Attorney, Agent, or Firm* — IPUSA, PLLC

(57) ABSTRACT

A conference information management system including an information processing apparatus includes circuitry configured to acquire schedule information of conference stored in a server, from the server; create conference information of a specific conference, held or to be held using an electronic information board function of the information processing apparatus, based on the acquired schedule information; and store the created conference information in a storage destination.

17 Claims, 42 Drawing Sheets

(56) References Cited

U.S. PATENT DOCUMENTS

| | | | | |
|---|---|---|---|---|
| 8,681,808 B1* | 3/2014 | Tessier | | G06Q 10/1093 370/431 |
| 8,823,768 B2* | 9/2014 | Emori | | H04N 7/15 348/14.09 |
| 9,398,255 B2* | 7/2016 | Mihara | | H04N 7/147 |
| 10,109,180 B1* | 10/2018 | Hamilton | | G08B 3/1016 |
| 10,692,020 B2* | 6/2020 | Marianko | | H04N 7/147 |
| 10,841,660 B2* | 11/2020 | Siddique | | H04L 12/1822 |
| 2003/0217073 A1* | 11/2003 | Walther | | G06Q 10/109 |
| 2004/0073615 A1* | 4/2004 | Darling | | G06Q 10/109 709/206 |
| 2005/0275716 A1* | 12/2005 | Shingu | | G06F 16/743 348/14.13 |
| 2006/0045029 A1* | 3/2006 | Ethier | | H04L 12/1818 370/260 |
| 2006/0143064 A1* | 6/2006 | Mock | | G06Q 10/06 705/7.18 |
| 2007/0143402 A1* | 6/2007 | Kumagai | | B43L 1/04 709/204 |
| 2007/0162315 A1* | 7/2007 | Hodges | | G06Q 10/0631 705/7.12 |
| 2007/0237096 A1* | 10/2007 | Vengroff | | H04W 4/08 370/254 |
| 2007/0263825 A1* | 11/2007 | Shah | | H04L 12/1818 379/202.01 |
| 2008/0195454 A1* | 8/2008 | Lee | | G06Q 10/10 705/7.18 |
| 2009/0043847 A1 | 2/2009 | Laurila | | |
| 2010/0017371 A1* | 1/2010 | Whalin | | G06Q 10/06 707/E17.014 |
| 2010/0049579 A1* | 2/2010 | Suzuki | | G06Q 10/109 705/7.19 |
| 2011/0283345 A1* | 11/2011 | Kamei | | G06F 21/34 726/5 |
| 2012/0005613 A1 | 1/2012 | O'Sullivan et al. | | |
| 2012/0182384 A1* | 7/2012 | Anderson | | H04N 7/147 348/14.09 |
| 2012/0185291 A1* | 7/2012 | Ramaswamy | | G06Q 10/1095 705/7.19 |
| 2013/0263216 A1* | 10/2013 | Vakil | | G06F 21/31 726/3 |
| 2014/0244720 A1* | 8/2014 | Knodt | | H04W 4/40 709/203 |
| 2015/0149929 A1 | 5/2015 | Shepherd et al. | | |
| 2015/0261271 A1 | 9/2015 | Nagamori | | |
| 2016/0189110 A1* | 6/2016 | Bombolowsky | | G06Q 10/1095 705/7.19 |
| 2018/0219816 A1* | 8/2018 | Kegel | | G06Q 10/107 |
| 2018/0234579 A1* | 8/2018 | Watanabe | | B43L 1/04 |
| 2019/0057357 A1* | 2/2019 | Guan | | G06Q 10/06314 |
| 2019/0130366 A1* | 5/2019 | Pell | | G06K 7/10297 |
| 2019/0235735 A1 | 8/2019 | Toyota et al. | | |
| 2019/0272509 A1* | 9/2019 | Livnat | | H04W 4/33 |
| 2019/0303827 A1* | 10/2019 | Hashimoto | | G06Q 10/06314 |
| 2020/0210129 A1* | 7/2020 | Gordon | | H04L 63/0861 |

FOREIGN PATENT DOCUMENTS

| | | |
|---|---|---|
| JP | 2018-101368 | 6/2018 |
| JP | 2019-134399 | 8/2019 |
| WO | 2013/034186 | 3/2013 |

* cited by examiner

FIG. 5

| USER ID | NAME | MAIL ADDRESS |
|---|---|---|
| office1 | Mary | office1@office.example.com |
| office2 | Sato | office2@office.example.com |
| office3 | Motoko | office3@office.example.com |
| office4 | Chris | office4@office.example.com |
| ⋮ | ⋮ | ⋮ |

FIG. 6

| SCHEDULE ID | SCHEDULE NAME | LOCATION | ORGANIZER USER | START TIME AND TIME PERIOD | EXPECTED ATTENDEE | ATTACHMENT FILE |
|---|---|---|---|---|---|---|
| sch-1 | CONFERENCE A | CONFERENCE ROOM 1 | office2 | 2018/4/1 10:30~11:30 | office1 office2 office3 | REFERENCE MATERIAL.doc |
| sch-2 | CONFERENCE B | CONFERENCE ROOM 2 | office3 | 2018/4/1 10:45 > 11:15 | office3 office4 | |
| sch-3 | CONFERENCE C | CONFERENCE ROOM 1 | office4 | 2018/4/1 11:00~12:00 | office1 office4 | |
| ... | ... | ... | ... | ... | ... | ... |

FIG. 7

| USER ID | NAME | MAIL ADDRESS | EXTERNAL SERVICE SETTING ID | IDENTIFICATION INFORMATION |
|---|---|---|---|---|
| user001 | Mary Smith | mary@intra.example.com | connect1 | ICCARD-123 |
| user002 | Sato Suzuki | sato@intra.example.com | connect2 | ICCARD-248 |
| user003 | Alice Liddell | alice@intra.example.com | connect3 | ICCARD-390 |
| user004 | Chris | chris@intra.example.com | connect4 | ICCARD-444 |
| ... | ... | ... | ... | ... |

FIG. 8

| EXTERNAL SERVICE SETTING ID | USER ID | ADDRESS INFORMATION | EXTERNAL SERVICE USER ID | AUTHENTICATION TOKEN OF EXTERNAL SERVICE |
|---|---|---|---|---|
| connect1 | user001 | office.example.com | office1 | eyJhbGc11··· |
| connect2 | user002 | office.example.com | office2 | eyJhbGc12··· |
| connect3 | user002 | office.example.com | office3 | eyJhbGc13··· |
| connect4 | user004 | office.example.com | office4 | eyJhbGc14··· |
| ⋮ | ⋮ | ⋮ | ⋮ | ⋮ |

| USER ID | ORGANIZER |
|---|---|
| user001 | YES |
| user002 | NO |
| user003 | NO |

FIG. 10

| SCHEDULE ID OF EXTERNAL SERVICE | CONFERENCE NAME | LOCATION | START DATE AND TIME |
|---|---|---|---|
| sch-1 | CONFERENCE A | CONFERENCE ROOM 1 | 2018/4/1 10:31:00 |

1000

FIG. 25
(a)
| USER ID | ORGANIZER |
|---|---|
| user001 | YES |
| user002 | NO |
| user003 | NO |
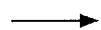
| USER ID | ORGANIZER |
|---|---|
| user001 | YES |
| user002 | NO |
| user003 | NO |
| user004 | NO |
(b)
| USER ID | ORGANIZER |
|---|---|
| user001 | YES |
| user002 | NO |
| user003 | NO |
| user004 | NO |
| USER ID | ORGANIZER |
|---|---|
| user001 | YES |
| user002 | NO |
| user004 | NO |

(a)

| SCHEDULE ID OF EXTERNAL SERVICE | CONFERENCE NAME | LOCATION | START DATE AND TIME |
|---|---|---|---|
| | | | 2018-04-01 10:31:00 |

(b)

| SCHEDULE ID OF EXTERNAL SERVICE | CONFERENCE NAME | LOCATION | START DATE AND TIME |
|---|---|---|---|
| | CONFERENCE A | CONFERENCE ROOM 1 | 2018-04-01 10:31:00 |

FIG. 37

| USER ID | NAME | MAIL ADDRESS | EXTERNAL SERVICE SETTING ID | IDENTIFICATION INFORMATION | HASH VALUE |
|---|---|---|---|---|---|
| user001 | Mary Smith | mary@intra.example.com | connect1 | ICCARD-123 | XXXXXXX |
| user002 | Sato Suzuki | sato@intra.example.com | connect2 | ICCARD-248 | YYYYYYY |
| user003 | Alice Liddell | alice@intra.example.com | connect3 | ICCARD-390 | ZZZZZZZ |
| user004 | Chris | chris@intra.example.com | connect4 | ICCARD-444 | WWWWWWW |
| ... | ... | ... | ... | ... | ... |

CONFERENCE INFORMATION MANAGEMENT SYSTEM, INFORMATION PROCESSING APPARATUS, AND CONTROL METHOD

CROSS-REFERENCE TO RELATED APPLICATION

This application claims priority pursuant to 35 U.S.C. § 119(a) to Japanese Patent Application No. 2019-047689, filed on Mar. 14, 2019 in the Japan Patent Office, the disclosure of which is incorporated by reference herein in

BACKGROUND

Technical Field

This disclosure relates to a conference information management system, an information processing apparatus, and a control method.

Background Art

Convectional technologies store a document in association with schedule information. This allows an information terminal that obtains the schedule information to easily access the document.

However, convectional technologies have an issue that the schedule information stored such as in the server may not match information on actually-held conference.

SUMMARY

As one aspect of the prevent invention, a conference information management system including an information processing apparatus is devised. The conference information management system includes circuitry configured to acquire schedule information of conference stored in a server, from the server; create conference information of a specific conference, held or to be held using an electronic information board function of the information processing apparatus, based on the acquired schedule information; and store the created conference information in a storage destination.

As another aspect of the prevent invention, an information processing apparatus is devised. The information processing apparatus includes circuitry configured to acquire schedule information of conference stored in a server, from the server; create conference information of a specific conference, held or to be held using an electronic information board function of the information processing apparatus, based on the acquired schedule information; and store the created conference information in a storage destination.

As another aspect of the prevent invention, a method of controlling a conference information using an information processing apparatus is devised. The method includes acquiring schedule information of conference stored in a server, from the server; creating conference information of a specific conference held or to be held using an electronic information board function of the information processing apparatus, based on the acquired schedule information; and storing the created conference information in a storage destination.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 5 illustrates an example of service account information stored in an external service group system according to an embodiment;

FIG. 6 illustrates an example of schedule information stored in an external service group system according to an embodiment;

FIG. 7 is an example of a user information list stored in a user information server according to an embodiment;

FIG. 8 is an example of an external service configuration information list stored in a user information server according to an embodiment;

FIG. 9 illustrates an example of a participant management information that is managed using an electronic information board apparatus according to an embodiment;

FIG. 10 illustrates an example of a conference management information managed using an electronic information board apparatus according to an embodiment;

FIG. 25 (FIGS. 25(a) and 25(b)) illustrates an example of participant change processing using an electronic information board apparatus according to an embodiment;

FIG. 37 is another example of a user information list stored in a user information server according to one embodiment;

The accompanying drawings are intended to depict embodiments of the present disclosure and should not be interpreted to limit the scope thereof. The accompanying drawings are not to be considered as drawn to scale unless explicitly noted.

DETAILED DESCRIPTION

A description is now given of exemplary embodiments of the present disclosures. It should be noted that although such terms as first, second, etc., may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present disclosures.

In addition, it should be noted that the terminology used herein is for the purpose of describing particular embodiments only and is not intended to be limiting of the present disclosures. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, an embodiment of the present invention will be described with reference to the drawings.

(System Configuration)

Figure 1:
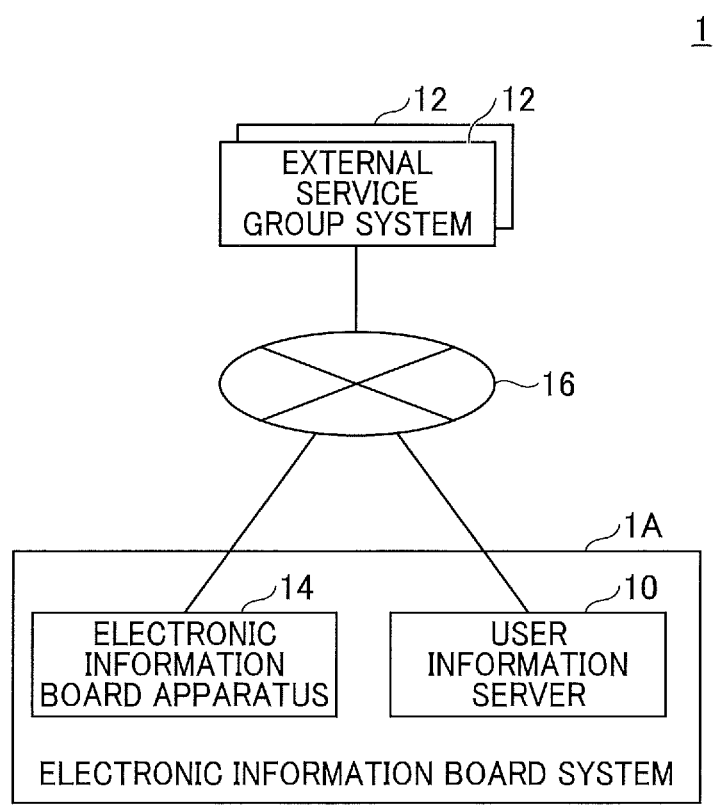
FIG. 1 is an example configuration of a conference information management system according to an embodiment.

FIG. 1 is an example of a conference information management system 1 or conference information controlling system 1 (collectively referred to as the conference information management system 1) according to an embodiment of this disclosure. As illustrated in FIG. 1, the conference information management system 1 includes, for example, a user information server 10, a plurality of external service group systems 12, and an electronic information board apparatus 14. These apparatuses or devices are connected to a network 16, such as the Internet and local area network (LAN), and can communicate with each other via the network 16. The user information server 10 and the electronic information board apparatus 14 collectively configure an electronic information board system 1A.

The external service group provided by the external service group system 12 is also referred to as a groupware, and each service belonging to the same external service group is usable by the same authentication information, such as a combination of identification (ID) and password, access token, or the like.

For example, the external service group is an integrated service, such as Office 365 (registered trademark) consisting of a user service, a storage service, a schedule service, a shared site service, and the like. The external service group is provided in such a manner that services such as user service, storage service, schedule service, and shared site service are available for the same user account.

For example, different companies may provide a plurality of external service groups. Therefore, for example, it can be assumed that one user uses the external service group of Company A and the external service group of Company B. Further, instead of the different companies, the same company may provide a plurality of external service groups. The external service group system 12 includes one or more computers.

The user information server 10 stores a user information list and an external service setting information list. The electronic information board apparatus 14 can use the user information server 10. The user information server 10 may be shared by a plurality of electronic information board apparatuses 14, and the user information server 10 may not be on the same network segment. Further, the electronic information board apparatus 14 may include the user information server 10. The user information server 10 is implemented by one or more computers.

The electronic information board apparatus 14 displays, for example, images drawn by an electronic pen and hand. Further, the electronic information board apparatus 14 can display images of electronic files read out from a universal serial bus (USB) memory, a personal computer (PC) connected via a cable, or the external service group system 12. The details of function of the electronic information board apparatus 14 will be described later with reference to FIG. 11.

The electronic information board apparatus 14 is an example of an "information processing apparatus." The "information processing apparatus" is not limited to the electronic information board apparatus. The information processing apparatus can be any information processing apparatus having a remote sharing function. The "information processing apparatus" includes, for example, video conference terminal, projector (PJ), interactive white board (IWB) that can communicate with other device, an output device such as digital signage, head-up display (HUD) device, industrial machine, image pickup device, audio collection device, medical device, network appliance, note personal computer (PC), cellular phone, smart phone, tablet terminal, game device, personal digital assistant, digital camera, wearable PC, and desktop PC.

The configuration of the conference information management system 1 illustrated in FIG. 1 is one example. For example, a part of the functions of the electronic information board apparatus 14 may be in the user information server 10, the external service group system 12, or other server. Further, for example, a part of the functions of the user information server 10 can be included in the electronic information board apparatus 14, the external service group system 12, or other server. Further, in this disclosure, the terms related to "manage," such as management, may be interchangeable with the terms related to "control," such as controlling.

(Hardware Configuration of User Information Server)

Figure 2:
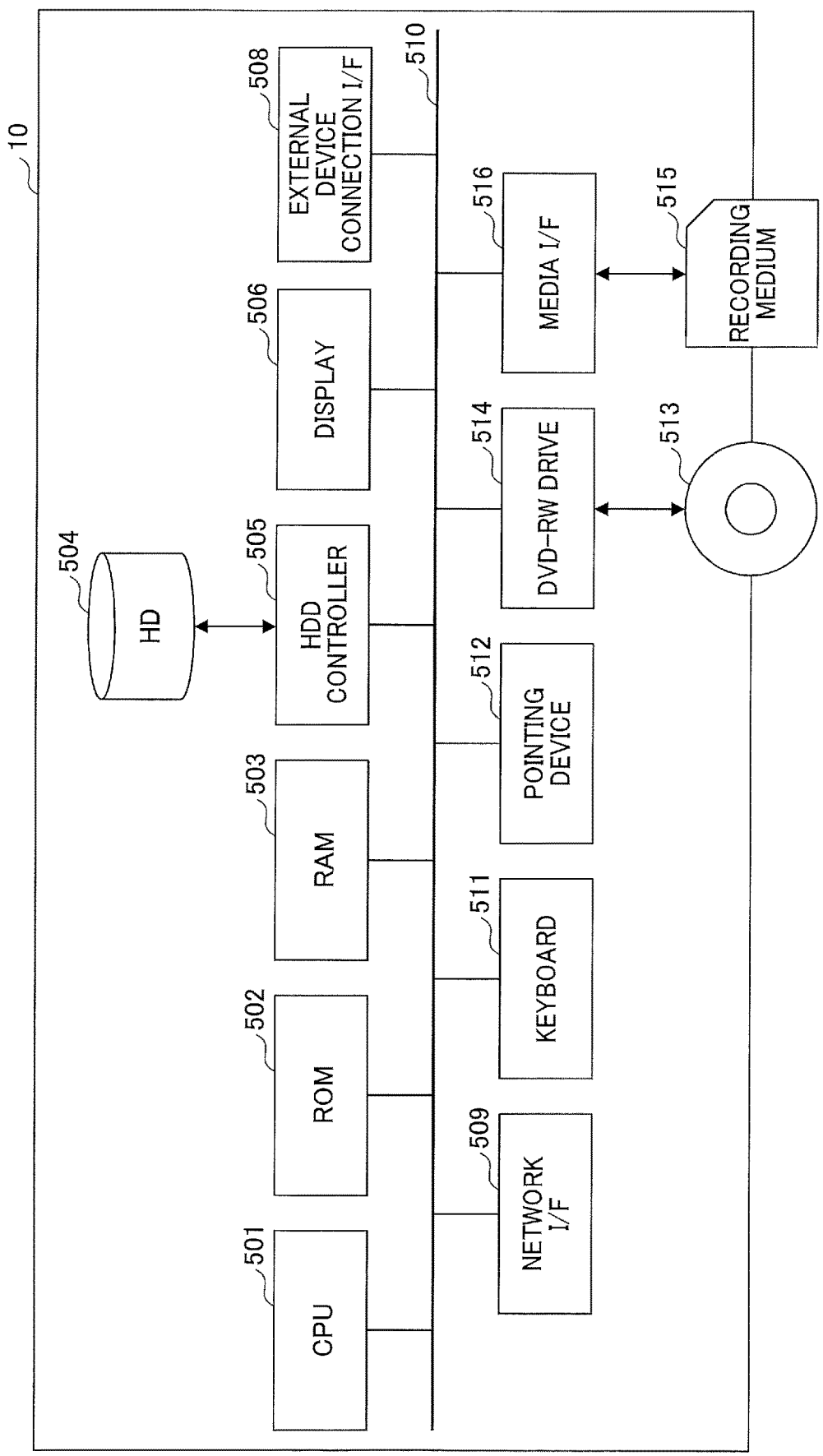
FIG. 2 is an example of a hardware block diagram of a user information server according to an embodiment.

FIG. 2 is an example of a hardware block diagram of the user information server 10 according to an embodiment. As illustrated in FIG. 2, the user information server 10 is configured by one or more computers. As illustrated in FIG. 2, the user information server 10 includes, for example, a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a media I/F 516.

The CPU 501 controls the operation of the user information server 10. The ROM 502 stores programs used for driving the CPU 501, such as initial program loader (IPL). The RAM 503 is used as a work area of the CPU 501. The HD 504 stores various kinds of data, such as programs. The HDD controller 505 controls reading and writing of various data with the HD 504 under the control of the CPU 501. The display 506 displays various information such as cursors, menus, windows, characters, or images. The external device connection I/F 508 is an interface for connecting various external devices. In this case, the external device is a universal serial bus (USB) memory, a printer, or the like. The network I/F 509 is an interface for performing data communication by utilizing the network 16. The data bus 510 is an address bus and a data bus for electrically connecting each of the components, such as the CPU 501, illustrated in FIG. 2.

The keyboard 511 is a type of input means having a plurality of keys for inputting characters, numerals, various instructions, and the like. The pointing device 512 is a type of input means for selecting and executing various instructions, selecting process target object, moving a cursor, or the like. The DVD-RW drive 514 controls reading and writing of various data with the DVD-RW 513 used as an example of removable recording media. The user information server 10 may include DVD-R in addition to or instead of DVD-RW. The media I/F 516 controls reading and writing (storing) of data with a recording medium 515, such as flash memory.

(Hardware Configuration of Electronic Information Board Apparatus)

Figure 3:
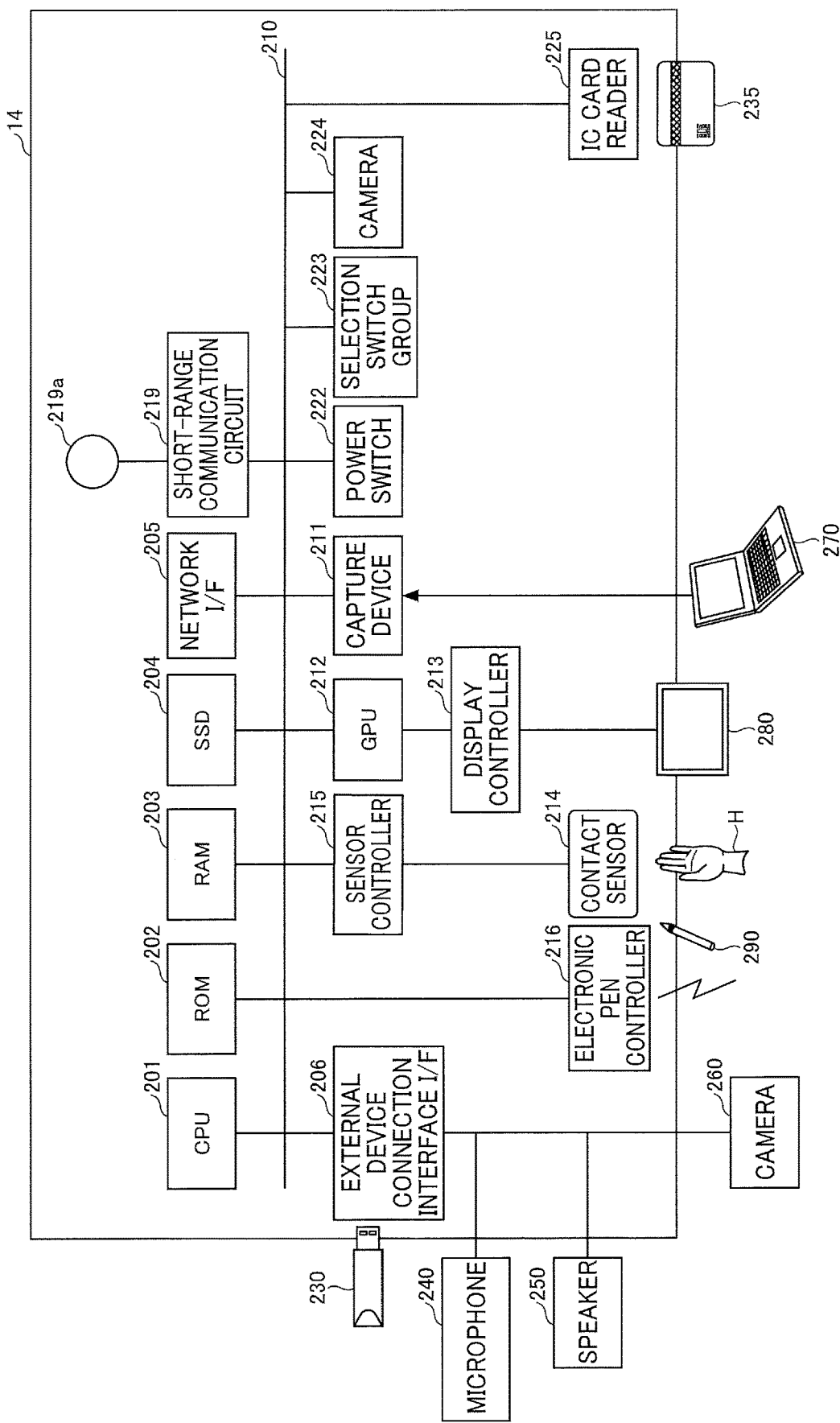
FIG. 3 is an example of a hardware block diagram of an electronic information board apparatus according to an embodiment.

FIG. 3 is an example of a hardware block diagram of the electronic information board apparatus 14 according to an embodiment. As illustrated in FIG. 3, the electronic information board apparatus 14 includes, for example, a central processing unit (CPU) 201, a read only memory (ROM) 202, a random access memory (RAM) 203, a solid state drive (SSD) 204, a network interface (I/F) 205 and an external device connection interface (I/F) 206.

The CPU 201 controls the operation of the electronic information board apparatus 14 entirely. The ROM 202 stores programs used for driving the CPU 201, such as initial program loader (IPL). The RAM 203 is used as a work area of the CPU 201. The SSD 204 stores various kinds of data such as programs for electronic information board apparatus. The network I/F 205 controls communication with the network 16. The external device connection I/F 206 is an interface for connecting various external devices. In this case, the external device is, for example, a universal serial bus (USB) memory 230, an externally-set device, such as a microphone 240, a speaker 250, a camera 260.

The electronic information board apparatus 14 further includes, for example, a capture device 211, a graphics processing unit (GPU) 212, a display controller 213, a contact sensor 214, a sensor controller 215, an electronic pen controller 216, a short-range communication circuit 219, an antenna 219a of the short-range communication circuit 219, and a power switch 222, and a selection switch group 223.

The capture device 211 displays image information on a display of an external personal computer (PC) 270 as still image or movie image. The GPU 212 is a semiconductor chip that processes graphics data in detail. The display controller 213 manages or controls a screen display for outputting output images from the GPU 212 to a display 280.

The contact sensor 214 detects that an electronic pen 290 or a user hand H has contacted with the display 280. The sensor controller 215 controls the processing of the contact sensor 214. The contact sensor 214 performs an input of coordinates and detection of coordinates using the infrared ray blocking method.

As to the method of inputting coordinates and detecting coordinates, two light emission-reception devices disposed at the upper end corners of the display 280 radiate infrared rays parallel to the display 280, and the infrared rays are reflected by reflective members disposed around the display 280, and then the two light emission-reception receive the light beams coming from the optical path, which is the optical path of the light emitted by the two light emission-reception device. The contact sensor 214 outputs ID of the infrared ray emitted by the two light emission-reception devices and blocked by an object to the sensor controller 215. The sensor controller 215 specifies or identifies the coordinate position where an object contacts on the display 280. By communicating with the electronic pen 290, the electronic pen controller 216 determines whether or not a pen tip or pen end touches the display 280.

The short-range communication circuit 219 is a communication circuit, such as near field communication (NFC) and Bluetooth (registered trademark). The power switch 222 is a switch for switching ON-OFF of power supply to the electronic information board apparatus 14. The selection switch group 223 is, for example, a group of switches used for adjusting the display brightness and colors of the display 280.

Further, the electronic information board apparatus 14 includes a bus line 210. The bus line 210 is an address bus and a data bus for electrically connecting each of the components, such as the CPU 201, illustrated in FIG. 3.

The contact sensor 214 can use not only the infrared blocking system, but also various detection means, such as a touch panel of electrostatic capacitance type that specifies a contact position by detecting a change in capacitance, a touch panel of resistance film type that specifies a contact position based on a voltage change of two resistive films, and a touch panel of electromagnetic induction type that detects a contact position by detecting the electromagnetic induction caused by a contact of an object on the touch panel. In addition, the electronic pen controller 216 can determine whether a user grip portion of the electronic pen 290 or other portion of the electronic pen 290 touches the display 280 in addition to the pen tip and pent end of the electronic pen 290.

The electronic information board apparatus 14 further includes, for example, an integrated circuit (IC) card reader 225. The IC card reader 225 reads identification information unique to the IC card 235 from a radio frequency (RF) tag embedded in the IC card 235 via the wireless communication. The IC card reader 225 may be embedded in the electronic information board apparatus 14 or attached to the electronic information board apparatus 14 as an external device. Further, the IC card 235 can be built in a smart device such as smart phone. Further, the electronic information board apparatus 14 can use a biometric authentication device (fingerprint, palm crest, iris, etc.), a bar code reader, or the like instead of the IC card reader 225 as long as the identification information that can identify the user can be acquired.

(Functional Configuration of Conference Information Management System)

Figure 4:
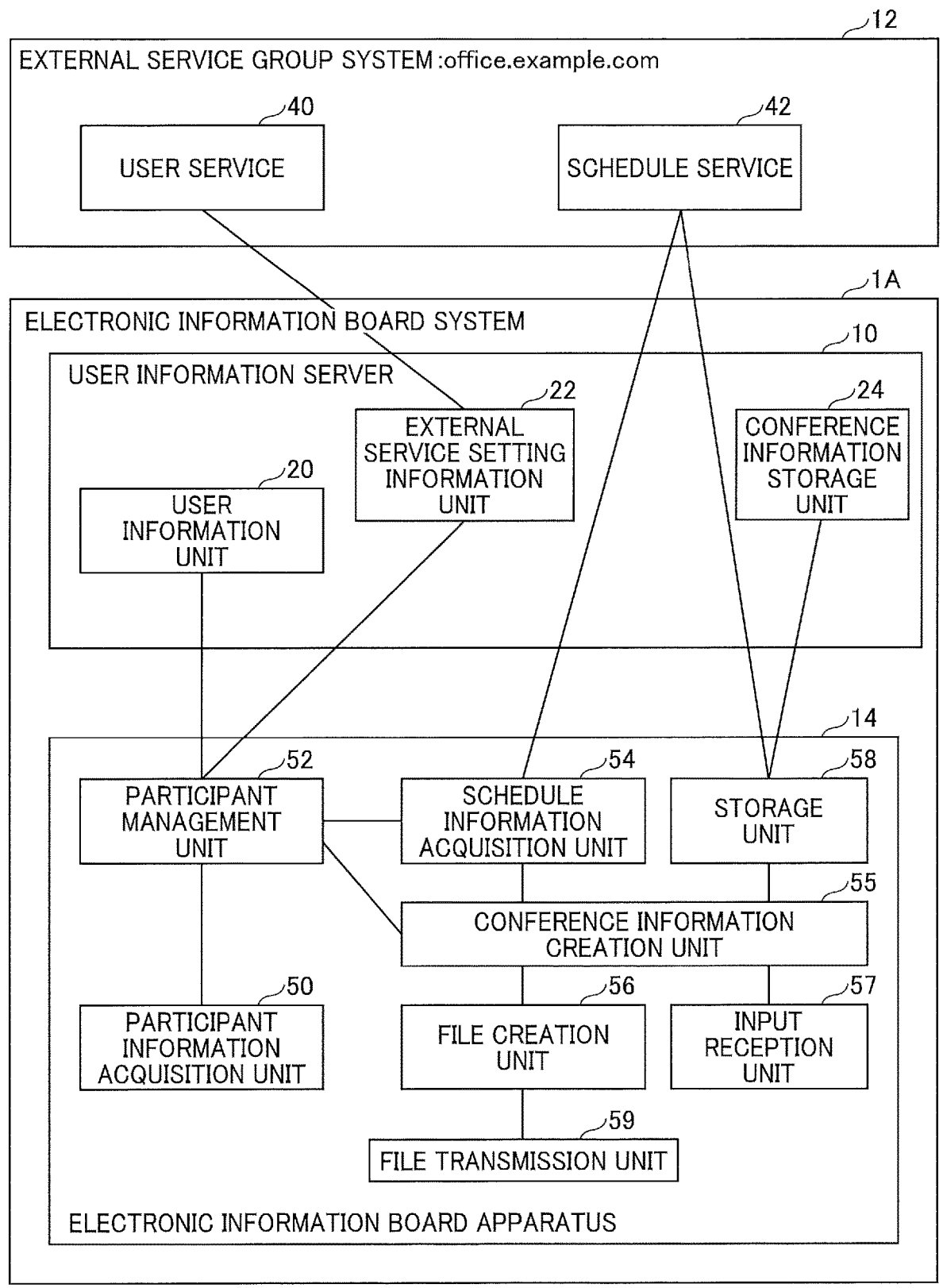
FIG. 4 is an example of a functional block diagram of a conference information management system according to an embodiment.

FIG. 4 is a an example of a functional block diagram of the conference information management system 1 (conference information controlling system 19 according to an embodiment.

As illustrated in FIG. 4, the external service group system 12 includes, for example, a user service 40 and a schedule service 42. The user service 40 stores service account information illustrated in FIG. 5. The schedule service 42 stores schedule information illustrated in FIG. 6. In addition, the external service group system 12 may have a function of storing, recording and sharing information including cloud storage, social network service (SNS) and chat service. The external service group system 12 may have a function of sharing information and enhancing communication as a groupware.

The user information server 10 includes, for example, a user information unit 20, an external service setting information unit 22, and a conference information storage unit 24.

The user information unit 20 stores a user information list illustrated in FIG. 7. The external service setting information unit 22 stores an external service setting information list illustrated in FIG. 8.

The conference information storage unit 24 receives conference information generated by the electronic information board apparatus 14 from the electronic information board apparatus 14 and stores the conference information. The conference information storage unit 24 can be implemented using a storage in a cloud storage of the external service group.

As illustrated in FIG. 4, the electronic information board apparatus 14 includes, for example, a participant information acquisition unit 50, a participant management unit 52, a schedule information acquisition unit 54, a conference information creation unit 55, a file creation unit 56, an input reception unit 57, a storage unit 58, and a file transmission unit 59.

The participant information acquisition unit 50 is a device or means for acquiring participant information of conference, which is implemented in the electronic information board apparatus 14, or a conference information management system. The participant information acquisition unit 50 may be also referred to as the participant information acquisition device in this description. The participant information acquisition unit 50 is, for example, an authentication device or means provided in the electronic information board apparatus 14. For example, the participant information acquisition unit 50 is implemented by the IC card reader 225 illustrated in FIG. 3. The IC card reader 225 reads identification information of a log-in user from the IC card 235 of a user (hereinafter referred to as "log-in user").

Further, the authentication means provided in the electronic information board apparatus 14 can be means for receiving an input of a user ID and a password using a display or a user interface of the electronic information board apparatus 14, or may be an authentication device mounted or connected to the electronic information board apparatus 14 such as a facial recognition device and biometric authentication device using a camera.

Further, instead of obtaining and authenticating the participant information using the electronic information board apparatus 14, the participant information acquisition unit 50 can obtain and authenticate participant information by acquiring the participant information from an authentication device connected to the electronic information board apparatus system or conference information management system via a network, and authenticating the participant information using an authentication function of an external server such as the user information server 10 or an external service.

The participant management unit 52 transmits the acquired participant information to the user information server 10 by transmitting the acquired participant information, such as identification information of a log-in user read by the participant information acquisition unit 50, to the user information server 10, and then acquires external service setting information unit of the log-in user from the external service setting information unit 22.

Further, the participant management unit 52 manages or controls participants of a conference currently being performed using the electronic information board apparatus 14. Specifically, the participant management unit 52 manages or controls the participants and the organizer of the conference currently held as information indicating participants and organizer of the conference as participant management information 900 as illustrated in FIG. 9.

That is, when the participant information (authentication information) of at least one participant is acquired by the electronic information board apparatus 14, the participant management unit 52 stores the acquired participant information and the set organizer information in a memory as an information list of participants and organizer of the conference currently being held by the participants and organizer to manage and store as participant management information.

As to the participant management information 900, the user ID of participant of the conference currently being performed using the electronic information board apparatus 14 is associated with information indicating whether or not the particular participant is the organizer of the conference.

The schedule information acquisition unit 54 acquires the schedule information of the conference from the schedule service 42 of the external service group system 12 based on the identification information of the log-in user read by the participant information acquisition unit 50.

The conference information creation unit 55 can generate conference information for the conference performed by using the electronic information board function of the electronic information board apparatus 14 based on the schedule information acquired by the schedule information acquisition unit 54, the participant information acquired by the participant information acquisition unit 50, and other information acquired during the conference.

Further, the conference information creation unit 55 can further change and update the creation-in-progress conference information based on information input by the participant and information acquired by the electronic information board apparatus 14 during the conference that uses the electronic information board function of the electronic information board apparatus 14.

The storage unit 58 can store the conference information created and changed during the conference using the electronic information board function of the electronic information board apparatus 14 in the electronic information board apparatus 14 and other devices. For example, during the conference and at the end of the conference, the created conference information can be stored in the schedule service 42 of the external service group system 12, with which the original schedule information can be updated and stored, or newly added and stored. Alternatively, while remaining the original schedule information, the storage unit 58 can register the schedule based on the changed conference information.

Further, in addition to the schedule information of participant, the storage unit 58 can obtain, newly add, and update schedule information used for managing in-house resource, such as each conference room and the electronic information board apparatus 14 as the target schedule information for obtaining, storing, and updating.

Further, the storage unit 58 can store the created conference information in the conference information storage unit 24 of the user information server 10, and can store the created conference information in association with the user information and user account of the user information server 10.

Further, the storage unit 58 can store the created conference information in a storage destination indicating an external server, such as personal storage of an external service specified by the electronic information board apparatus 14.

Further, the storage unit 58 can store the created conference information in a plurality of storage destinations indicating the electronic information board apparatus 14 and a plurality of external servers by simultaneously specifying the plurality of storage destinations.

As an example of specific processing, based on the external service setting information of a log-in user acquired by the participant management unit 52, the schedule information acquisition unit 54 acquires the schedule information including the log-in user as an expected attendee from the schedule service 42 stored in the external service group system 12. When the acquired schedule information is selected by a user and an attachment file is set for the schedule information, the schedule information acquisition unit 54 can acquire the attachment file from the external service group system 12.

Further, the conference information creation unit 55 manages or controls conference management information (see FIG. 10) as an example of "conference information" about the conference currently being held using the electronic information board apparatus 14. The conference management information includes, for example, scheduled ID of external service, conference name, location, conference start time or the like. The conference information creation unit 55 creates and updates the conference management information for each conference based on the acquired schedule information and information acquired from participant, and stores the conference management information in a storage region of the electronic information board apparatus 14 to manage the conference management information.

Further, the storage unit 58 saves or stores, in the electronic information board apparatus 14, the created conference management information (e.g., schedule ID of external service, conference name, location, start time, end time) and the participant management information (e.g., participant information, organizer information) as the conference information of the in-progress conference or the ended conference, or transmits and saves or stores the conference information of the in-progress conference or the ended conference in an external device.

Based on the conference management information and the participant management information, the storage unit 58 can register the schedule information to the schedule service 42 of the external service group system 12, change or update the acquired original schedule to the schedule service 42 of the external service group system 12, and transmit and store the schedule information to a storage destination specified by other server.

The file creation unit 56 converts contents of information and conference materials written to the electronic information board apparatus 14 using an input reception unit 57, to be described later, into a file format, such as portable document format (PDF) and joint photographic experts group (JPEG), and stores the contents of information in the storage region in the electronic information board apparatus 14. Further, the file creation unit 56 can store files of conference materials associated with or linked to the schedule information, files acquired from a storage of an external service, and files edited by using the input reception unit 57 after the acquisition in the storage region in the electronic information board apparatus 14. The files can be stored in other external server in addition to the storage region in the electronic information board apparatus 14.

The input reception unit 57 receives a user input operation to the electronic information board apparatus 14. The user input operation includes, for example, writing on the display of electronic information board apparatus 14 by handwriting or using the electronic pen, an input operation and selection operation to an input operation target such as an operation panel or window displayed on the display, and creation and editing operation of conference materials such as displayed files.

The file transmission unit 59 can transmit files created, acquired, or edited and stored by the file creation unit 56 to the mail address of user, or transmit the files to a storage of an external server. The file transmission unit 59 is different from the storage unit 58. The storage unit 58 can store and transmit the files in association with the conference information (e.g., bibliographic information such as conference management information and participant management information). The file transmission unit 59 differs from the storage unit 58 because the file transmission unit 59 can transmit the files independently of the conference information. The file transmission unit 59 can transmit the conference information that is filed by the file transmission unit 59. The use method of the file transmission unit 59 is not limited.

The electronic information board apparatus 14 further includes a display unit for displaying various types of display on the display and a communication unit for performing various communication. The external server such as the user information server 10 and the external service may include each functional unit provided for the electronic information board apparatus 14. When the external server is provided with each functional unit of the electronic information board apparatus 14, a user can use the respective functions of the external server using the input reception unit, the display unit, application, web browser, or the like of the electronic information board apparatus 14 via the network.

(Service Account Information)

FIG. 5 is an example of the service account information stored in the external service group system 12. As illustrated in FIG. 5, the service account information includes, for example, user identification (ID), user name, and e-mail address of each user (a user of an external service) who uses the external service group system 12.

(Schedule Information)

FIG. 6 is an example of the schedule information stored in the external service group system 12. As illustrated in FIG. 6, the schedule information includes, for example, schedule TD, schedule name, location, organizer user, start time and time period, expected attendee, and attachment file of each conference.

(User Information List)

FIG. 7 is an example of a user information list stored in the user information server 10. As illustrated in FIG. 7, the user information list includes, for example, user ID, user name, e-mail address, external service setting ID, and identification information of each user (user of the electronic information board system 1A) managed by the electronic information board system 1A.

The external service setting ID is information identifying the external service setting information from an external service configuration information list illustrated in FIG. 8. The identification information is identification information identifying the user, which is input from the participant information acquisition unit 50, which will be described later. The user information list illustrated in FIG. 7 includes the external service setting information corresponding to the user identified by the identification information.

(External Service Setting Information List)

FIG. 8 is an example of the external service setting information list stored in the user information server 10 according to one embodiment. As illustrated in FIG. 8, the external service setting information list represents information that associates user ID of user of the electronic information board system 1A and user ID of user of an external service. The external service setting information list includes, for example, external service setting ID, user ID of the electronic information board system 1A, address information, external service user ID, and authentication token of external service. The address information indicates an address of the external service group system 12 used as an access destination. The authentication token of the external service is authentication information to be used when accessing the external service group system 12.

(Participant Management Information)

FIG. 9 is an example of the participant management information managed by the electronic information board apparatus 14. The participant management information 900 (FIG. 9) is managed by the participant management unit 52 of the electronic information board apparatus 14. As illustrated in FIG. 9, the participant management information 900 associates the user ID of participant of a conference currently being held using the electronic information board apparatus 14 and information indicating whether or not the participant is an organizer of the conference.

(Conference Management Information)

FIG. 10 is an example of the conference management information managed by the electronic information board apparatus 14. The conference management information 1000 (FIG. 10) is managed by the conference information creation unit 55 of the electronic information board apparatus 14. As illustrated in FIG. 10, the conference management information 1000 includes, for example, schedule ID of external service, conference name, location, and start date and time for the conference currently being held using the electronic information board apparatus 14.

(Function of Electronic Information Board Apparatus)

Figure 11:
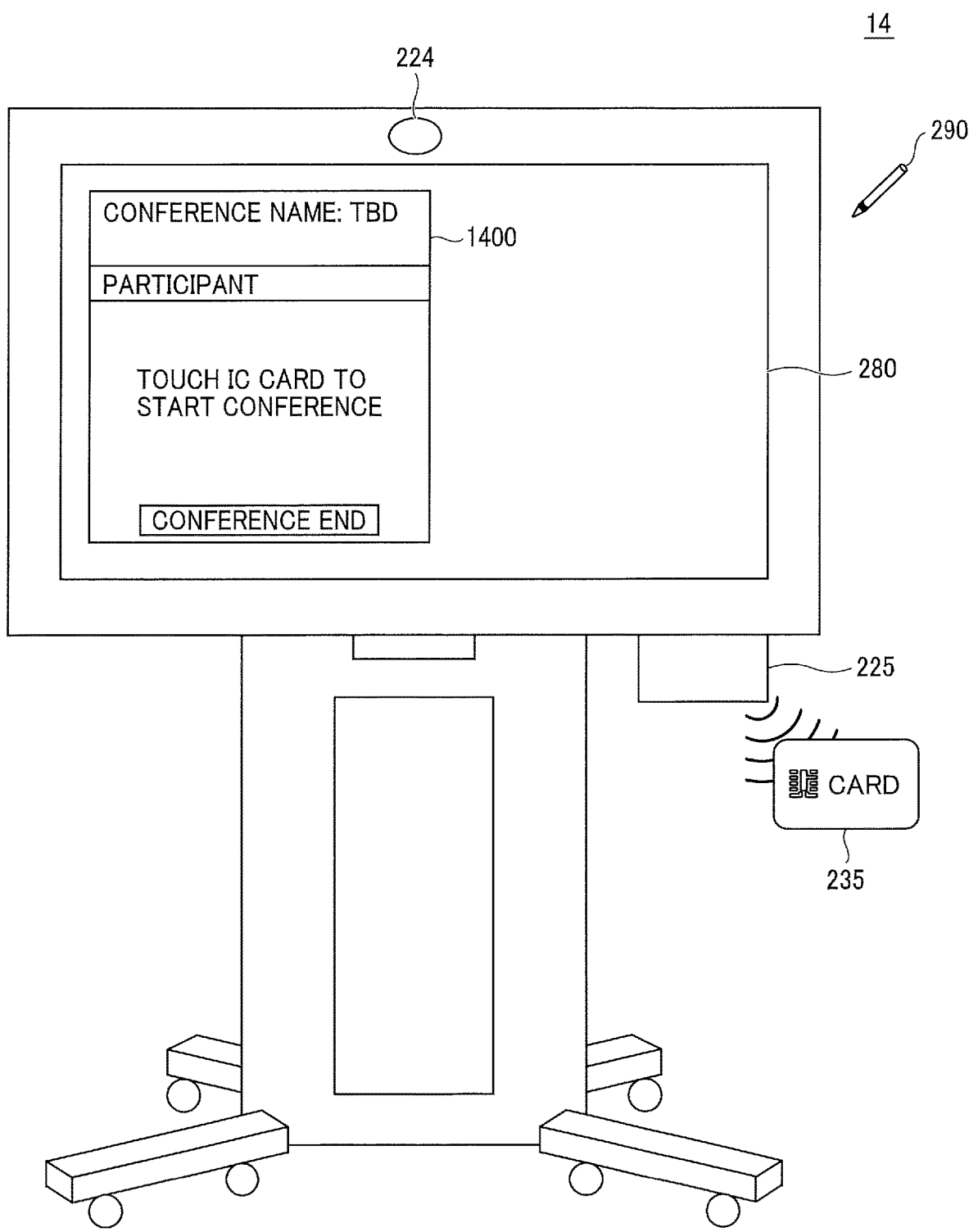
FIG. 11 is an external view of an electronic information board apparatus according to an embodiment.

FIG. 11 is an external view of the electronic information board apparatus 14. As illustrated in FIG. 11, the electronic information board apparatus 14 includes, for example, the display 280, the camera 224, and then IC card reader 225. The display 280 displays an operation panel 1400 illustrated in FIG. 14 and other drawings. The electronic information board apparatus 14 has at least following functions 1 to 5.

(Function 1: Electronic Information Board Function)

The electronic information board apparatus 14 such as an electronic whiteboard can be written with information using the electronic pen 290 or finger. The electronic information board apparatus 14 can transmit images of contents written to the electronic whiteboard and store images of contents written to the electronic whiteboard to a cloud storage. The electronic information board apparatus 14 can also display files such as conference materials, and edit the files.

(Function 2: Authentication Function)

The electronic information board apparatus 14 can acquire authentication information using the IC card reader 225, camera, biometric authentication device or the like, and perform user authentication based on the authentication information. The electronic information board apparatus 14 can perform the user authentication, or the user authentication can be performed by an external device instead of the electronic information board apparatus 14.

The IC card reader 225 can acquire the authentication information from the IC card 235, and determine the matching of the authentication information by referring to a database of user information to perform the user authentication. The camera can be used to perform the user authentication by photographing a face image of participant of a conference, extracting a feature value from the face image, and determining the matching of the feature value by referring to the database of user information.

(Function 3: Cloud Cooperation Function) The electronic information board apparatus 14 can cooperate with various cloud services (e.g., user account service, authentication service, schedule service, cloud storage, portal site). For example, the electronic information board apparatus 14 can acquire the schedule information of user from an external service by using the external service setting information of the user authenticated by the authentication function, and can transmit information such as a board writing during a conference and files to the address of the participant of the conference. For example, the electronic information board apparatus 14 can access the cloud storage of the user authenticated by the user, acquire the files from the cloud storage, or can share files with another device, or can transfer files to another device.

(Function 4: Remote Sharing Function)

The electronic information board apparatus 14 can share information with a plurality of information processing apparatuses (e.g., other electronic information board apparatus 14, PC) installed at remote locations. For example, the electronic information board apparatus 14 can share screens and image data displayed on the electronic information board apparatus 14, share co-editing of the screen displayed on the electronic information board apparatus 14 (executing the remote electronic information board function), share images and videos of conference participant taken by the camera 224, share microphone audio, and share co-edition, transmission and reception of files that the electronic information board apparatus 14 has acquired from a personal storage or a shared storage. The sharing of screen means that the same content is displayed on the plurality of information processing apparatuses located in the respective remote locations, and the contents are used to discuss the contents during a remote conference. The co-editing of the screen means that writing to the same screen and editing the same file is performed from a plurality of information processing apparatuses.

(Function 5: Other Function)

The electronic information board apparatus 14 has applications similar to applications running on general PC, smart device or the like, such as browser and mail application.

The above-mentioned functions can be implemented by cooperating the hardware of the electronic information board apparatus 14 with the application software. The application software includes, for example, an application that is operated by cooperating the electronic information board apparatus 14 and a plurality of software applications of an external device.

(Information used for Electronic Information Board Apparatus)

Figure 12:
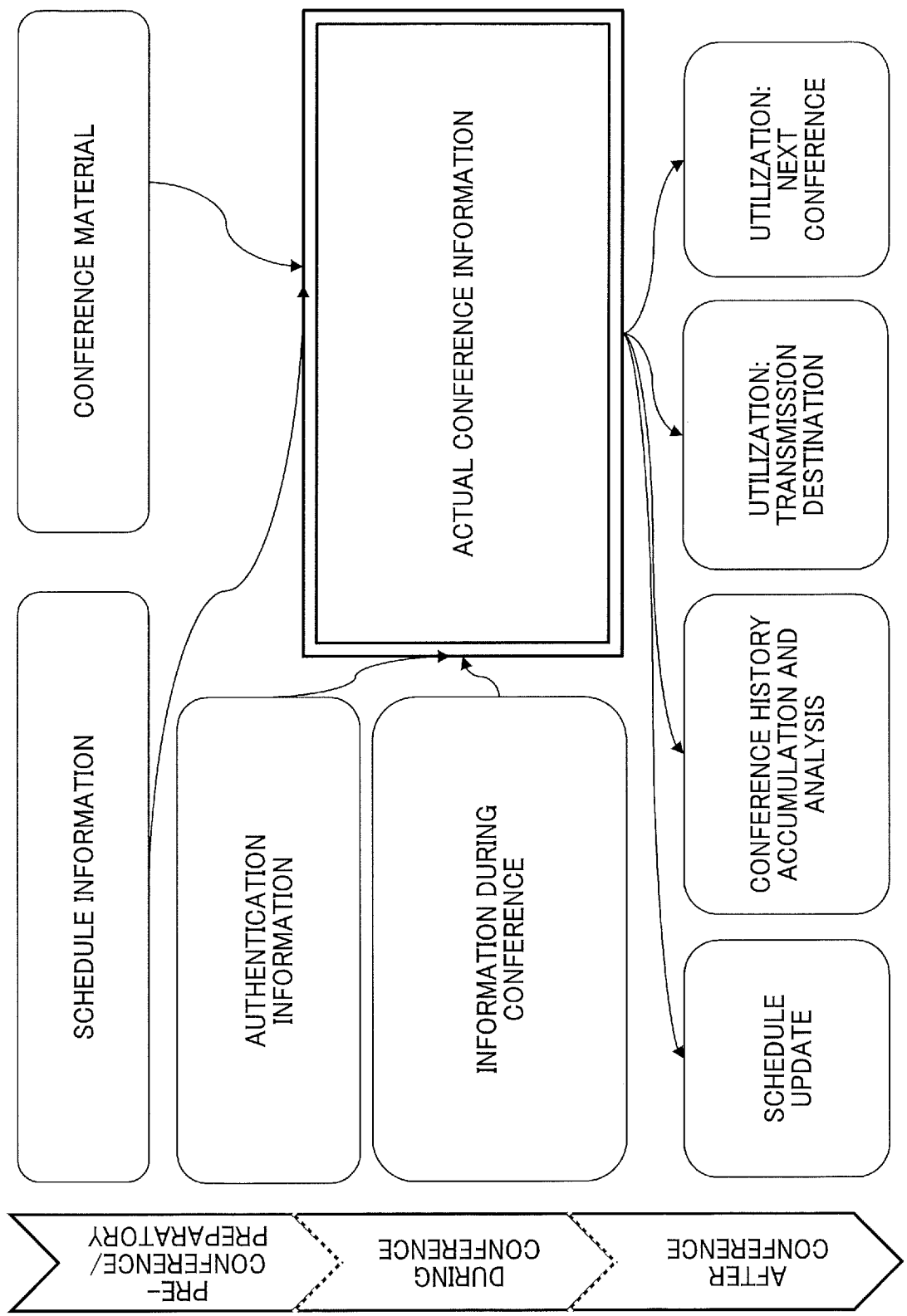
FIG. 12 is a conceptual diagram of information used for an electronic information board apparatus according to an embodiment.

FIG. 12 is a conceptual diagram of information used for the electronic information board apparatus 14. Hereinafter, a description is given of the information used for the electronic information board apparatus 14.

(Pre-Conference/Preparatory Phase)

As illustrated in FIG. 12, "schedule information" and "conference material" are prepared at a pre-conference/preparatory phase as information to be input to the electronic information board apparatus 14. The "schedule information" is the information of a schedule of a conference that has been registered in advance. For example, the "schedule information" includes, for example, date and time of event, location, expected attendee (participant), schedule registration person (organizer), and files for conference. The "conference material" is one or more files associated with or linked to a schedule, and files stored a personal storage can be used.

(During Conference)

Further, information, such as "authentication information" and "information during conference," is input during a conference using the electronic information board apparatus 14.

The "authentication information" is the authentication information of the participant information acquired by the electronic information board apparatus 14 during the conference. The "authentication information" includes, for example, identification information of the IC card 235, ID information of participant input manually, face image of participant, quick response (QR) code (registered trademark) encoding participant ID as two-dimensional code.

The "information during conference" is the information input to the electronic information board apparatus 14 during the conference. The "information during conference" includes, for example, various conference information (e.g., organizer, participant, conference time, conference name, conference content), images captured on a board screen, remote sharing screen, files shared during the conference, minutes, notes, and voice.

Further, "actual conference information" is created, updated, and stored during the conference using the electronic information board apparatus 14.

The "actual conference information" is created by the conference information creation unit 55 based on the participant information (e.g., "authentication information") acquired by the electronic information board apparatus 14. The "actual conference information" includes, for example, the participant information acquired during the conference and information updated and edited based on and various information input by the participants during the conference. The "actual conference information" is updated, edited and stored at any time until the end of the conference.

(After Conference)

The "actual conference information" created and updated during the conference using the electronic information board apparatus 14 is stored in the electronic information board apparatus 14, an external server, and the like after the conference, and is used, recorded, and analyzed for various purposes. For example, the "actual conference information" can be used for "schedule update," "conference history accumulation and analysis," "utilization: transmission destination," and "utilization: next conference."

The "schedule update" indicates that the schedule information of a cloud (the schedule service 42 of the external service group system 12) is updated with the "actual conference information." For example, as to the "schedule update," the schedule information is updated using the conference information, such as participant, organizer, start/end time, conference name, location, and the like acquired by the electronic information board apparatus 14 during the actual conference. Further, as to the "schedule update," the files of conference materials are associated with the schedule information and stored. As to the "schedule update," the cloud scheduling information can be matched to the actually-held conference, with which the review of information can be performed easily at a later timing.

The "conference history accumulation and analysis" indicates that "actual conference information" is accumulated as a conference history and the conference history is analyzed. The "conference history accumulation and analysis" can be stored by specifying the cloud schedule update and other external storage (for sharing and for personal use). Further, as to the "conference history accumulation and analysis," the schedule information of to-be-expected conference and the actual conference information of actually held conference can be stored together and compared to analyze the effect analysis of the conference.

The "utilization: transmission destination" means to use the updated conference participant information as to the transmission destination of information (e.g., shared screen and file of conference material) to be shared after the conference. As to the "utilization: transmission destination," the user can select particular participants as the transmission destination and transmit the information to the selected particular participants from the participants who actually participated the conference and the expected attendee included in the schedule information.

The "utilization: next conference" is the use of information when reserving a schedule for the next conference. The participants and organizer can use participant information and organizer information after updating the actual conference information to register a new schedule and can shift to more appropriate members who are more likely to participate the conference. By handling the information as described above in the conference information management system 1, by creating and updating the actual conference information while collecting and utilizing various information before and during the conference, the conference information in accordance with the actual conditions of the conference can be stored and the conference information in accordance with the actual conditions of the conference can be utilized for various contexts.

(Flow of Processing using Electronic Information Board Apparatus)

Figure 13:
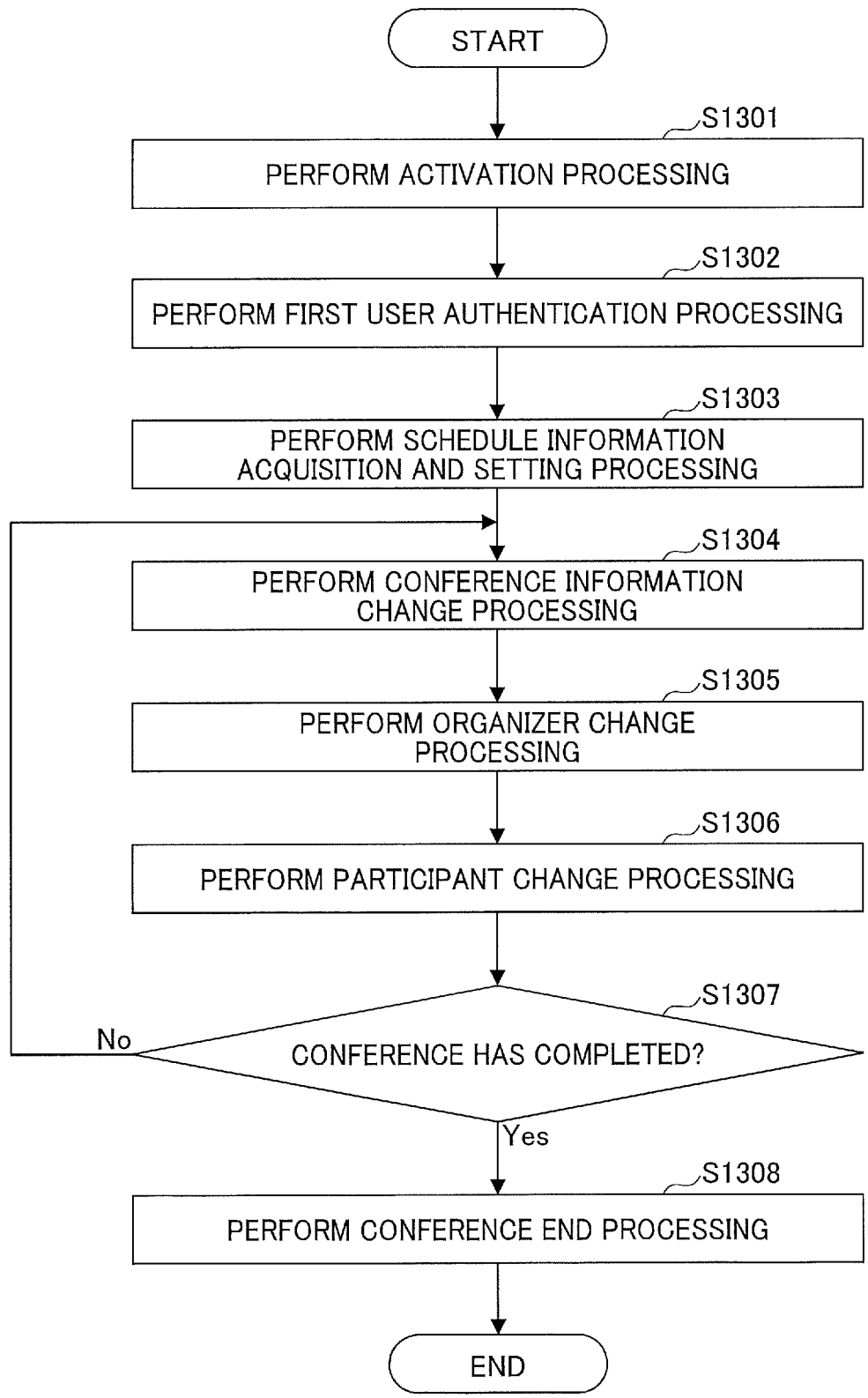
FIG. 13 is a flowchart illustrating the flow of overall processing using an electronic information board apparatus according to an embodiment.

FIG. 13 is a flow chart illustrating a flow of processing using the electronic information board apparatus 14. FIG. 13 is a flowchart of processing from a start to an end of a conference performed by using the electronic information board apparatus 14.

(Activation Processing)

At first, when the power supply is switched to ON, the electronic information board apparatus 14 performs "activation processing" (step S1301). For example, the electronic information board apparatus 14 uses the display 280 to display an operation panel by performing the "activation processing." The operation panel is a window in which information about a conference is displayed. The operation panel displays information about the conference, such as conference name, location, time, participant, and organizer.

(First User Authentication Processing)

Then, the electronic information board apparatus 14 performs the "first user authentication processing" (step S1302). The "first user authentication processing" is a process of authenticating the first participant or user. In this description, the participant and user may be described interchangeably.

In the "first user authentication processing," when the user authentication of the first participant is performed, the electronic information board apparatus 14 displays a name of the first participant on the operation panel and automatically sets the first participant as an organizer, and displays an icon indicating that the first participant is the organizer on the operation panel. In the "first user authentication processing," the electronic information board apparatus 14 adds the user ID of the first participant to the participant management information 900 indicating the current participant. In this description, the first participant (first user) is a person who has joined a specific conference as the first person, which means no persons have joined the specific conference before the first participant (first user) has joined the specific conference.

(Schedule Information Acquisition and Setting Processing)

Then, the electronic information board apparatus 14 performs the "schedule information acquisition and setting processing" (step S1303). The "schedule information acquisition and setting processing" is a process of acquiring schedule information by the electronic information board apparatus 14 and setting the schedule information as the conference information of the currently held conference. For example, the electronic information board apparatus 14 acquires, from the schedule service 42 of the external service group system 12, the schedule information including the first participant as the expected attendee using the external service setting information (authentication token) of the first participant.

Then, the electronic information board apparatus 14 displays various information (e.g., conference name, location, time, participant, organizer) included in the acquired schedule information on the operation panel.

Further, the electronic information board apparatus 14 adds the participant included in the schedule information to the participant management information 900.

Further, if a plurality of schedule information that corresponds to the first participant exists, the electronic information board apparatus 14 displays a schedule list screen on the display 280, and causes the first participant to select any schedule information from the schedule list screen.

Further, if the schedule information corresponding to the first participant does not exist, the electronic information board apparatus 14 displays a given message indicating that the schedule information is not present on the display 280.

Further, if the organizer set in the schedule information differs from the first participant set as the organizer by performing the "first user authentication processing," the electronic information board apparatus 14 displays the organizer confirmation screen on the display 280 and causes the user to select which organizer is to be designated as the true organizer.

(Conference Information Change Processing)

During the conference, the electronic information board apparatus 14 can perform the "conference information change processing" as needed (step S1304). The "conference information change processing" is a process for changing the conference information depending on the actual state of conference. For example, the conference information of the actually held conference, set by using the schedule information and participant information input by the participant at the "schedule information acquisition and setting processing" is changed based on the actual state of the conference. For example, in the "conference information change processing", the electronic information board apparatus 14 can change any one of the conference name, location, start time, and end time of the conference information created by using the schedule information and participant information.

Further, for example, the electronic information board apparatus 14 can add a link of file created during the conference to the created conference information in the "conference information change processing process." The change of conference information is reflected to the content displayed on the operation panel.

(Organizer Change Processing)

During the conference, the electronic information board apparatus 14 can perform the "organizer change processing" as needed (step S1305). The "organizer change processing" is a process of changing the organizer of the conference. For example, the electronic information board apparatus 14 displays an organizer change screen on the display 280 and demands the user to change the organizer. The change of organizer is reflected to the content displayed on the operation panel and the participant management information 900.

(Participant Change Processing)

During the conference, the electronic information board apparatus 14 can perform the "participant change processing" as needed (step S1306). The "participant change processing" is the process of adding or removing the participant to or from the participant management information 900. For example, when a new participant logs in, the electronic information board apparatus 14 adds the user ID of the new participant to the participant management information 900 by performing the participant change processing.

Further, if the participant included the schedule information acquired from the schedule service 42 is different from the actual state, and the electronic information board apparatus 14 receives an input of removing a particular participant included in the participant management information 900, the electronic information board apparatus 14 deletes the user ID of the particular participant from the participant management information 900 by performing the "participant change processing." The change of the participant management information 900 is reflected to the content displayed on the operation panel.

As appropriate, the electronic information board apparatus 14 determines whether or not the conference has ended (step S1307). For example, the electronic information board apparatus 14 determines that the conference has ended when a conference end button is pressed on the operation panel.

If the electronic information board apparatus 14 determines in step S1307 that the conference has ended (step S1307: Yes), the electronic information board apparatus 14 proceeds the sequence to step S1308.

On the other hand, if the electronic information board apparatus 14 determines in step S1307 that the conference has not ended (step S1307: No), the electronic information board apparatus 14 returns the sequence to step S1304.

(Conference End Processing)

In response to completion of the conference, the electronic information board apparatus 14 performs the "conference end processing" (step S1308) to terminate the sequence of FIG. 13. For example, the electronic information board apparatus 14 can update the schedule information stored in the external service group system 12 to the changed schedule information in the "conference end processing."

Further, for example, if the schedule information is not stored in the external service group system 12 in the "conference end processing," the electronic information board apparatus 14 displays a conference setting screen on the display 280, and demands the user to input the schedule information to create the schedule information.

Then, the electronic information board apparatus 14 can register the created schedule information to the external service group system 12.

Further, for example, in the "conference end processing," the electronic information board apparatus 14 can create a file of the content written to the electronic info nation board apparatus 14, and transmits the file to the address of each participant. The content of file written to the electronic information board apparatus 14 generated and then transmitted is an image file, such as PDF data, JPEG and PNG, but any data format may be used.

Further, the electronic information board apparatus 14 can omit all of steps S1304, S1305 and S1306. Further, the electronic information board apparatus 14 can perform all of steps S1304, S1305 and S1306. Further, the electronic information board apparatus 14 can perform only one the steps S1304, S1305 and S1306.

(Each Processing Performed by Electronic Information Board Apparatus)

Hereinafter, a description is given of the respective processes performed by the electronic information board apparatus 14 described with reference to FIG. 13.

(Activation Processing)

Figure 14:
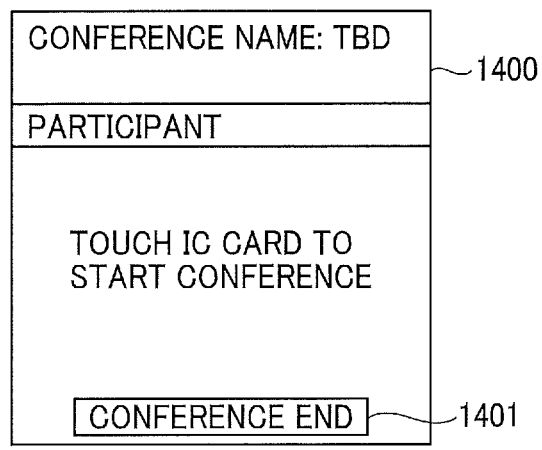
FIG. 14 illustrates an example of an operational panel displayed on an electronic information board apparatus according to an embodiment.

First, the activation processing is described with reference to FIG. 14. FIG. 14 is an example of an operation panel displayed on the electronic information board apparatus 14. For example, the electronic information board apparatus 14 displays the operation panel 1400 illustrated in FIG. 14 in the "activation processing." At this point, no participants are yet logged in and the conference name and participant are not determined (in FIG. 14 and other drawings, Conference Name: TBD indicates that the conference name is to be decided later). Therefore, the operation panel 1400 does not display the conference name and participant. Further, the operation panel 1400 displays a message prompting a user to start the conference by touching the IC card 235.

(First User Authentication Processing)

Figure 15:
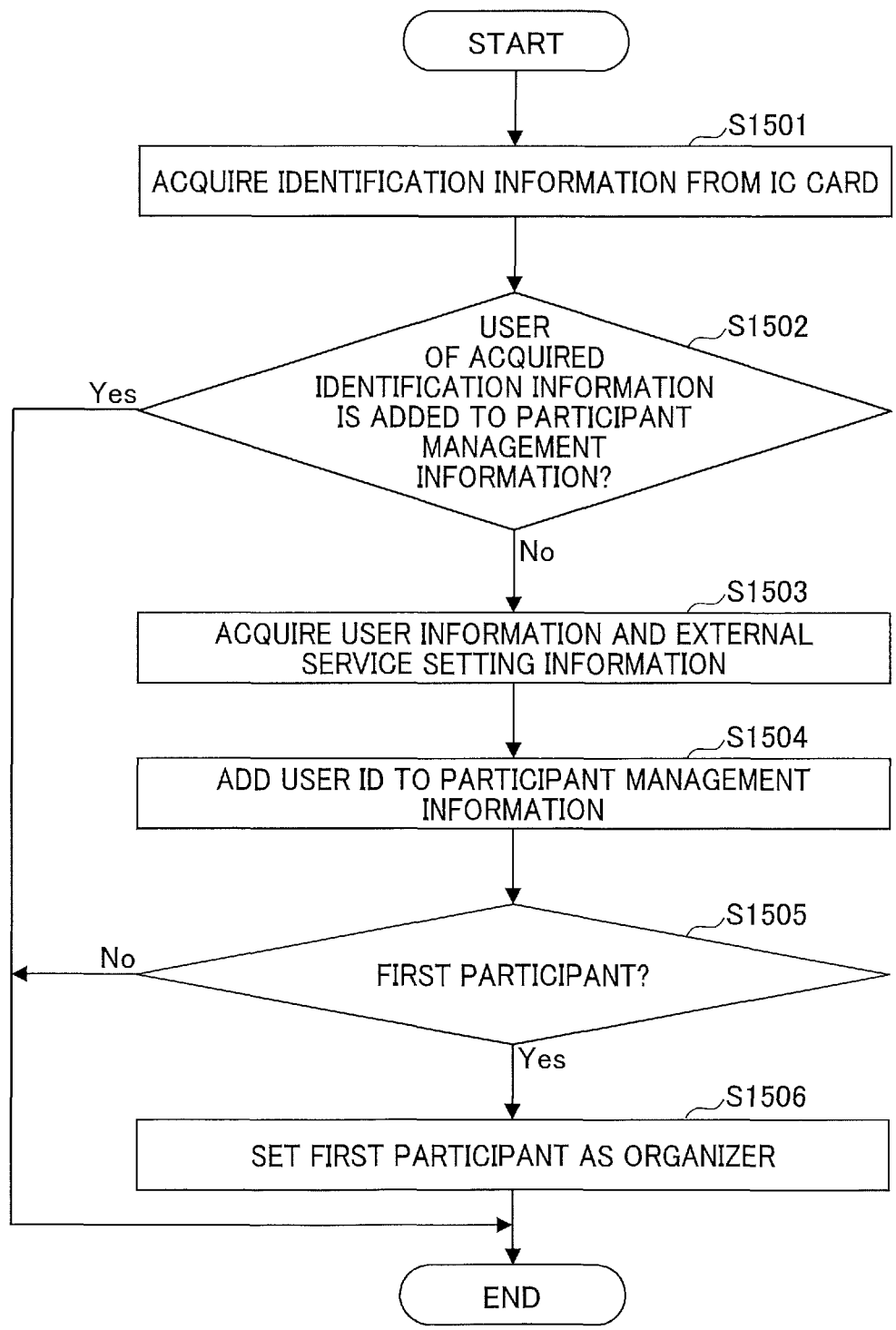
FIG. 15 is a flow chart illustrating a procedure of user authentication processing using an electronic information board apparatus according to an embodiment.

Hereinafter, the first user authentication processing is be described with reference to FIGS. 15 to 16. FIG. 15 is a flow chart illustrating a procedure of the user authentication processing using the electronic information board apparatus 14 (the participant management unit 52). The authentication processing by the participant management unit 52 of the electronic information board apparatus 14 is described below. This authentication processing can be used for the "first user authentication processing" and can be used when adding the participant in the "participant change processing."

At first, the participant management unit 52 acquires the identification information from the IC card 235 touched to the IC card reader 225 (step S1501).

If the user of the acquired identification information has been already added to the participant management information 900 (step S1502: Yes), the participant management unit 52 terminates the sequence of FIG. 15.

On the other hand, if the user of the acquired identification information is not yet added to the participant management information 900 (step S1502: No), the participant management unit 52 acquires, from the user information unit 20 and the external service setting information unit 22 of the user information server 10, the user information and the external service setting information corresponding to the acquired identification information (step S1503).

Then, the participant management unit 52 adds the user ID of the acquired user information to the participant management information 900 (step S1504).

If the added user ID matches the user ID of the first participant (step S1505: Yes), the participant management unit 52 sets the concerned first participant as the organizer to the participant management information 900 (step S1506). Then, the electronic information board apparatus 14 terminates or ends the sequence of FIG. 15.

Figure 16:
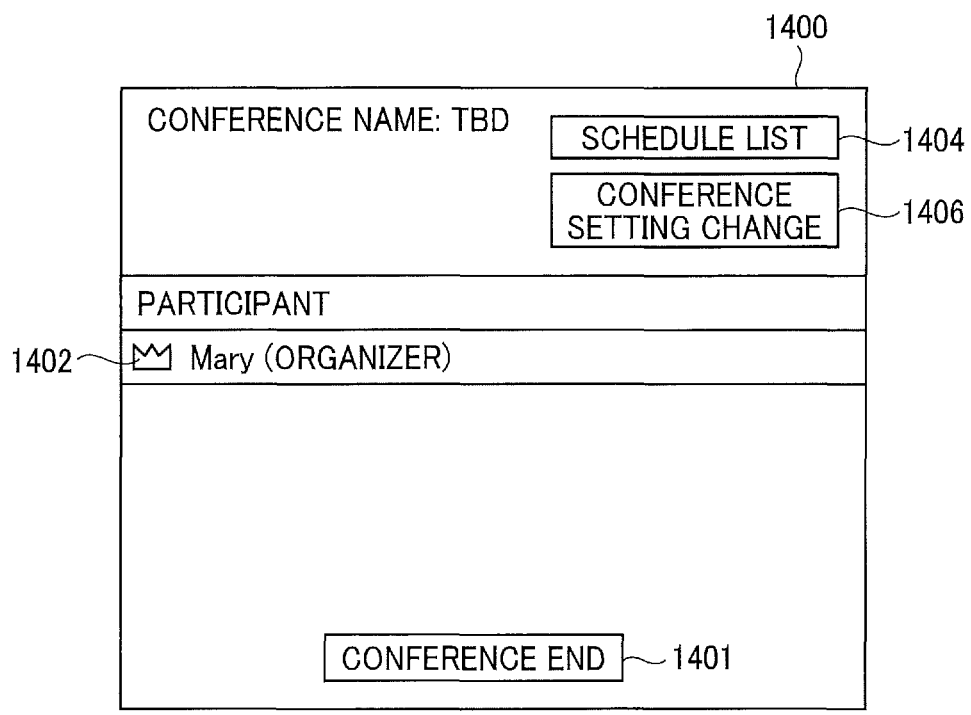
FIG. 16 is an example of an operation panel (after the first user authentication process) displayed on an electronic information board apparatus according to an embodiment.

FIG. 16 is an example of an operation panel displayed on the electronic information board apparatus 14 after performing the first user authentication processing. In an example case of FIG. 16, a user of "Mary" touches the IC card 235 to the IC card reader 225, and then the user of "Mary" is registered as the first participant in the participant management information 900, and thereby the user of "Mary" is displayed on the operation panel 1400. Further, an icon 1402 indicating that the user of "Mary" is the organizer and a character string of "organizer" are displayed on the operation panel 1400. Thus, it is easy to understand that the user of "Mary" is the organizer by seeing the operation panel 1400. In an example case of FIG. 16, the icon 1402 has a shape imitating a crown, but is not limited thereto. Further, after the first participant is registered, a schedule list button 1404 and a conference setting change button 1406 are further displayed on the operation panel 1400. Further, the authentication of user can be performed not only the IC card 235, but also by the user ID and password, and by the biometric authentication of face and fingerprint.

When the schedule list button 1404 is pressed on the operation panel 1400, the electronic information board apparatus 14 can obtain, from the schedule service 42 of the external service group system 12, the schedule information including the first participant as an expected attendee by using the external service setting information (authentication token) of the first participant. Then, the electronic information board apparatus 14 displays a schedule list screen (see FIG. 19).

However, the display of schedule list screen is not limited to this. For example, at the time when the first participant has logged in, the electronic information board apparatus 14 can automatically acquire, from the schedule service 42 of the external service group system 12, the schedule information including the first participant as the expected attendee and display the acquired schedule information as the schedule list screen (see FIG. 19).

Alternatively, the organizer, which is set when the schedule list button 1404 is pressed, can obtain the schedule information corresponding to the registration person of the schedule, from the schedule service 42. In this case, the electronic information board apparatus 14 acquires the schedule information by using the external service setting information (authentication token) of the first participant or a particular participant set as the organizer among a plurality of participants.

(Acquiring and Setting Schedule Information)

Figure 17:
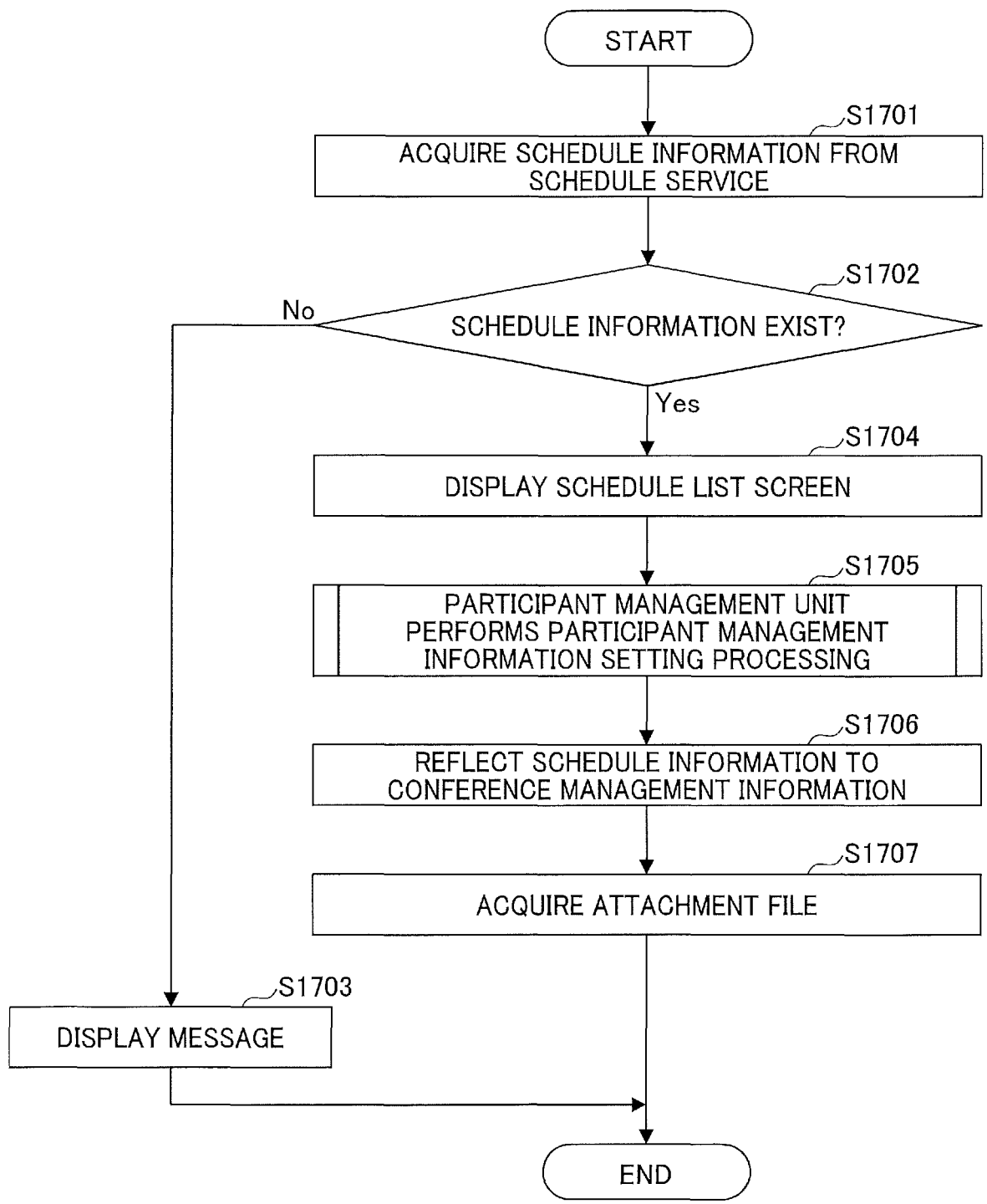
FIG. 17 is a flow chart illustrating a procedure for acquiring and setting schedule information using an electronic information board apparatus according to an embodiment.

Hereinafter, a description is given of a process of acquiring and setting schedule information with reference to FIGS. 17 to 22. FIG. 17 is a flow chart illustrating a procedure of acquiring and setting the schedule information by the electronic information board apparatus 14 (schedule information acquisition unit 54, conference information creation unit 55). The schedule information acquisition and setting processing is started, for example, when the schedule list button 1404 (see FIG. 16) on the operation panel 1400 is pressed by the first participant or the like.

The schedule information acquisition unit 54 of the electronic information board apparatus 14 performs the "schedule information acquisition setting processing" to acquire, from the schedule service 42 of the external service group system 12, the schedule information including the first participant added to the participant management information 900 as the expected attendee (step S1701). In step S1701, the schedule information acquisition unit 54 acquires the schedule information from the schedule service 42 by using an authentication token of the external service setting information already acquired by the participant management unit 52 at the time of the authentication of the first participant.

Further, the schedule information acquisition unit 54 may obtain the schedule information of the current date to be acquired alone, or only the schedule information registered at a specific time and/or a time range before or after the specific time, from the schedule information of the schedule service 42 by pressing the schedule list button 1404.

If the schedule information corresponding to the first participant does not exist in the schedule service 42 (step S1702: No), the schedule information acquisition unit 54 displays a given message (see FIG. 20) indicating that the schedule information is not present on the display 280 by receiving a response from the schedule service 42 (step S1703). Then, the schedule information acquisition unit 54 terminates or ends the sequence of FIG. 17.

On the other hand, if the schedule information corresponding to the first participant exists (step S1702: Yes), the schedule information acquisition unit 54 displays the schedule list screen (see FIG. 19) on the display 280 and demands the first participant or another user to select any schedule information from the schedule list screen (step S1704).

Then, the schedule information acquisition unit 54 or the conference information creation unit 55 causes the participant management unit 52 to perform a participant management information setting processing based on the schedule information selected by the first participant or another user (step S1705). In this participant management information setting processing, a plurality of participants set in the schedule information and the organizer are set to the participant management information 900. The participant management information setting processing by the participant management unit 52 will be described in detail later with reference to FIG. 18.

Further, the schedule information acquisition unit 54 or the conference information creation unit 55 reflects the schedule information to the conference management information 1000 (see FIG. 10) (step S1706). Further, the schedule information acquisition unit 54 acquires an attachment file.

If the setting of reading the attachment file is enabled on the schedule list screen (see FIG. 19), the schedule information acquisition unit 54 acquires the attachment file set in the schedule information (step S1707). Then, the file creation unit 56 (or the display unit) displays the acquired attachment file on the display 280. Then, the schedule information acquisition unit 54 terminates or ends the sequence of FIG. 17.

Further, in response to receiving an input of the participant information and the authentication information performed by the first participant, the schedule information acquisition unit 54 can automatically acquire the schedule list screen and displays the schedule list screen.

Further, the acquisition of the schedule information can be performed by any participant other than the first participant during the conference. That is, the schedule information acquisition unit 54 can acquire the schedule information and display the schedule list screen from the schedule information of organizer, by using the authentication token of the external service of the first participant automatically set as the organizer or the authentication token of the external service of any participant selected as the organizer from the plurality of participants.

Figure 18:
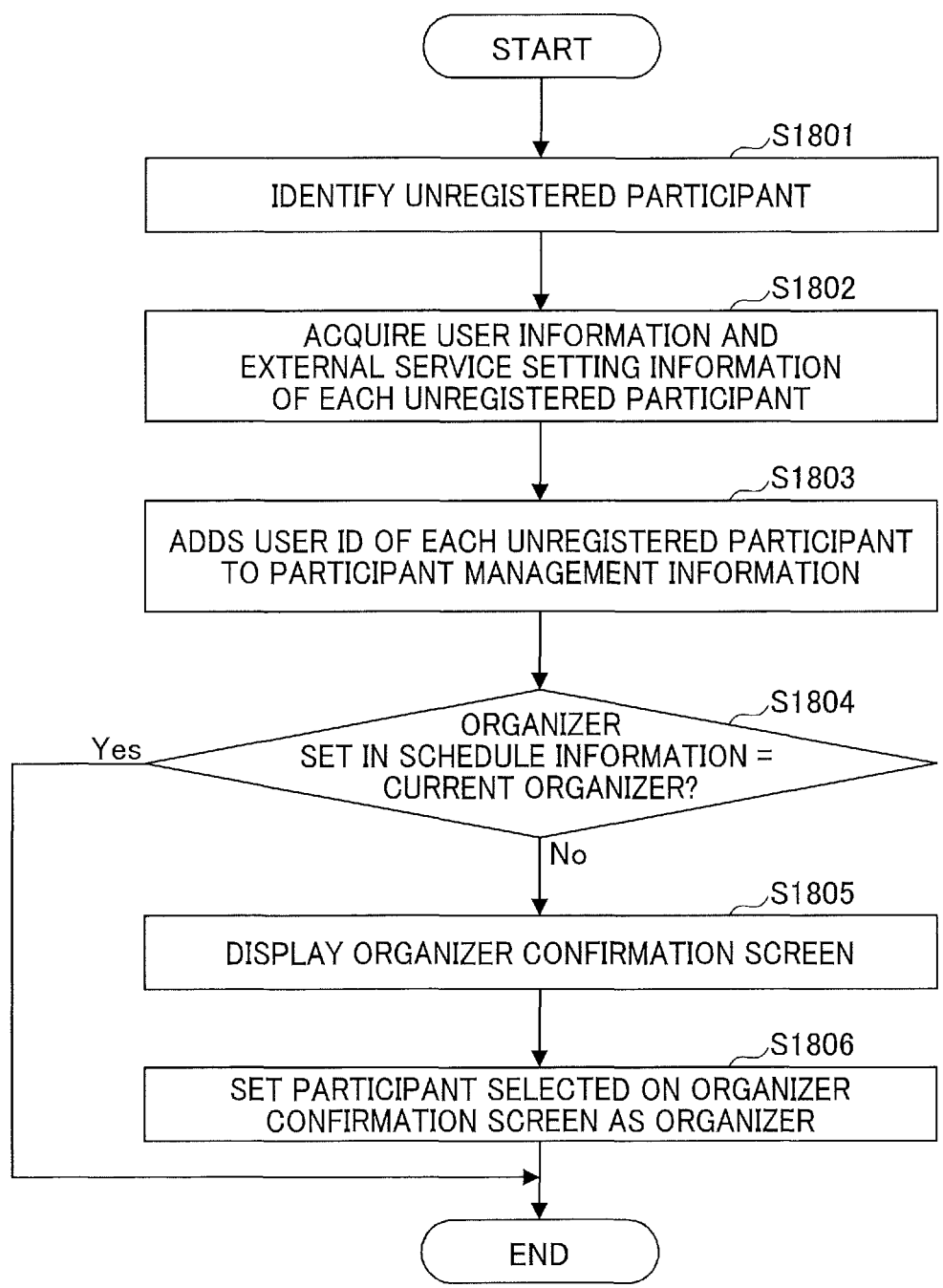
FIG. 18 is a flow chart illustrating a procedure of participant management information setting processing using an electronic information board apparatus according to an embodiment.

FIG. 18 is a flow chart illustrating a procedure of the participant management information setting processing using the electronic information board apparatus 14 (participant management unit 52).

The participant management unit 52 specifies or identifies other participant (hereinafter, "unregistered participant") excluding the first participant already registered in the participant management information 900, from a plurality of participants set in the schedule information (step S1801).

Then, the participant management unit 52 acquires the user information of each unregistered participant and the external service setting information respectively from the user information unit 20 and the external service setting information unit 22 of the user information server 10 (step S1802).

Then, the participant management unit 52 acquires the user ID of each unregistered participant from the user information of each unregistered participant, and then adds the user ID of each unregistered participant to the participant management information 900 (step S1803).

If the organizer set in the schedule information is different from the first participant automatically set as the organizer in the "first user authentication processing" (step S1804: No), the participant management unit 52 displays an organizer confirmation screen (see FIG. 21) on the display 280 and demands a user to choose which participant is to be set as the organizer (step S1805).

Then, the participant management unit 52 sets the participant selected by the user on the organizer confirmation screen as the organizer to the participant management information 900 (step S1806). Then, the participant management unit 52 terminates or ends the sequence of FIG. 18.

(Schedule List Screen)

Figure 19:
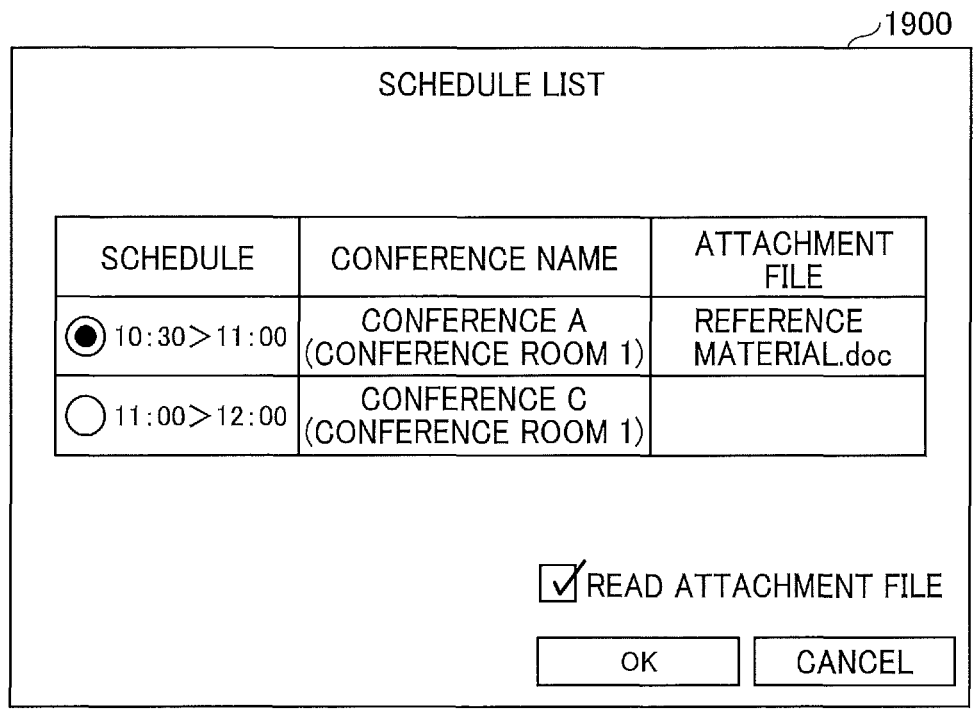
FIG. 19 is an example of a schedule list screen displayed on an electronic information board apparatus according to an embodiment.

FIG. 19 is an example of a schedule list screen displayed on the electronic information board apparatus 14. The electronic information board apparatus 14 displays the schedule list screen 1900 (FIG. 19) in response to setting the user of "Mary" as the organizer in the participant management information 900. The schedule list screen 1900 displays a plurality of schedule information setting the user of "Mary" as the participant, such as one schedule information setting "sch-1" as the schedule ID, and another schedule information setting "sch-3" as the schedule ID. The user can select the schedule information to be set as the conference information of the conference being held from the schedule list screen 1900, using the electronic information board apparatus 14.

The schedule information selected by the user in the schedule list screen 1900 is set to the conference management information 1000 (see FIG. 10). At this timing, the current time set to the conference management information 1000 as the starting time of the conference instead of the scheduled time set in the schedule information. The schedule list screen 1900 allows the user to select and read the attachment file set in the schedule information.

(Message)

Figure 20:
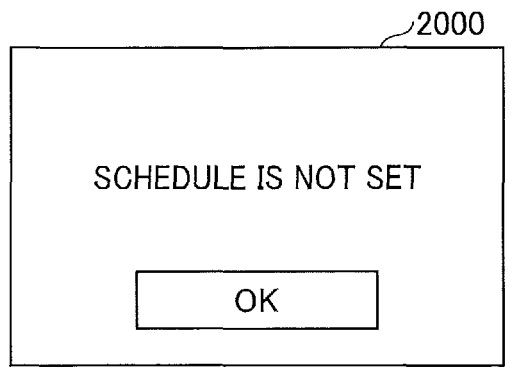
FIG. 20 illustrates an example of a message displayed on an electronic information board apparatus according to an embodiment.

FIG. 20 is an example of a message displayed on the electronic information board apparatus 14. The electronic information board apparatus 14 displays a message 2000 illustrated in FIG. 20 when the schedule information corresponding to the first participant (organizer) does not exist in the schedule service 42.

(Organizer Confirmation Screen)

Figure 21:
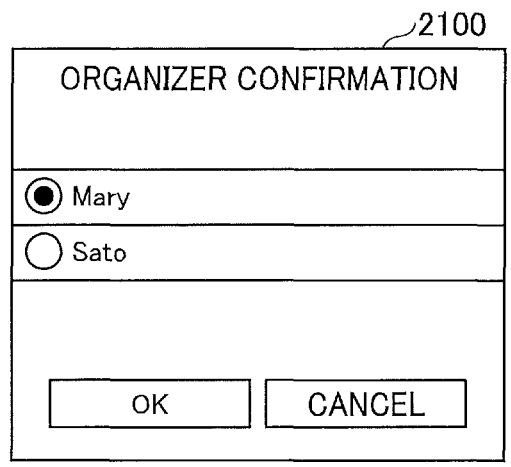
FIG. 21 is an example of an organizer confirmation screen displayed on an electronic information board apparatus according to an embodiment.

FIG. 21 is an example of an organizer confirmation screen displayed on the electronic information board apparatus 14. The electronic information board apparatus 14 displays an organizer confirmation screen 2100 illustrated in FIG. 21 when the organizer set for the schedule information selected by the user is different from the first participant automatically set as the organizer in the "first user authentication process." In an example case of FIG. 21, the organizer confirmation screen 2100 allows the user to select either "Sato," who is the organizer set in the schedule information, or the first participant of the user of "Mary."

(Operation Panel after Acquiring and Setting Schedule Information)

Figure 22:
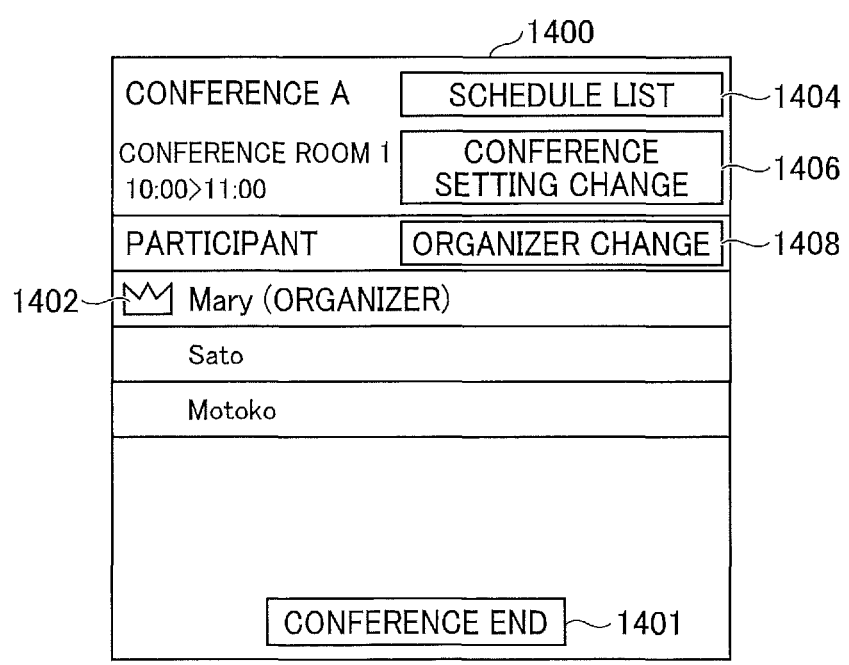
FIG. 22 is an example of an operational panel displayed on an electronic information board apparatus after acquiring and setting scheduling information according to an embodiment.

FIG. 22 is an example of an operation panel displayed on the electronic information board apparatus 14 after acquiring and setting the scheduling information. When the schedule information having a conference name of "conference A" is selected in the schedule list screen 1900 (FIG. 19), an operation panel 1400 (FIG. 22) displays the information included in the selected schedule information (e.g., conference name, location, start time, end time, participant list). In this example case, since the user of "Mary" is set as the organizer, the operation panel 1400 displays the icon 1402 indicating that the organizer is the user of "Mary" and the character string of "organizer." Further, an organizer change button 1408 is further displayed on the operation panel 1400 as illustrated in FIG. 22. The electronic information board apparatus 14 displays an organizer change screen 2300 (see FIG. 23) when a user presses the organizer change button 1408 to change the organizer.

(Organizer Change Processing)

Figure 23:
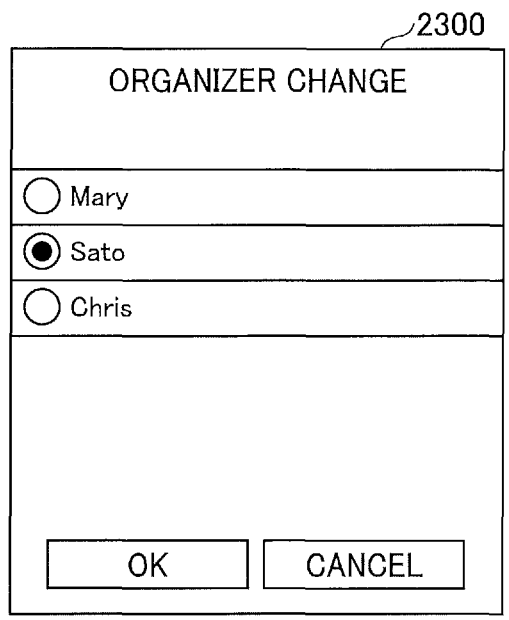
FIG. 23 is an example of an organizer change screen displayed on an electronic information board apparatus according to an embodiment.

Hereinafter, a description is given of the "organizer change processing" with reference to FIGS. 23 and 24. FIG. 23 is an example of an organizer change screen displayed on the electronic information board apparatus 14. The electronic information board apparatus 14 displays an organizer change screen 2300 (FIG. 23) when the organizer change button 1408 is pressed by the user in the operation panel 1400 (FIG. 22). The organizer change screen 2300 displays a plurality of participants set in the participant management information 900. The organizer change screen 2300 allows a user to select any participant as the organizer from the plurality of participants. In an example case of FIG. 23, the organizer change screen 2300 displays a selection of the organizer is changed from "Mary" to "Sato." The change of organizer is reflected to the participant management information 900 and the operation panel 1400.

Figure 24:
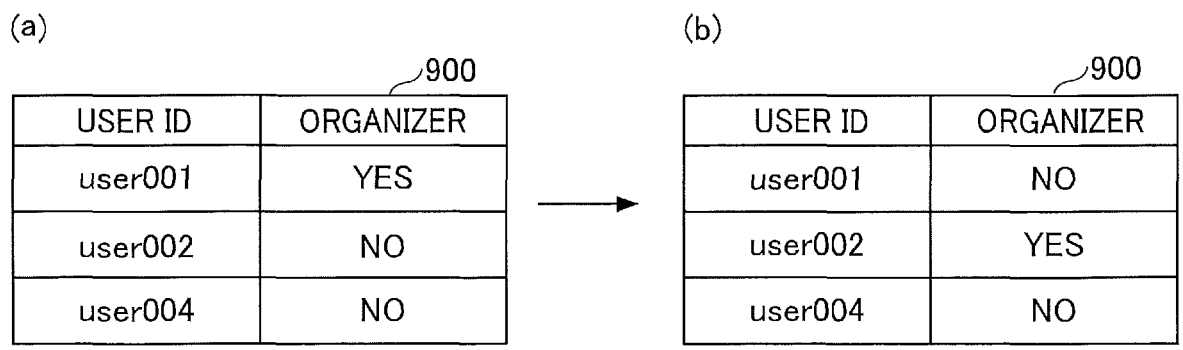
FIG. 24 (FIGS. 24(a) and 24(b)) illustrates an example of organizer change processing using an electronic information board apparatus according to an embodiment.

FIG. 24 illustrates an example of an organizer change processing using the electronic information board apparatus 14. FIG. 24(a) is an example of the participant management information 900 prior to the change of the organizer, and FIG. 24(b) is an example of the participant management information 900 after changing the organizer. In an example case of FIG. 24, the participant management information 900 indicates that the organizer has been changed from one participant having the user ID of "user 001" (user of "Mary") to another participant having a user ID of user "002" (user of "Sato").

(Participant Change Processing)

Hereinafter, a description is given of the "participant change processing" with reference to FIG. 25. FIG. 25 is an example of the participant change processing using the electronic information board apparatus 14. FIG. 25(a) is an example in which a participant having a user ID of "user 004" is added to the participant management information 900 by performing the "participant change processing." For example, when a new participant logs in, the electronic information board apparatus 14 can add the user ID of the new participant to the participant management information 900 by performing the "participant change processing." Further, other than the log-in of the new participant, the electronic information board apparatus 14 can be configured to receive any information that can identify a particular participant using the touch panel.

FIG. 25(b) is an example in which a participant having a user ID of "user 003" has been deleted from the participant management information 900 by performing the "participant change processing." For example, when any participant is removed from the participants of the conference, the electronic information board apparatus 14 can remove user ID of the participant from the participant management information 900 by performing the "participant change processing."

(Conference End Processing)

Figure 26:
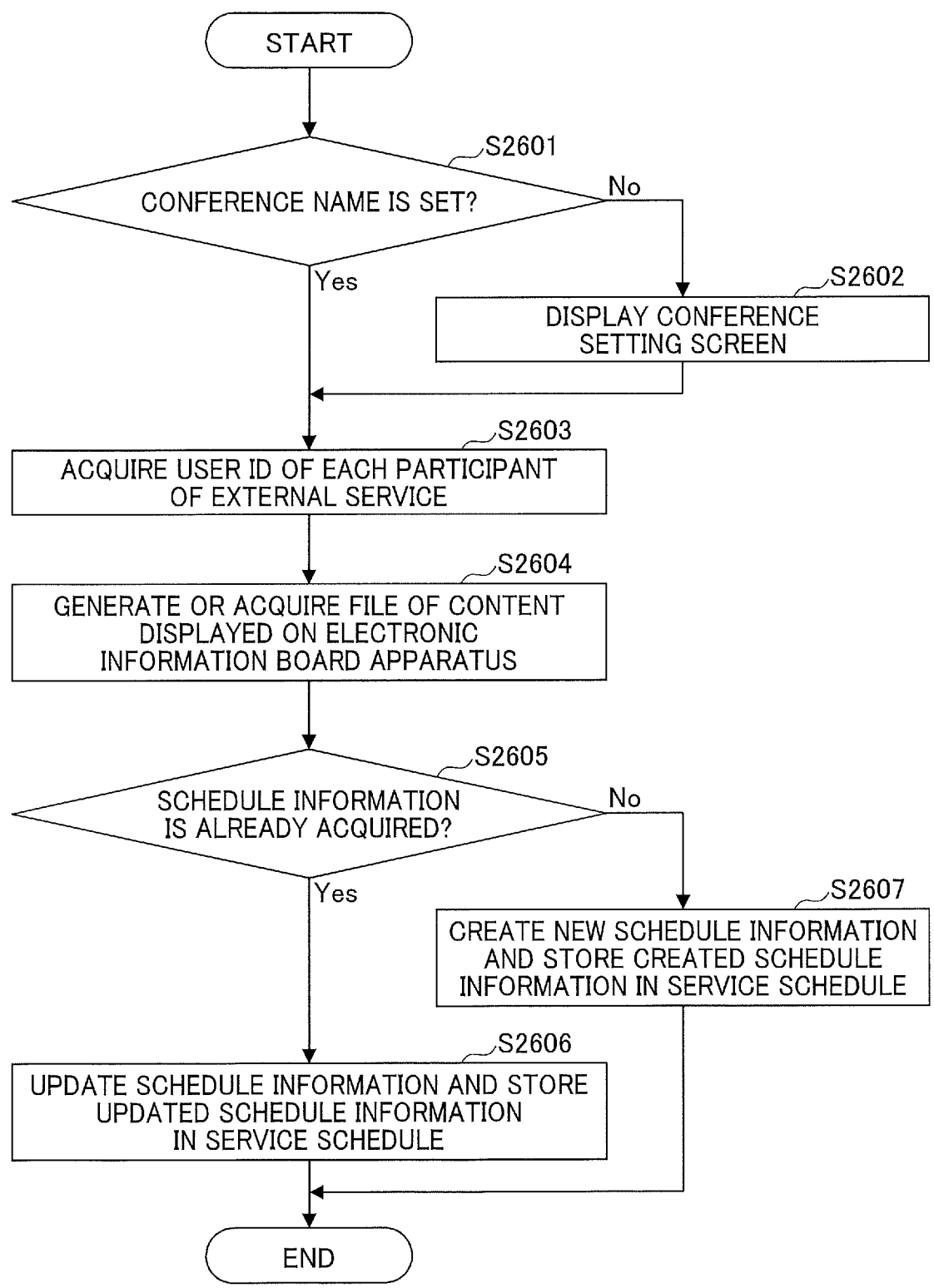
FIG. 26 is a flow chart illustrating a procedure of a conference end processing using an electronic information board apparatus according to an embodiment.

Hereinafter, a description is given of the "conference end processing" with reference to FIGS. 26 to 28. FIG. 26 is a flow chart illustrating a procedure of the conference end processing performed by the electronic information board apparatus 14 (e.g., conference information creation unit 55, storage unit 58). For example, when the conference end button 1401 is pressed by a user on the operation panel 1400 (see FIG. 22), the conference information creation unit 55 performs the "conference end processing."

Further, in a case that the organizer logs out, and all of the participants log out, the current time becomes the scheduled end time of conference set in the schedule information, or the current time becomes the time range before or after the scheduled end time of conference, the electronic information board apparatus 14 can perform the "conference end processing."

At first, the conference information creation unit 55 determines whether or not the conference name is set in the conference management information 1000 (step S2601).

If the conference information creation unit 55 determines step S2601 that the conference name has been set (step S2601: Yes), the conference information creation unit 55 proceeds the sequence to step S2603.

On the other hand, if the conference information creation unit 55 determines in step S2601 that the conference name has not been set (step S2601: No), the conference information creation unit 55 displays a conference setting screen and demands a user to set the conference name (step S2602), and then proceeds the sequence to step S2603.

Further, the electronic information board apparatus 14 is not necessarily to perform the processing in steps S2601 and S2602 at the end of the conference, but can perform the processing in steps S2601 and S2602 if it is determined in step S1702 (FIG. 17) that there is no schedule information. In this case, steps S2601 and S2602 may be omitted Further, if the conference name is not set, the electronic information board apparatus 14 can be configured to automatically input or enter date, a pre-set character of "conference" or other pre-set characters.

Then, the conference information creation unit 55 acquires the user ID of the external service of each participant set in the participant management information 900 via the participant management unit 52 (step S2603). The participant management unit 52 acquires the user ID of the external service of each participant based on the user information list (see FIG. 7) and the external service setting information list (see FIG. 8). Specifically, the participant management unit 52 acquires the external service setting ID corresponding to the user ID of the participant from the user information list, and then acquires the user ID of the external service associated with the external service setting ID from the external service setting information list.

Then, the conference information creation unit 55 generates or acquires a file of content displayed on the electronic information board apparatus 14 from the file creation unit 56 (step S2604). The file is a file whose data has been converted by a user during the conference as needed. For example, the file can be an attachment file acquired or read when the schedule information selection was performed, an image file of the attachment file written by a user during the conference, or a file of content written on the electronic information board apparatus 14 by a user during the conference. The file of content written by the user can be a file of image written on the electronic information board apparatus 14 using the electronic information board function, and a file of reference materials acquired from the schedule service or personal storage and edited during the conference.

Then, the conference information creation unit 55 or the schedule information acquisition unit 54 determines whether or not the schedule information has been already acquired from the schedule service 42 (step 2605). For example, if a value is set to the schedule service schedule ID of the conference management information 1000, the conference information creation unit 55 determines that the schedule information has been already acquired.

If the conference information creation unit 55 determines in step S2605 that the schedule information has been already acquired (step S2605: Yes), the conference information creation unit 55 updates the acquired schedule information using the content of the conference management information 1000 and the content of the participant management information 900 at the end of the conference, stores the updated schedule information to the schedule service 42 by the storage unit 58 (step S2606), and then terminates the sequence of FIG. 26.

On the other hand, if the conference information creation unit 55 determines in step S2605 that the schedule information is not yet acquired (step S2605: No), the conference information creation unit 55 creates new schedule information using the content of the conference management information 1000 at the end of the conference, and stores the new schedule information to the schedule service 42 using the external service setting information (authentication token) of any one of the participants (step S2607), and then terminates or ends the sequence of FIG. 26.

In the storing processing, the conference information creation unit 55 and the storage unit 58 can update the schedule information or register a newly created schedule information for the schedule service 42, or can add and store the newly created schedule information to the schedule service 42 without changing the acquired original or initial schedule information from to the schedule service 42. In other words, the conference information creation unit 55 and the storage unit 58 may register and record the schedule of one conference (pre-update schedule information) and a result of the conference (updated schedule information) so that the participants and the organizer can compare the schedule information.

Further, the conference information creation unit 55 and the storage unit 58 may register the updated or newly created schedule information to the schedule of all of the participants stored in the participant management information and the schedule of some participants stored in the participant management information.

Further, the conference information creation unit 55 and the storage unit 58 may store the conference information including the conference management information, the participant management information and the file of the conference material to a storage destination such as other external server by designating the storage destination.

Further, the conference information creation unit 55 and the storage unit 58 may register and record the schedule information of one conference (pre-update schedule information) and a result of the conference (updated schedule information) to the storage destination such as other external server as the conference information so that the participants and the organizer can compare the schedule information.

For example, when updating the schedule information and when registering the new schedule information, the electronic information board apparatus 14 sets each pieces of information of the actually-held conference to each of items of the schedule information stored in the schedule service 42 as follows.

"Scheduled ID": If the schedule information has already been acquired, the electronic information board apparatus 14 uses the schedule ID of the schedule formation as it is. However, if the schedule information has not been acquired, the electronic information board apparatus 14 sets a blank, and uses the schedule service 42 to automatically set a new schedule ID.

"Scheduled Name": The electronic information board apparatus 14 sets the "conference name" of the conference management information 1000 at the end of the conference.

"Location": The electronic information board apparatus 14 sets the "location" of the conference management information 1000 at the end of the conference.

"Start time": The electronic information board apparatus 14 sets the "start time" (i.e., the login time of the first participant) of the conference management information 1000.

"End time": The electronic information board apparatus 14 sets the end time of the conference (i.e., the time when the conference end button 1401 is pressed).

"Attachment File": The electronic information board apparatus 14 sets a file of content acquired from the file creation unit 56, a file of content written on the electronic information board apparatus 14 or file of content displayed on the electronic information board apparatus 14 at the end of the conference. If the attachment file name before and after the update is the same, the electronic information board apparatus 14 preferably add identification information, such as a time stamp, to the name of the updated attachment file.

"Organizer User" and "Expected Attendee": The electronic information board apparatus 14 sets each participant and the organizer set in the participant management information 900 at the end of the conference. At this time, based on the user information list (see FIG. 7) and the external service setting information list (see FIG. 8), the electronic information board apparatus 14 converts the user ID set in the participant management information 900 into the user ID of the external service for each participant and the organizer to set the external service user ID.

After the conference is completed, this allows a user to confirm the schedule information of the actually-held conference (e.g., conference name, location, start time, end time, participant, organizer, and attachment file) from the schedule information remaining in the schedule service 42.

(Conference Setting Screen)

Figures 27, 28:
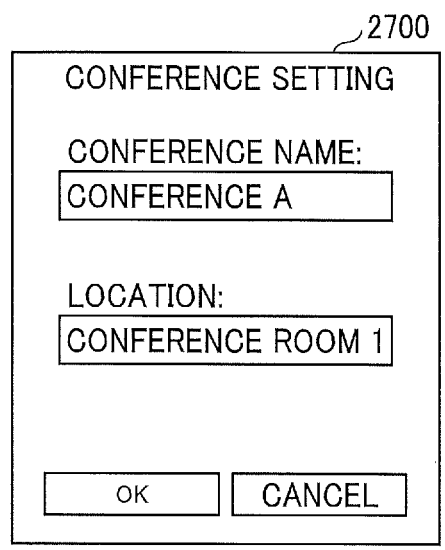
FIG. 27 illustrates an example of a conference setting screen displayed on an electronic information board apparatus according to an embodiment.
FIG. 28 is a modification of the conference management information using an electronic information board apparatus according to an embodiment.

FIG. 27 is an example of a conference setting screen displayed on the electronic information board apparatus 14. The electronic information board apparatus 14 displays a conference setting screen 2700 (FIG. 27) when the conference name is not set in the conference management information 1000 in the "conference end processing." As illustrated in FIG. 27, a conference name and a location can be set the conference setting screen 2700 using the electronic information board apparatus 14. For example, in an example case of FIG. 27, a conference name of "conference A" and a location of "conference room 1" are set on the conference setting screen 2700 using the electronic information board apparatus 14. As a result, the conference name of "conference A" and the location of "conference room 1" are set in the conference management information 1000 using the electronic information board apparatus 14.

(Modification of Conference Management Information)

FIG. 28 is a modification example of the conference management information 1000 using the electronic information board apparatus 14. FIG. 28(*a*) is the conference management information 1000 prior to the setting of conference name of "conference A" and location of "conference room 1" on the conference setting screen 2700, and FIG. 28(*b*) is the conference management information 1000 after setting the conference name of "conference A" and the location of "conference room 1" on the conference setting screen 2700.

(Sequence of Acquisition and Setting of Schedule information)

Figure 29:
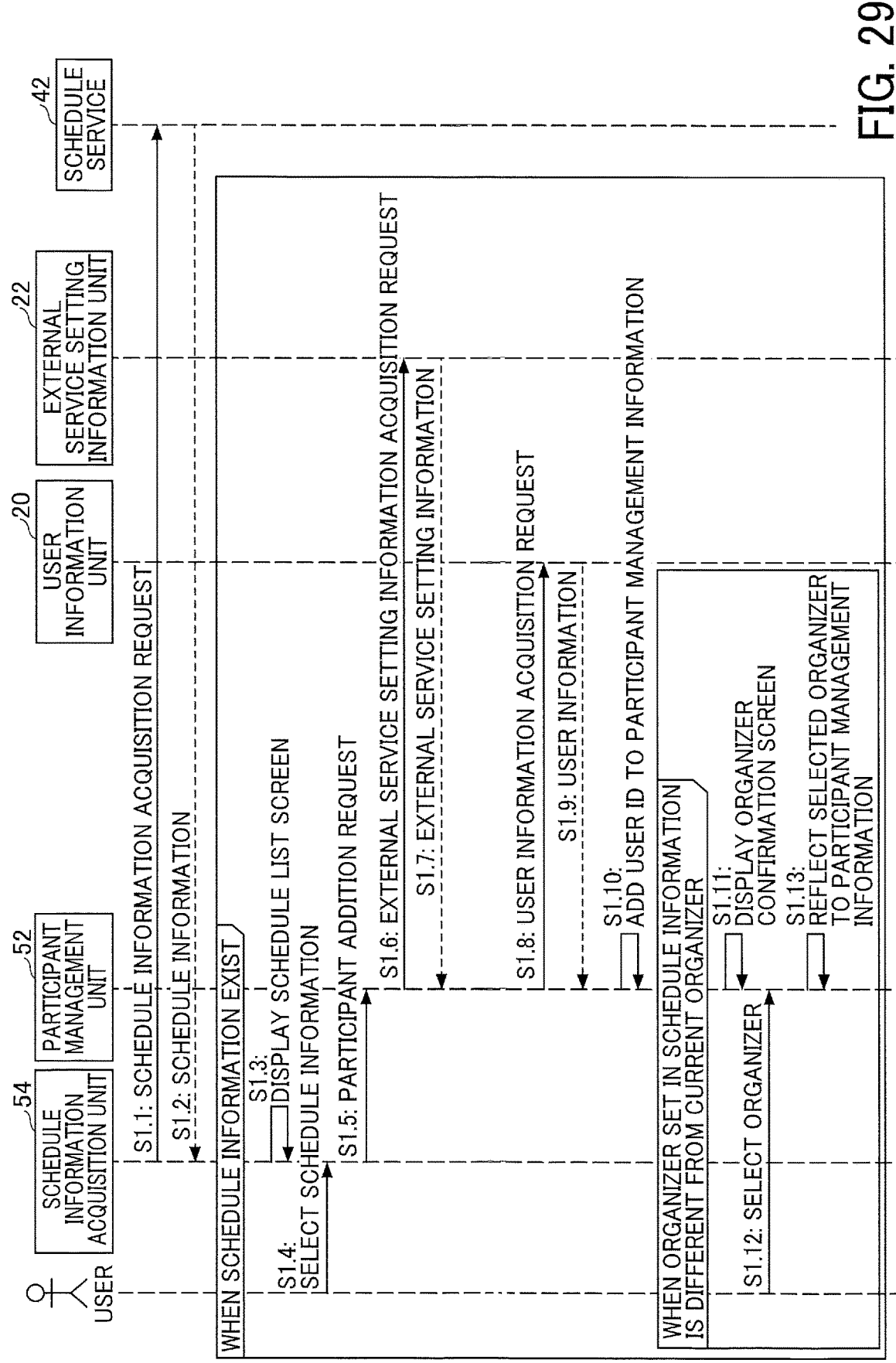
FIG. 29 is a sequence diagram of acquiring and setting scheduling information using an electronic information board apparatus according to an embodiment.

FIG. 29 is a sequence diagram of the acquisition and setting processing of the schedule information using the electronic information board apparatus 14.

At first, the schedule information acquisition unit 54 transmits a schedule information acquisition request to the schedule service 42 (step S1.1). When requesting the acquisition of the schedule information, the schedule information acquisition unit 54 uses an authentication token of the participant for the external service setting information, acquired by the participant management unit 52 at the time of authentication of the participant.

Then, in response to the request for acquiring the schedule information, the schedule service 42 transmits the schedule information corresponding to the first participant to the schedule information acquisition unit 54 (step S1.2).

If the schedule information corresponding to the first participant exists, the schedule information acquisition unit 54 causes the display to display a schedule list screen on the display (step S1.3).

When the user selects any schedule information from the schedule list screen (step S1.4), the schedule information acquisition unit 54 transmits a participant addition request (execution request of participant management information setting processing) to the participant management unit 52 (step S1.5).

In response to this request, the participant management unit 52 transmits an external service setting information acquisition request to the external service setting information unit 22 (step S1.6).

Then, in response to the external service setting information acquisition request, the external service setting information unit 22 transmits the external service setting information of each participant set in the schedule information to the participant management unit 52 (step S1.7).

Then, the participant management unit 52 transmits, to the user information unit 20, a request to acquire the user information of the unregistered participant, excluding the first participant, among the participants set in the schedule information (step S1.8).

Then, in response to the user information acquisition request, the user information unit 20 transmits the user information of each unregistered participant to the participant management unit 52 (step S1.9).

Then, the participant management unit 52 acquires the user ID of each unregistered participant from the user information of each unregistered participant, and adds the user ID of each unregistered participant to the participant management information 900 (step S1.10). This allows the first participant (the organizer at this timing) to add other participant of the conference to the participant management information 900 without the duplication of the participants, and to add other participants to a participant list and display the participant list on the operation panel 1400 (see FIG. 41).

If the organizer set in the schedule information is different from the first participant, the participant management unit 52 causes the display 280 to display the organizer confirmation screen (step S1.11).

Then, when the user selects any organizer from the organizer confirmation screen (step S1.12), the participant management unit 52 reflects the selection of organizer to the participant management information 900 (step S1.13).

(Sequence of Conference End Processing)

Figure 30:
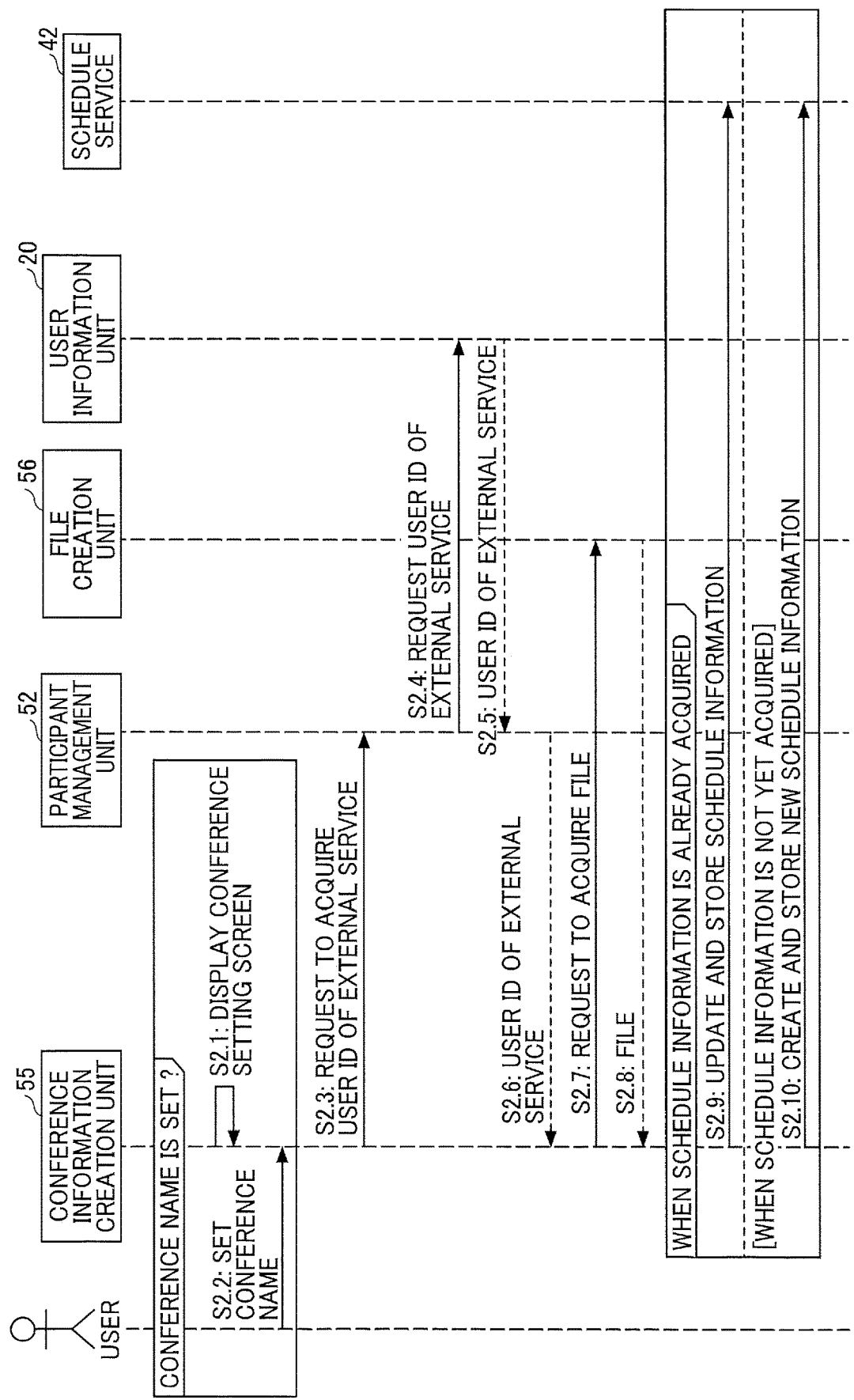
FIG. 30 is a sequence diagram of a conference end processing using an electronic information board apparatus according to an embodiment.

FIG. 30 is a sequence diagram of the conference end processing using the electronic information board apparatus 14.

At first, the conference information creation unit 55 determines whether or not a conference name is set in the conference management information 1000. If the conference information creation unit 55 determines that the conference name is not yet set in the conference management information 1000, the conference information creation unit 55 displays the conference setting screen (step S2.1) and demands a user to set a conference name (step S2.2).

Then, the conference information creation unit 55 requests the participant management unit 52 to acquire the user ID of the external service of each participant set in the participant management information 900 (step S2.3).

The participant management unit 52 requests the user information unit 20 to acquire the user ID of the external service of each participant (step S2.4).

In response to this request, the user information unit 20 converts the user ID of each participant into the user ID of the external service, and then transmits the user ID of the external service of each participant to the participant management unit 52 (step S2.5).

Then, the participant management unit 52 transmits the user ID of the external service of each participant to the conference information creation unit 55 (step S2.6).

Then, the conference information creation unit 55 transmits, to the file creation unit 56, a request to acquire a file of content written to the electronic information board apparatus 14 or a file of content displayed on the electronic information board apparatus 14 (step S2.7).

In response to the request, the file creation unit 56 transmits, to the conference information creation unit 55, the file of the content written to the electronic information board apparatus 14 or the file of content displayed on the electronic information board apparatus 14 (step S2.8).

Then, the conference information creation unit 55 or the schedule information acquisition unit 54 determines whether or not the schedule information is already acquired from the schedule service 42.

If the conference information creation unit 55 determines that the schedule information is already acquired from the schedule service 42, the conference information creation unit 55 updates the acquired schedule information with the content of the conference management information 1000 at the end of the conference, and saves or stores the updated schedule information in the schedule service 42 via the storage unit 58 (step S2.9).

On the other hand, if the conference information creation unit 55 determines that the schedule information is not yet acquired, the conference information creation unit 55 creates new schedule information using content in the conference management information 1000 at the end of the conference, and saves or stores the created new schedule information to the schedule service 42 via the storage unit 58 using an authentication token of the external service setting information of any one of the participants (step S2.10). As another example of each of processing, the same processing described with reference to FIG. 26 can be applied.

(Participant Exit Processing using Electronic Information Board Apparatus)

Hereinafter, a description is given of a participant exit processing using the electronic information board apparatus 14 with reference to FIGS. 31 and 32. During the conference, the electronic information board apparatus 14 can exit any participant from the conference by a user operation.

Figure 31:
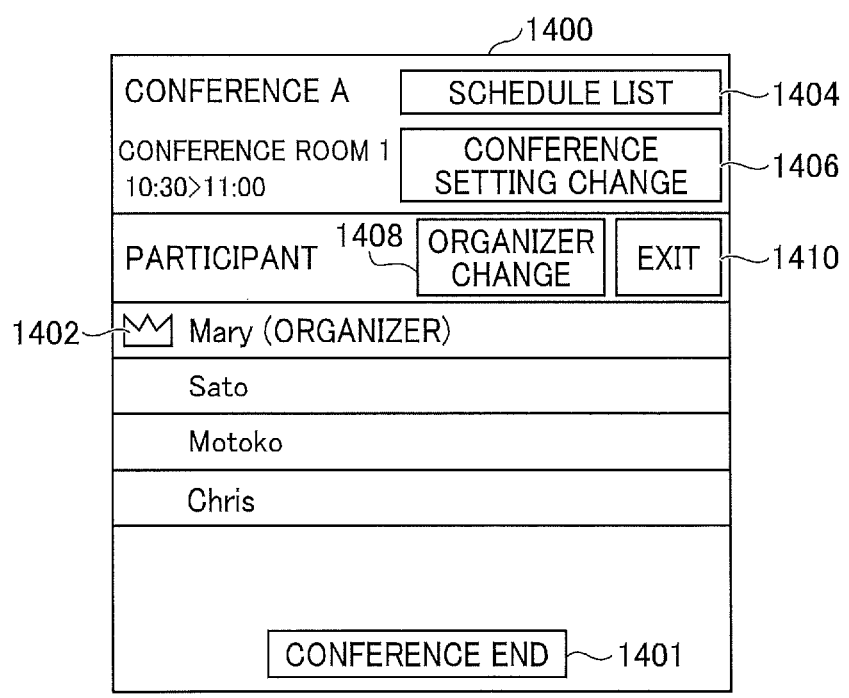
FIG. 31 illustrates an example of an operational panel displayed on an electronic information board apparatus according to an embodiment.

FIG. 31 is an example of an operation panel displayed on the electronic information board apparatus 14. In FIG. 31, an exit button 1410 is further displayed on the operation panel 1400. At the electronic information board apparatus 14, when the exit button 1410 is pressed by a user, the participant exit screen 3200 illustrated in FIG. 32 is displayed.

Figure 32:
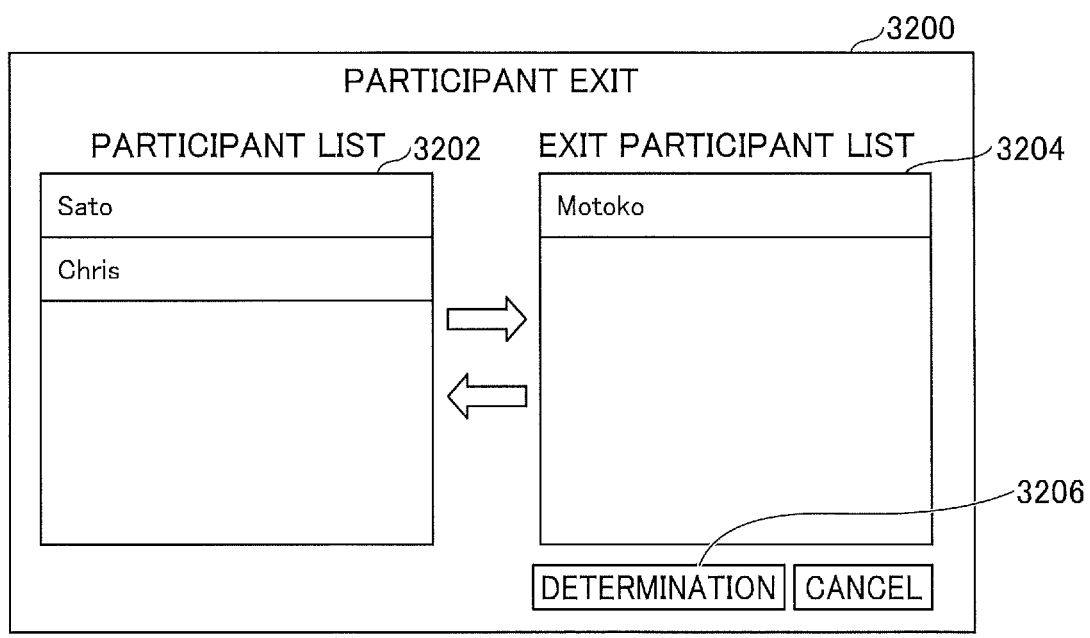
FIG. 32 illustrates an example of a participant exit screen displayed on an electronic information board apparatus according to an embodiment.

FIG. 32 is an example of a participant exit screen displayed on the electronic information board apparatus 14. As illustrated in FIG. 32, the participant exit screen 3200 includes, for example, a participant list 3202, an exit participant list 3204, and a determination button 3206. In the initial state, all participants other than the organizer are displayed in the participant list 3202. When a user is selected from the participant list 3202, the selected user moves to the exit participant list 3204. Further, when the user on the exit participant list 3204 is selected, the selected user moves to the participant list 3202. When the determination button 3206 is pressed, the participant exit screen 3200 is closed, and the user on the exit participant list 3204 is deleted from the participant management information list.

(Login Processing by User ID or Mail Address Using Electronic Information Board Apparatus)

Hereinafter, a description is given of a login processing using the electronic information board apparatus 14 and the user ID or mail address with reference to FIGS. 33 to 35. The electronic information board apparatus 14 may also allow the participant to log in by inputting the user ID or email address and password by the participant.

Figure 33:
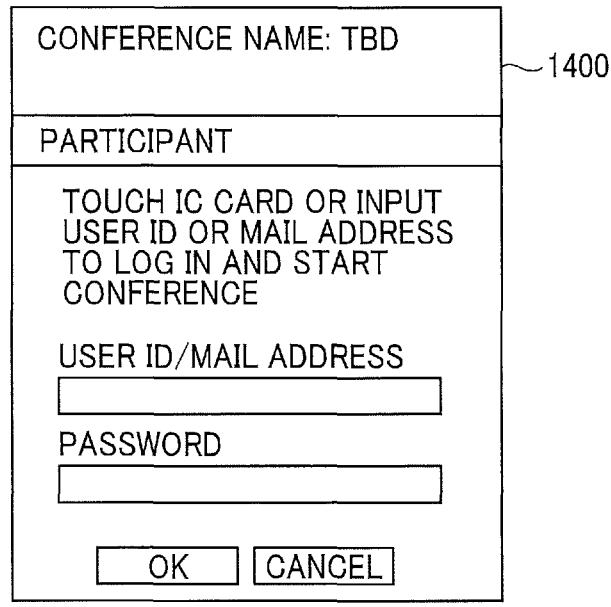
FIG. 33 illustrates an example of an operational panel displayed on an electronic information board apparatus according to an embodiment.

FIG. 33 is an example of an operation panel displayed on the electronic information board apparatus 14. The operation panel 1400 illustrated in FIG. 33 is displayed when the first participant does not logs in, and the operation panel 1400 illustrated in FIG. 33 is a modification of the operation panel 1400 illustrated in FIG. 14. The operation panel 1400 illustrated in FIG. 33 displays an input field of user ID or mail address and an input field of password. The first participant can log in to the electronic information board apparatus 14 by inputting the user ID or mail address and the password to the operation panel 1400 illustrated in FIG. 33.

Figure 34:
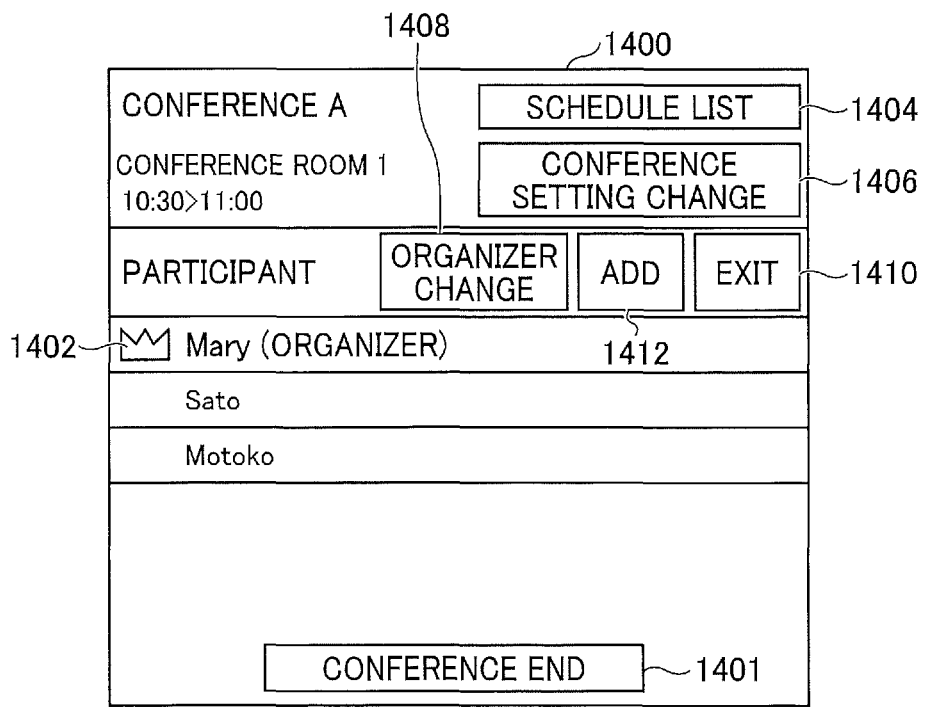
FIG. 34 illustrates an example of an operational panel displayed on an electronic information board apparatus according to an embodiment.

FIG. 34 is an example of an operation panel displayed on the electronic information board apparatus 14. The operation panel 1400 illustrated in FIG. 34 is displayed when one or more participants in the log-in state. As to the electronic information board apparatus 14, the operation panel 1400 illustrated in FIG. 34 further displays an add button 1412. When the add button 1412 is pressed by a user, the electronic information board apparatus 14 can display a participant addition screen 3500 illustrated in FIG. 35.

Figure 35:
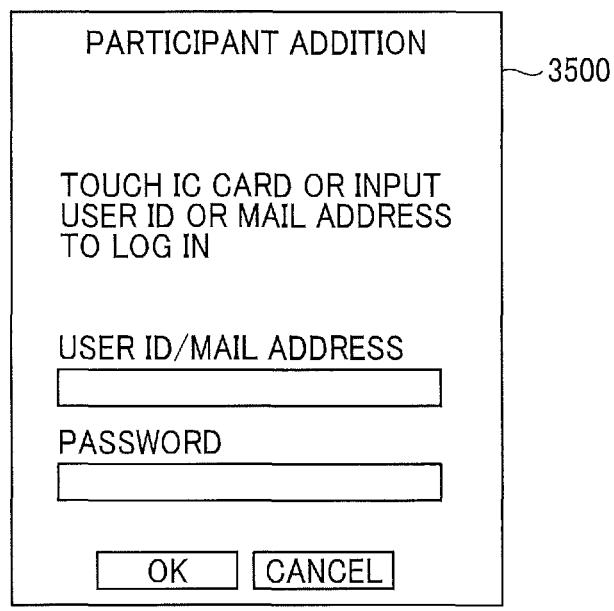
FIG. 35 illustrates an example of a participant addition screen displayed on an electronic information board apparatus according to an embodiment.

FIG. 35 is an example of the participant addition screen 3500 displayed on the electronic information board apparatus 14. As illustrated in FIG. 35, the participant addition screen 3500 display an input field of user ID or mail address and an input field of password. The second and subsequent participants can log in to the electronic information board apparatus 14 by inputting the user ID or the mail address and the password to the participant addition screen 3500 (FIG. 35).

Figure 36:
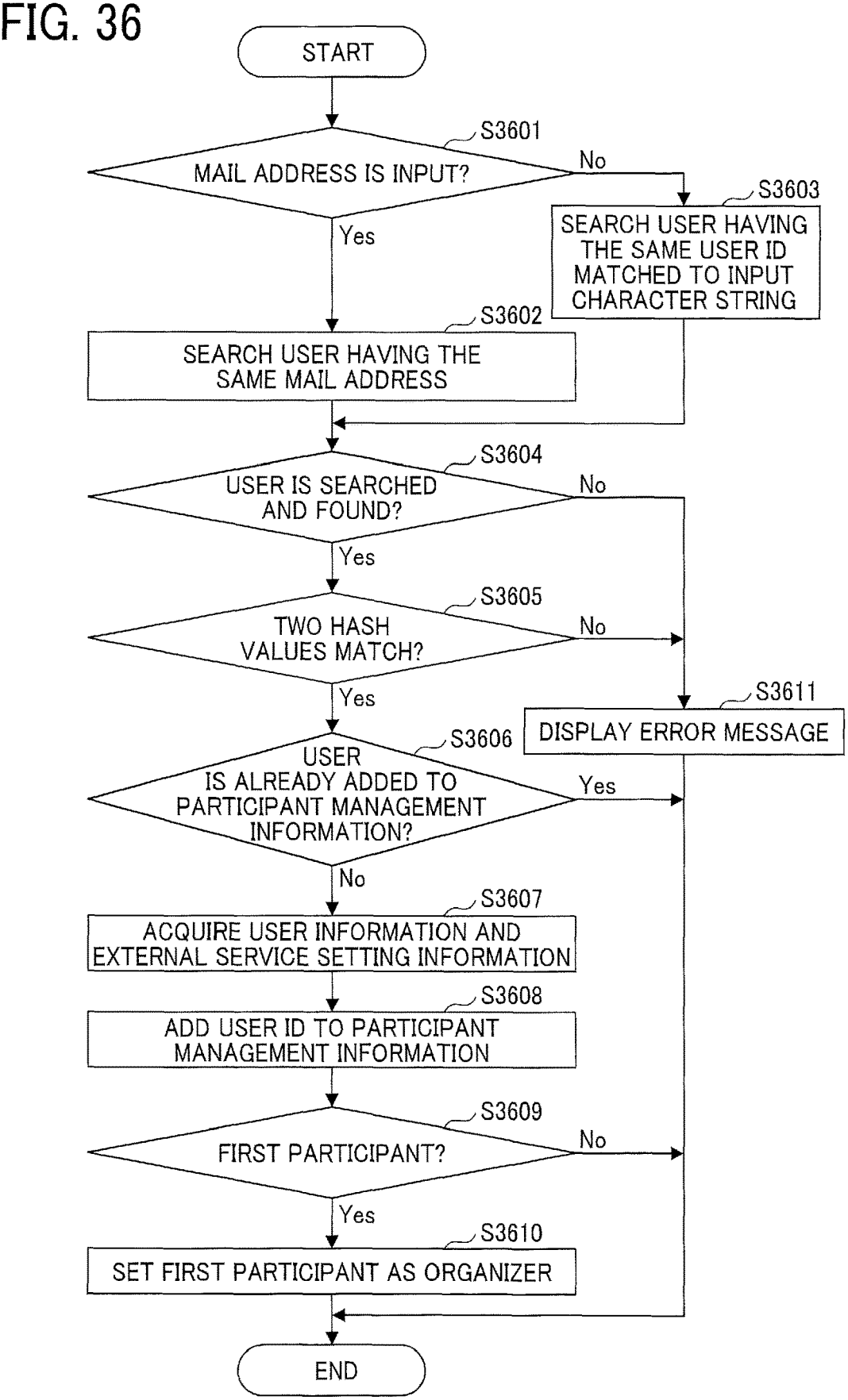
FIG. 36 is a flow chart illustrating a procedure of user authentication processing using an electronic information board apparatus according to an embodiment.

FIG. 36 is a flow chart illustrating a procedure of the user authentication processing using the electronic information board apparatus 14 (the participant management unit 52). Hereinafter, in place of the user information list illustrated in FIG. 7, it is assumed that user information list illustrated in FIG. 37 is stored in the user information server 10. FIG. 37 is another example of the user information list stored in the user information server 10. The user information list illustrated in FIG. 37 further includes, for example, a hash value of password.

At first, the participant management unit 52 determines whether or not an e-mail address is input to the operation panel 1400 (see FIG. 33) or the participant addition screen 3500 (see FIG. 35) (step S3601).

When the participant management unit 52 determines in step S3601 that the mail address is input (step S3601: Yes), the participant management unit 52 searches a user who has the same mail address as the mail address input to the participant addition screen 3500 from the user information list (step S3602).

On the other hand, when the participant management unit 52 determines in step S3601 that no mail address is input (step S3601: No), the participant management unit 52 searches a user who has the same user ID having the input character string from the user information list (step S3603).

Then, the participant management unit 52 determines whether or not the concerned user is searched and found in step S3602 or step S3603 (step S3604).

If the participant management unit 52 determines in step S3604 that the user is not found (step S3604: No), the participant addition screen 3500 displays an error message (step S3611), and then the sequence of FIG. 36 is terminated.

On the other hand, if the participant management unit 52 determines in step S3604 that the user is searched and found (step S3604: Yes), the participant management unit 52 determines whether a hash value of the input password matches a hash value of password set in the user information list (see FIG. 37) (step S3605).

If the participant management unit 52 determines in step S3605 that the two hash values do not match (step S3605: No), the participant addition screen 3500 displays an error message (step S3611), and then the sequence of FIG. 36 is terminated.

On the other hand, if the participant management unit 52 determines in step S3605 that the two hash values match (step S3605: Yes), the participant management unit 52 determines whether or not the user is already added to the participant management information 900 (step S3606).

If the participant management unit 52 determines in step S3606 that the user is already added to the participant management information 900 (step S3606: Yes), the sequence of FIG. 36 is terminated.

On the other hand, if the participant management unit 52 determines in step S3606 that the user is not yet added to the participant management information 900 (step S3606: No), the participant management unit 52 acquires the user information of the user and the external service setting information of the concerned user respectively from the user information unit 20 and the external service setting information unit 22 of the user information server 10 (step S3607).

Then, the participant management unit 52 adds the user ID of the acquired user information to the participant management information 900 (step S3608).

If the added user ID is the user ID of the first participant (step S3609: Yes), the participant management unit 52 sets the first participant as the organizer to the participant management information 900 (step S3610). Then, the electronic information board apparatus 14 terminates or ends the sequence of FIG. 36.

(Mail Transmission Processing using Electronic Information Board Apparatus)

Figure 38:
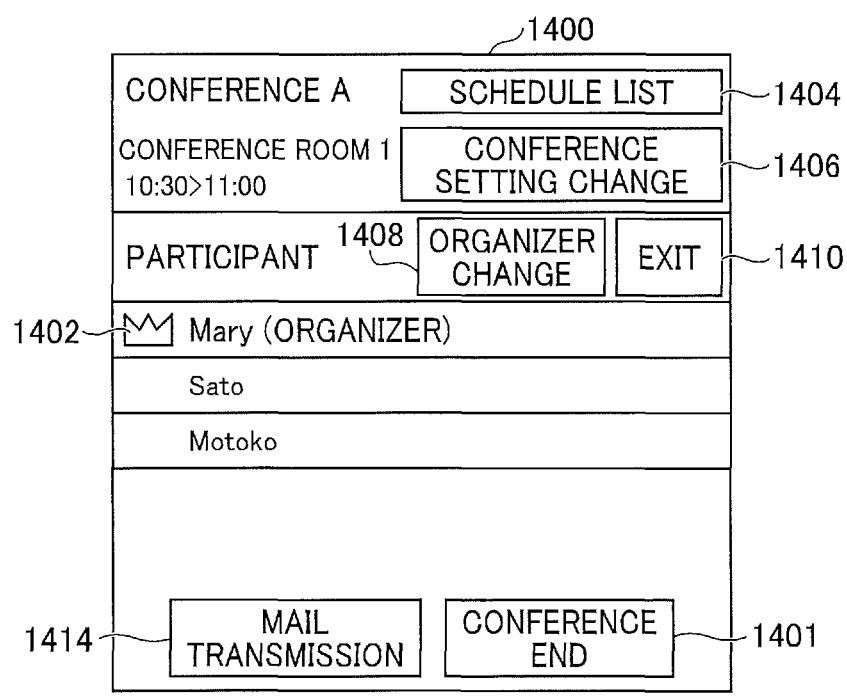
FIG. 38 illustrates an example of an operational panel displayed on an electronic information board apparatus according to an embodiment.

Hereinafter, a description is given of a mail transmission processing using the electronic information board apparatus 14 with reference to FIGS. 38 and 39. During the conference, the electronic information board apparatus 14 can transmit a file of content written or displayed on the electronic information board apparatus 14 to any participant using an e-mail FIG. 38 is an example of an operation panel displayed on the electronic information board apparatus 14. In FIG. 38, a mail transmission button 1414 is further displayed on the operation panel 1400. When the mail transmission button 1414 is pressed by a user, the electronic information board apparatus 14 can display a mail transmission screen 3900 illustrated in FIG. 39.

Figure 39:
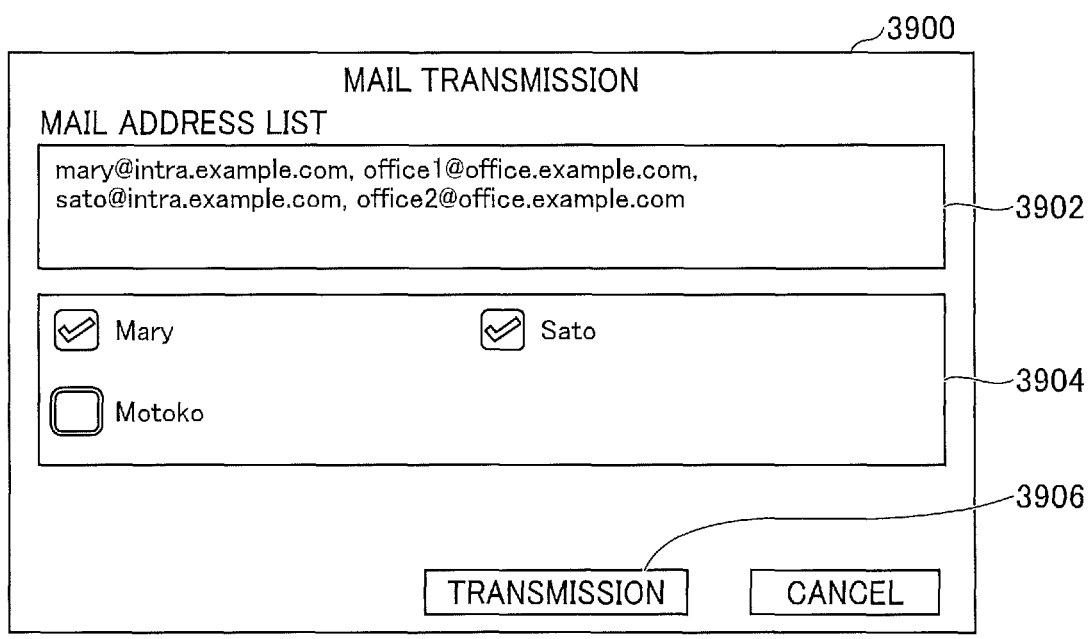
FIG. 39 is an example of a mail transmission screen displayed on an electronic information board apparatus according to an embodiment.

FIG. 39 is an example of the mail transmission screen 3900 displayed on the electronic information board apparatus 14. As illustrated in FIG. 39, the mail transmission screen 3900 includes, for example, a mail address list 3902 and a participant name list 3904. In the initial state, check boxes of all of the participants set in the participant name list 3904 after performing the participant change processing in step S1306 becomes the selected state. Accordingly, the mail address list 3902 displays the mail addresses of all of the participants.

Further, all of the participants before performing the participant change processing can be displayed on the participant name list 3904 as the selectable participants. For example, the participant name list 3904 of the initial state displays the participant check box after performing the participant change processing as the selected state (the selected state is indicated by the check mark), and displays the participant selected as the user who has left when the participant change process is performed in the state that the check box mark has been removed (unselected state).

As to the participant name list 3904, when the check box of one participant becomes a non-selected state, the mail address of the one participant is not displayed in the mail address list 3902. When a transmission button 3906 on the mail transmission screen 3900 is pressed by a user, the file transmission unit 59 transmits the file acquired from the file creation unit 56 to each mail address list displayed in the mail address list 3902 as an attachment file.

(Screen Transition in Electronic Information Board Apparatus)

Hereinafter, a description is given of examples of screen transition of the electronic information board apparatus 14 with reference to FIGS. 40 to 44.

(Screen Transition: Example 1)

Figure 40:
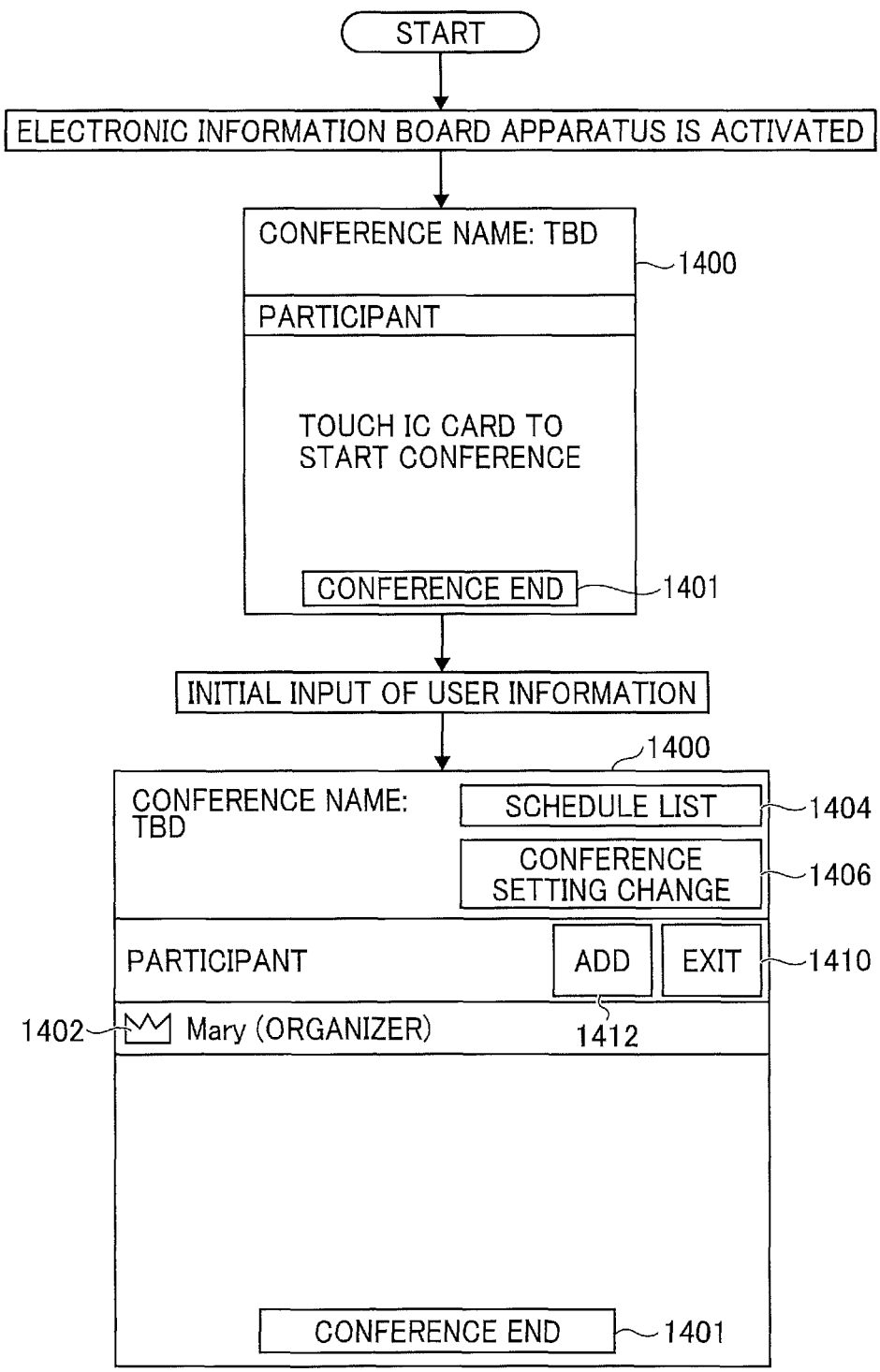
FIG. 40 is example 1 of screen transition on an electronic information board apparatus according to an embodiment.

FIG. 40 is example 1 of screen transition at the electronic information board apparatus 14. FIG. 40 illustrates a screen transition when the first participant of a conference logs in.

In example 1 of screen transition illustrated in FIG. 40, when the electronic information board apparatus 14 is activated (or return from an energy saving mode, or an application is activated), the operation panel 1400 is displayed. At this point, since no participants log in, and the conference name and participant are not determined, the operation panel 1400 does not display the conference name and the participant.

Then, when the first participant logs in the electronic information board apparatus 14, the electronic information board apparatus 14 displays the first participant is on the operation panel 1400. At this time, the icon 1402 indicating that the first participant is the organizer, and the character string of "organizer" are displayed on the operation panel 1400. With this displaying, the user can easily recognize that the first participant is the organizer.

(Screen Transition: Example 2)

Figure 41:
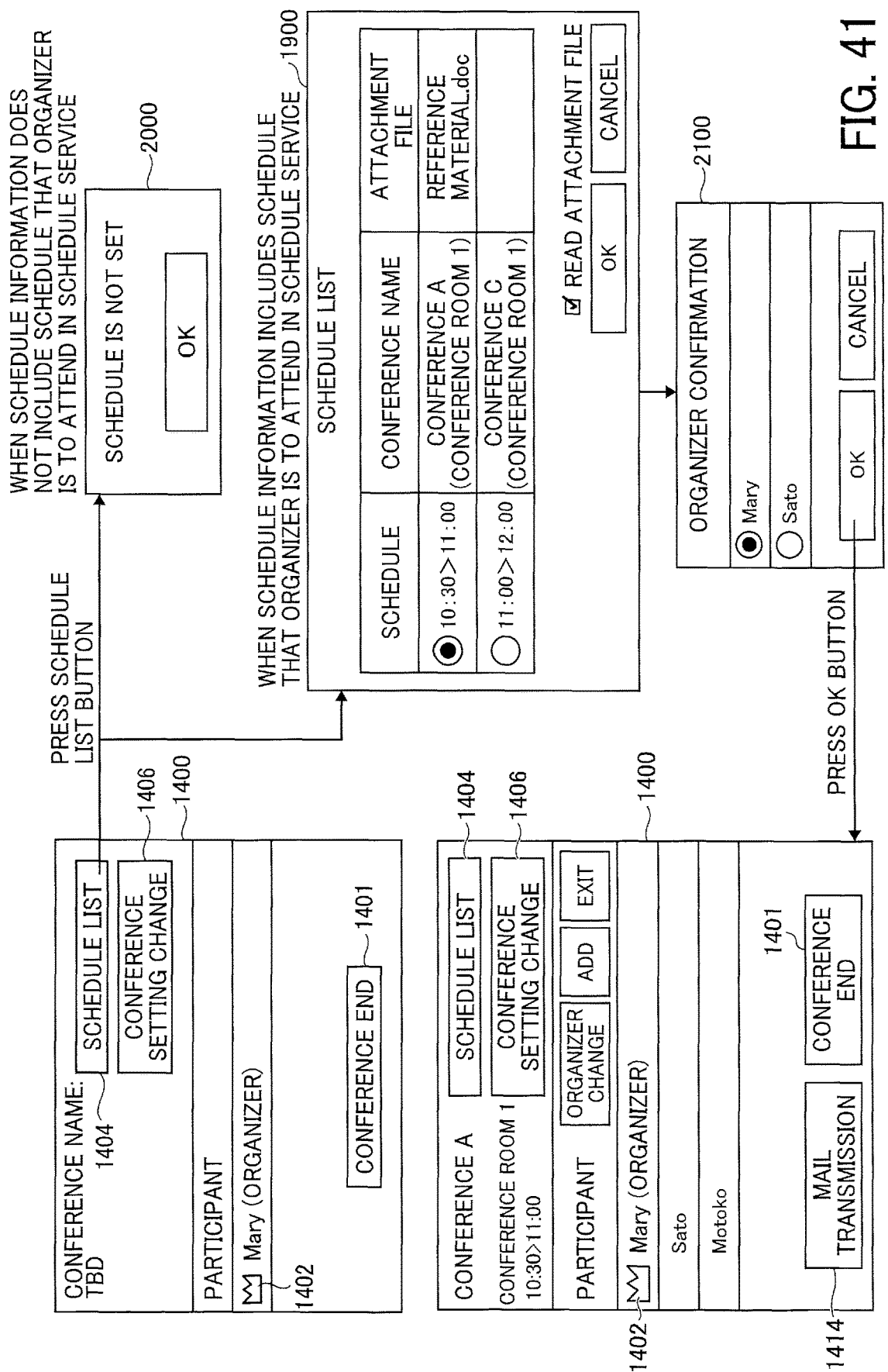
FIG. 41 is example 2 of screen transition on an electronic information board apparatus according to an embodiment.

FIG. 41 is example 2 of screen transition at the electronic information board apparatus 14. FIG. 41 illustrates a screen transition when automatically determining other participant of a conference from the schedule information after the first participant of the conference logs in.

In example 2 of screen transition illustrated in FIG. 41, when the schedule list button 1404 on the operation panel 1400 is pressed, the electronic information board apparatus 14 searches or retrieves the schedule information including the first participant (organizer) as the expected attendee from the schedule service 42 of the external service group system 12.

If one or more schedule information are acquired from the schedule service 42 of the external service group system 12, the electronic information board apparatus 14 displays the schedule list screen 1900 displaying the acquired one or more scheduled schedule information as options. Even if a plurality of participants already logs in the electronic information board apparatus 14, the electronic information board apparatus 14 acquires and displays the schedule information of the organizer alone. However, the displaying is not limited to this. For example, the electronic information board apparatus 14 can instruct a user to select any one of a plurality of participants to acquire and display the schedule information of the selected participant.

Further, for example, the electronic information board apparatus 14 can acquire and display the schedule information of each one of the plurality of participants.

Further, for example, the electronic information board apparatus 14 can automatically acquire and display the schedule information of the first participant at the timing when the schedule list button 1404 is pressed by the first participant or when the first participant logs in the electronic information board apparatus 14.

On the other hand, if the schedule information corresponding to the first participant (organizer) does not exist in the schedule service 42, the electronic information board apparatus 14 displays the message 2000 indicating that the schedule information does not exist.

When any of the schedule information is selected on the schedule list screen 1900 and then an OK button is selected, the electronic information board apparatus 14 displays the operation panel 1400 or the organizer confirmation screen 2100. The electronic information board apparatus 14 displays the organizer confirmation screen 2100 when the organizer set in the selected schedule information (e.g., the user who has created or registered the schedule before the conference) is different from the current organizer (the first participant). When the user selects the organizer set in the selected schedule information or the current organizer and then selects an OK button on the organizer confirmation screen 2100, the electronic information board apparatus 14 displays the operation panel 1400.

After the schedule information is selected by the user, the operation panel 1400 displays various information (e.g., conference name, start time, end time, and participant) included in the selected schedule information. In the operation panel 1400, the organizer is displayed at the top of the participant list, and the icons 1402 indicating the organizer is also displayed.

Further, the operation panel 1400 can display the time when the first participant logs in as the start time. Further, the operation panel 1400 can display the time when the conference end button 1401 is pressed as the end time.

Further, in a case when a participant is added and then the participant is added again by selecting the schedule using the schedule list button 1404, the operation panel 1400 can display the not-added participant at the bottom of the participant list by adding the not-added participant.

Further, the operation panel 1400 may be provided with a button to delete the participants from the participant list other than the organizer, and a button to return to the state before adding the participant.

(Screen Transition: Example 3)

Figure 42:
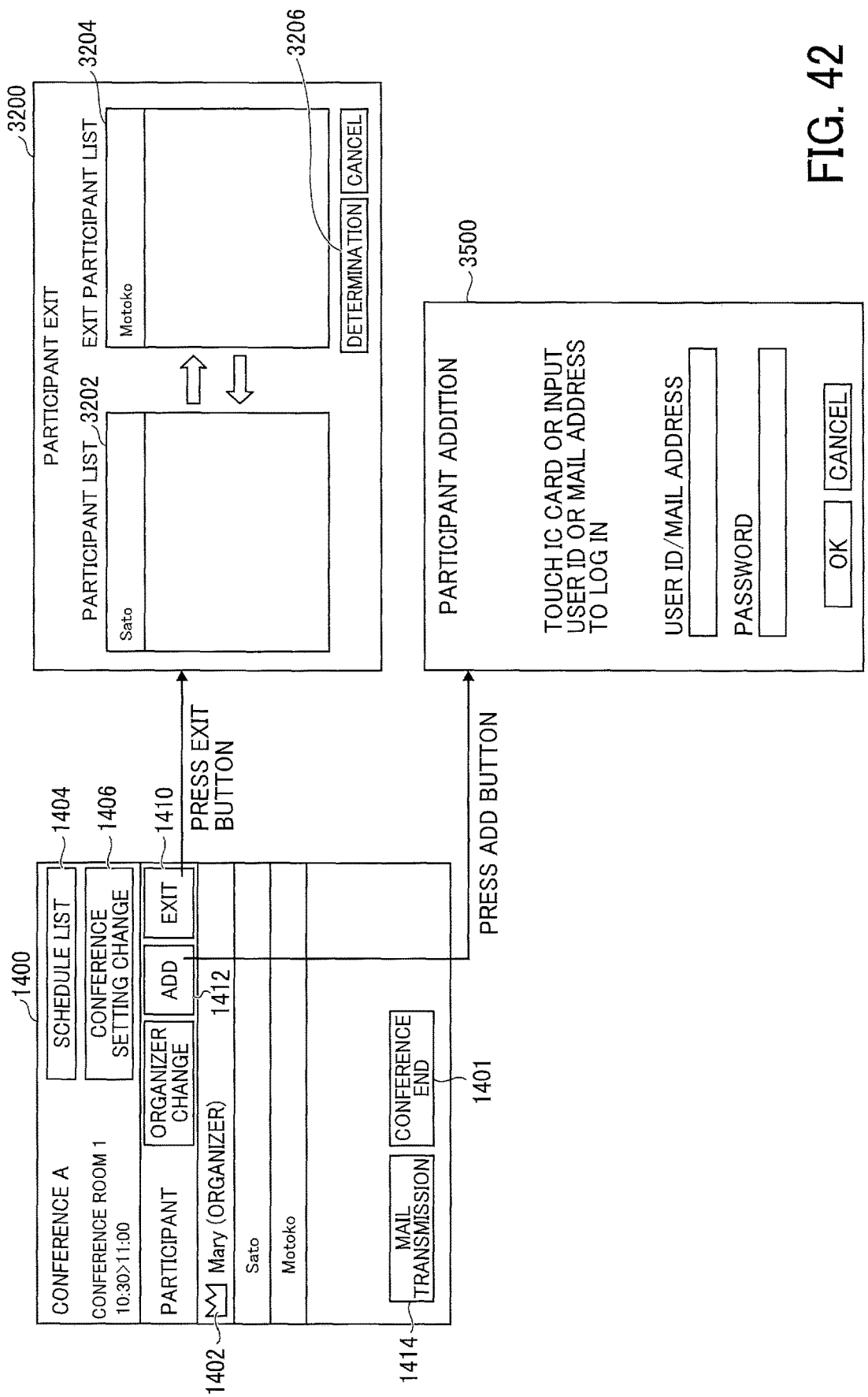
FIG. 42 is example 3 of screen transition on an electronic information board apparatus according to an embodiment.

FIG. 42 is example 3 of screen transition of the electronic info nation board apparatus 14. FIG. 42 illustrates a screen transition when inputting a participant manually to recognize the participant of other conference from information other than the schedule information. In example 3 of screen transition illustrated in FIG. 42, when the exit button 1410 is selected on the operation panel 1400, the electronic information board apparatus 14 displays the participant exit screen 3200. As described with reference to FIG. 32, any participant can be exited using the participant exit screen 3200.

On the other hand, when the add button 1412 is selected on the operation panel 1400, the electronic information board apparatus 14 displays the participant addition screen 3500. As described with reference to FIG. 35, the user can log in the electronic information board apparatus 14 by inputting the user ID, the mail address, and the password using the participant addition screen 3500. Alternatively, the user can log in the electronic information board apparatus 14 by holding the IC card 235 over the IC card reader 225 when the participant addition screen 3500 is displayed.

(Screen Transition: Example 4)

Figure 43:
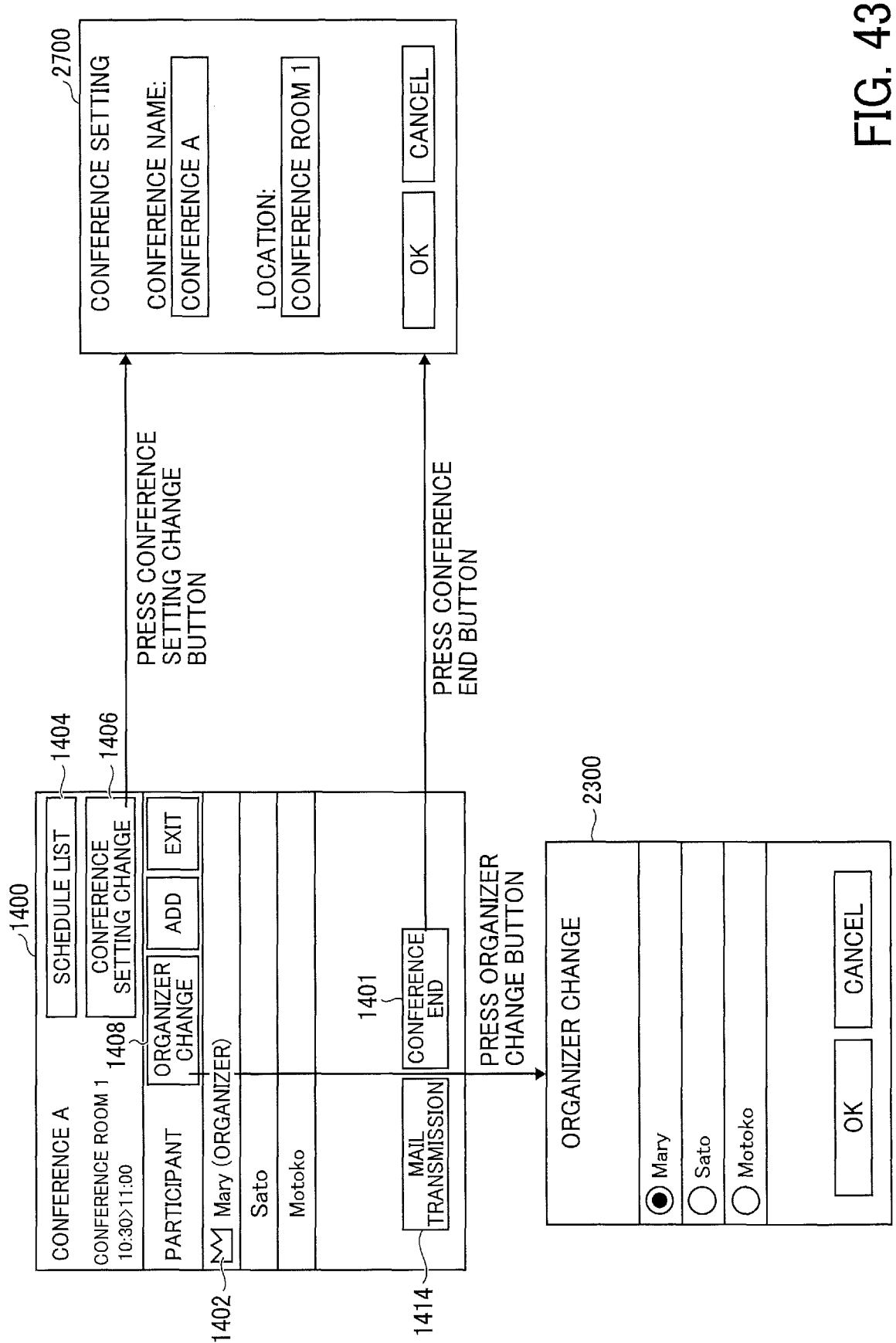
FIG. 43 is example 4 of screen transition on an electronic information board apparatus according to an embodiment.

FIG. 43 is example 4 of screen transition of the electronic information board apparatus 14. FIG. 43 illustrates a screen transition when inputting information such as a conference name and a location manually.

In example 4 of screen transition illustrated in FIG. 43, when the conference setting change button 1406 is selected on the operation panel 1400, the electronic information board apparatus 14 displays the conference setting screen 2700. In the conference setting screen 2700, one or both of the conference name and the location can be changed (if the schedule information has been already acquired) or one or both of the conference name and the location can be newly (if the schedule information is not acquired). The conference name and the location set on the conference setting screen 2700 are reflected to the operation panel 1400.

On the other hand, when the organizer change button 1408 is selected on the operation panel 1400, the electronic information board apparatus 14 displays the organizer change screen 2300. A user can select any participant as the organizer from the plurality of participants using the organizer change screen 2300. The organizer set on the organizer change screen 2300 is reflected to the operation panel 1400. That is, the operation panel 1400 displays the organizer set on the organizer change screen 2300 at the top of the participant list and the icon 1402 indicating the organizer.

(Screen Transition: Example 5)

Figure 44:
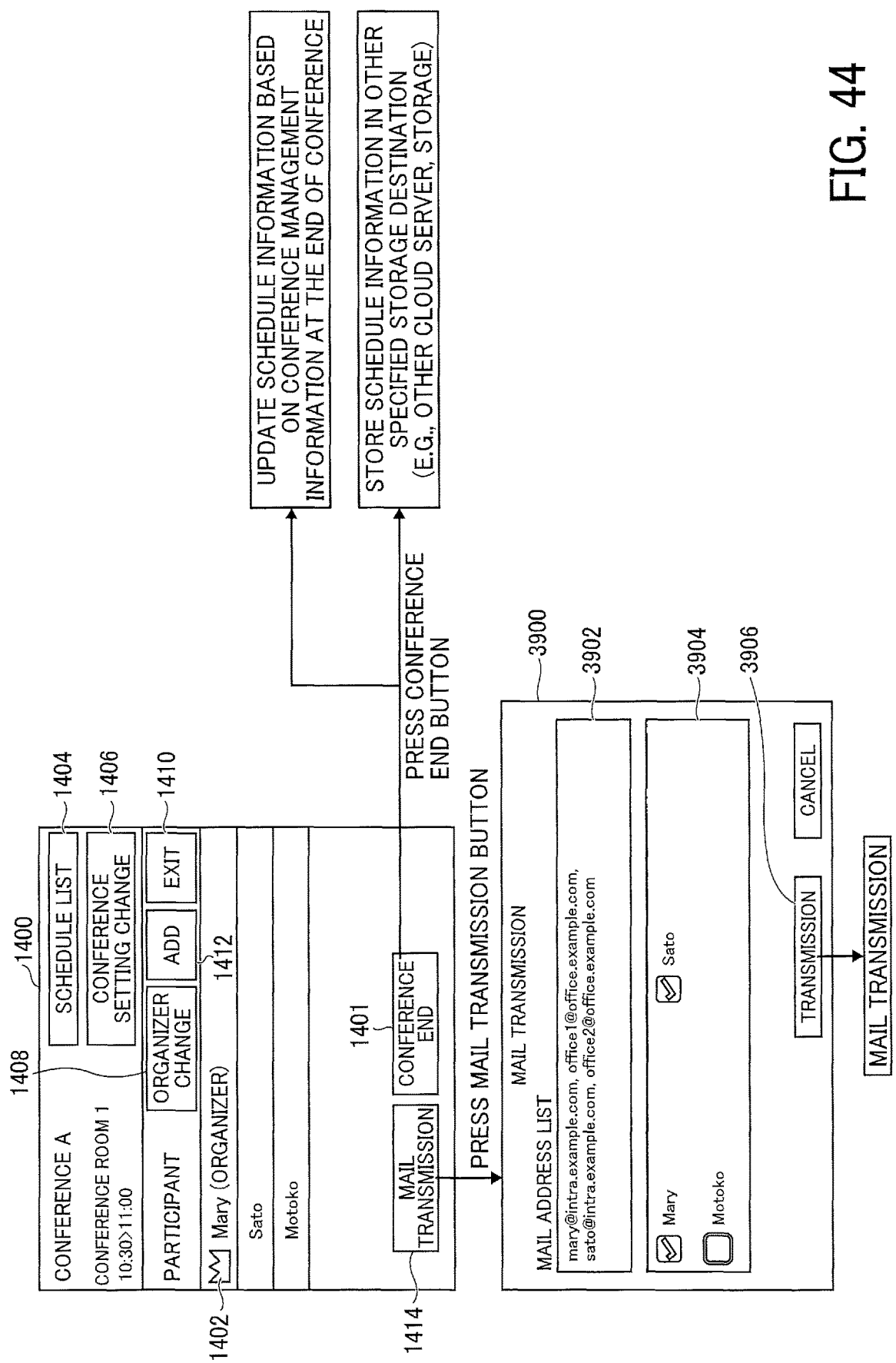
FIG. 44 is example 5 of screen transition in an electronic information board apparatus according to an embodiment.

FIG. 44 is example 5 of screen transition of the electronic information board apparatus 14. FIG. 44 illustrates a screen transition when a file is to be transmitted to each participant of a conference.

In example 5 of screen transition illustrated in FIG. 44, when the mail transmission button 1414 is selected on the operation panel 1400, the electronic information board apparatus 14 displays the mail transmission screen 3900 (FIG. 39). As to the mail transmission screen 3900, the file acquired from the file creation unit 56 can be transmitted to each mail address displayed in the mail address list 3902. The file represents the content written to the electronic information board apparatus 14. However, the mail transmission is not limited to thereto. For example, the user can select a file shared during the conference, a file acquired from a storage of an authenticated user, or other file as the file to be transmitted.

On the other hand, when the conference end button 1401 is selected on the operation panel 1400, the electronic information board apparatus 14 updates the original schedule information stored in the schedule service 42 based on the conference management information existing at the end of the conference. For example, if a user who is not set in the schedule information acquired from the schedule service 42 is added to the conference as a participant in the electronic information board apparatus 14, the electronic information board apparatus 14 adds the participant to the schedule information. Further, if the conference terminates or ends without acquiring the schedule information, the electronic information board apparatus 14 registers new schedule information in the schedule service 42 based on the conference management information existing at the end of the conference.

Further, the electronic information board apparatus 14 can store the schedule information in the schedule service 42, and also store the schedule information in other storage destination (e.g., other cloud server, storage) specified by the user. The screen transitions described above may be performed on one windows of the operation panel 1400.

Further, the electronic information board apparatus 14 may display another window when the button is pressed or selected to instruct the user by to perform an input operation.

(Displaying Attachment File using Electronic Information Board Apparatus)

Figure 45:
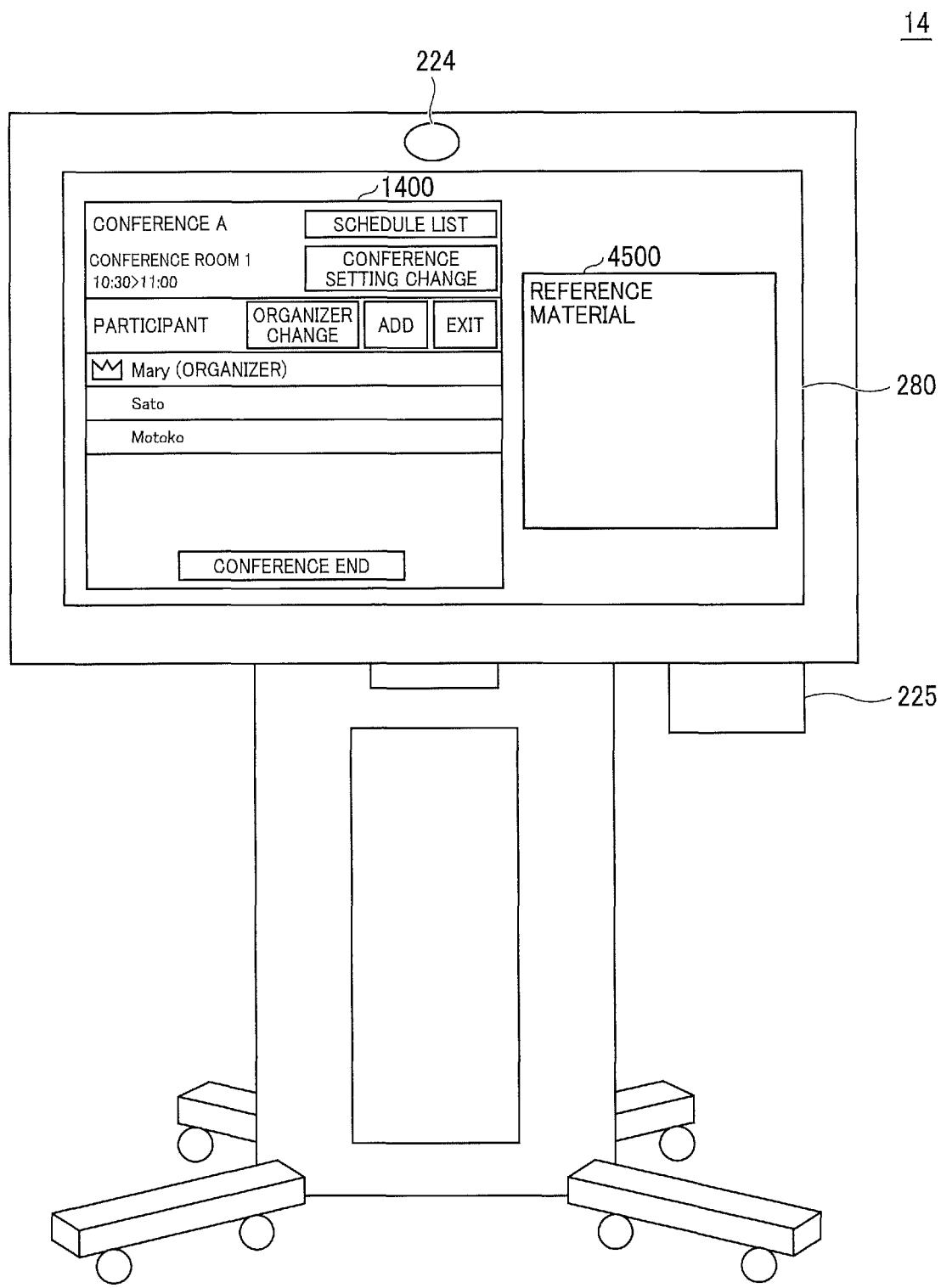
FIG. 45 is an example of display of an attachment file using an electronic information board apparatus according to an embodiment.

FIG. 45 is an example of a display of an attachment file using the electronic information board apparatus 14. In an example case of FIG. 45, an attachment 4500 is displayed with the operation panel 1400. For example, in the electronic information board apparatus 14, when the attachment file is selected to be read on the schedule list screen 1900 (FIG. 19), the schedule information selected by the user can be acquired, and an attachment file set in the acquired schedule information can be displayed on a separate window from the operation panel 1400 as illustrated in FIG. 45.

(Variation of Devices and Apparatuses)

The various devices and apparatuses configuring the conference information management system 1 may be any device and apparatus that can implement at least a part of the functions described in the embodiment. For example, the various devices and apparatuses configuring the conference information management system 1 may be any of a smart phone, a video conference terminal, or a projector having a hardware configuration illustrated in FIGS. 46 to 48, and may be a PC or a server having the hardware configuration illustrated in FIG. 2.

(Other Device: Smart Phone)

Figure 46:
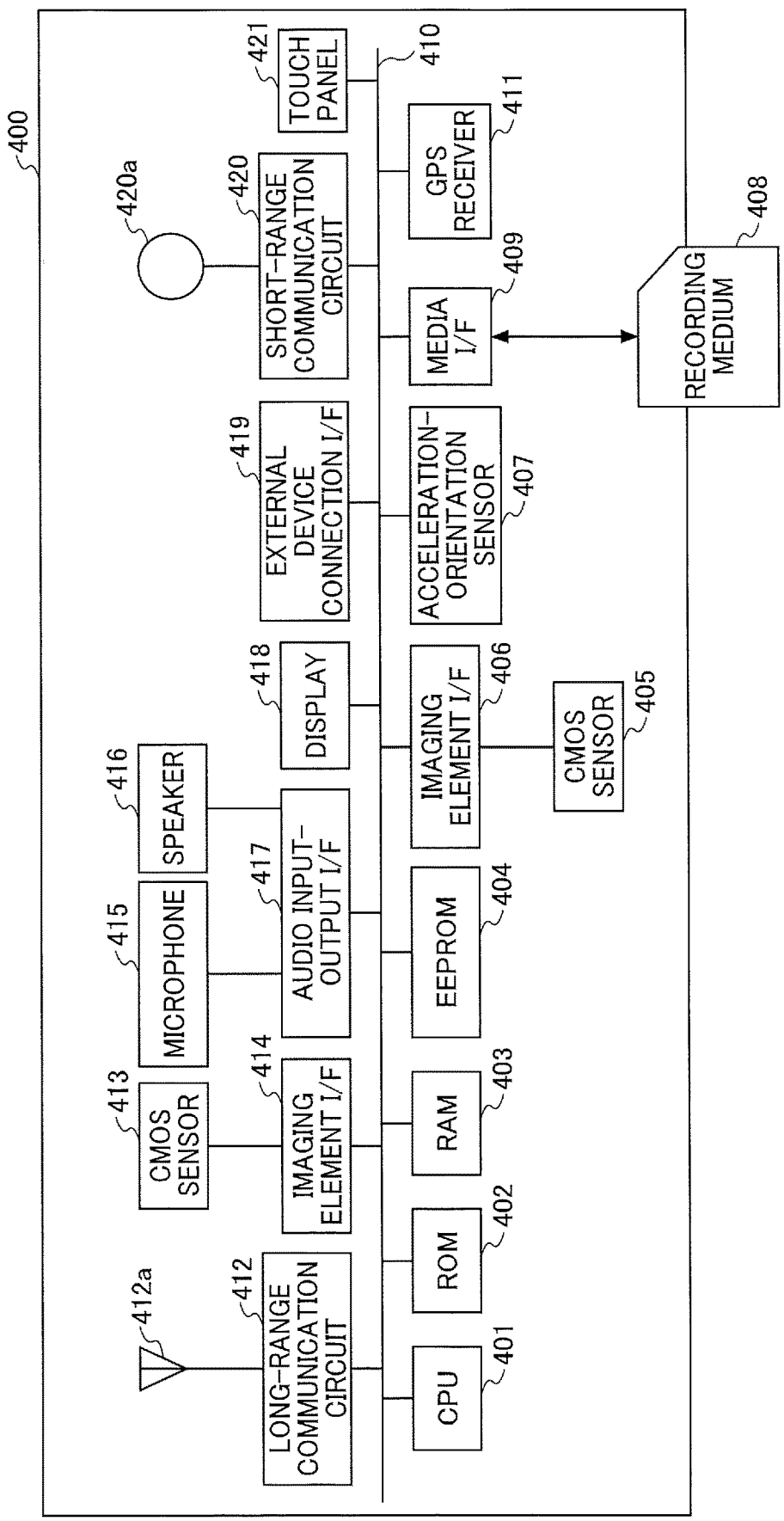
FIG. 46 is an example of a hardware block diagram of a smart phone, which is an example of various devices usable in a conference information management system according to an embodiment.

FIG. 46 is an example of a hardware block diagram of a smart phone 400, which is an example of various devices usable in the conference information management system 1. As illustrated in FIG. 46, the smart phone 400 includes, for example, a CPU 401, a ROM 402, a RAM 403, an electrically erasable programmable read-only memory (EEPROM) 404, a complementary metal oxide semiconductor (CMOS) sensor 405, an imaging element interface (I/F) 406, an acceleration-orientation sensor 407, a media I/F 409, and a global positioning system (GPS) receiver 411.

The CPU 401 controls the operation of the smart phone 400 entirely. The ROM 402 stores programs used for driving the CPU 401, such as initial program loader (IPL). The RAM 403 is used as a work area of the CPU 401 of the smart phone 400. Under the control of the CPU 401, the EEPROM 404 reads or writes various data, such as a program for smart phone. The CMOS sensor 405 is a type of built-in imaging means that captures images of objects, such as image of user, and acquires the image data under the control of the CPU 401. Further, the charge coupled device (CCD) sensor may be used an imaging means for the smart phone 400 instead of the CMOS sensor. The imaging element OF 406 is a circuit that controls the driving of the CMOS sensor 405. The acceleration-orientation sensor 407 includes various sensors, such as an electronic magnetic compass to detect the geomagnetism, a gyrocompass, and an acceleration sensor. The media I/F 409 controls reading and writing (storing) of data to a recording medium 408, such as flash memory. The GPS receiver 411 receives GPS signals from GPS satellites.

The smart phone 400 further includes, for example, a long-range communication circuit 412, a CMOS sensor 413, an imaging element I/F 414, a microphone 415, a speaker 416, an audio input-output interface (I/F) 417, a display 418, an external device connection I/F 419, a short-range communication circuit 420, an antenna 420*a* of the short-range communication circuit 420, and a touch panel 421. The long-range communication circuit 412 is a circuit that communicates with another device via a communication network.

The CMOS sensor 413 is a type of built-in imaging means for capturing images of objects and acquiring image data under the control of CPU 401. The imaging element I/F 414 is a circuit that controls the driving of the CMOS sensor 413.

The microphone 415 is a type of built-in circuit that converts audio signals into electrical signals. The speaker 416 is a type of built-in circuit that converts electrical signals into physical vibration to generates audio, such as music and voice. The audio input-output I/F 417 is a circuit that processes input and output of the audio signals with the microphone 415 and the speaker 416 under the control of the CPU 401.

The display 418 is a type of display means, such as liquid crystal and organic electro luminescence (OEL), which displays images of objects and various icons, or the like. The external device connection I/F 419 is an interface for connecting various external devices. The short-range communication circuit 420 is a communication circuit, such as near field communication (NFC) and Bluetooth (registered trademark). The touch panel 421 is a type of input means for operating the smart phone 400 by the user by pressing the display 418.

The smart phone 400 further includes, for example, a bus line 410. The bus line 410 is an address bus and a data bus for electrically connecting each of the components, such as the CPU 401 illustrated in FIG. 46.

(Other Device: Video Conference Terminal)

Figure 47:
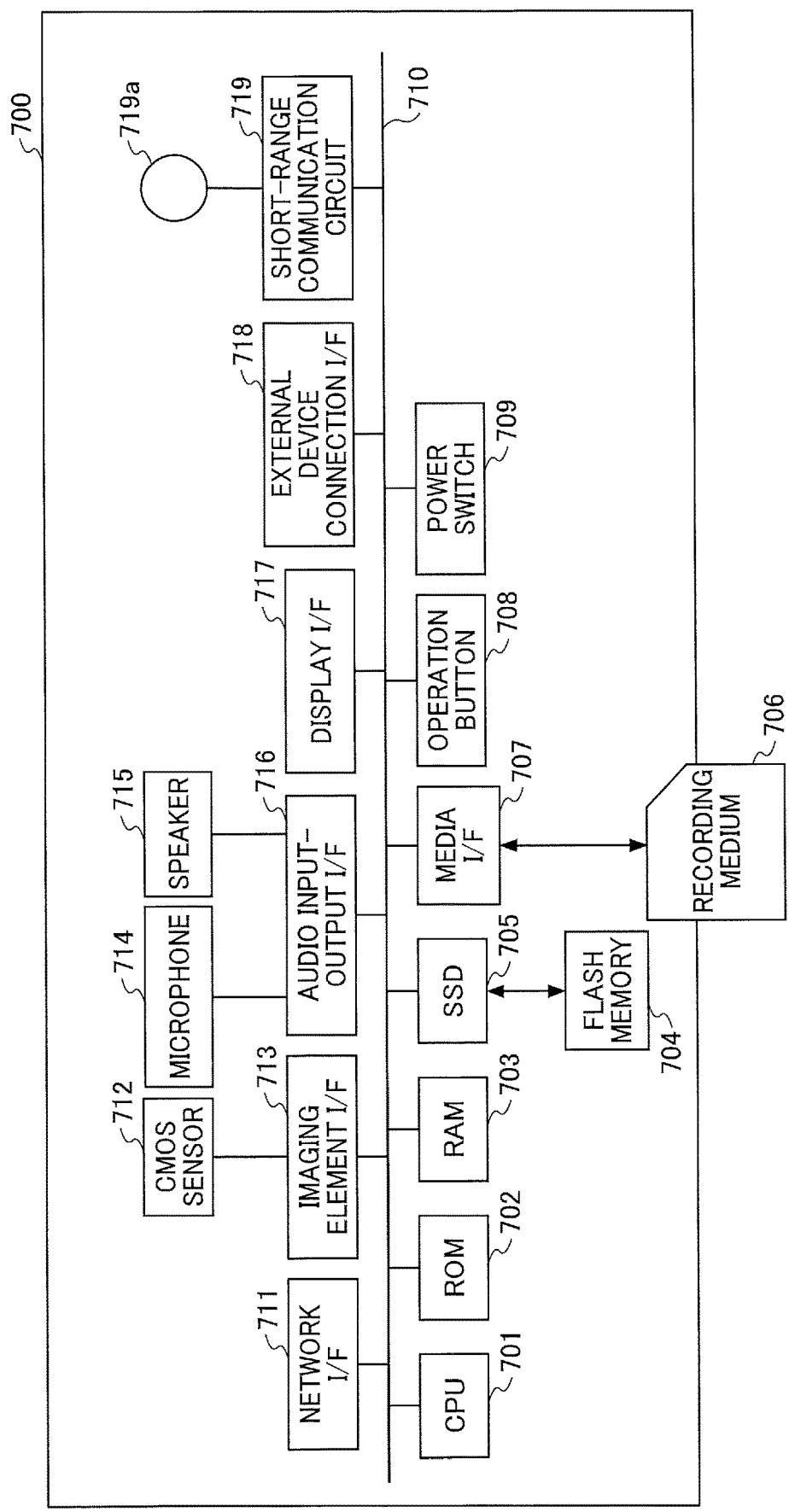
FIG. 47 is an example of a hardware block diagram of a video conference terminal, which is an example of various devices usable in a conference information management system according to an embodiment.

FIG. 47 is an example of a hardware block diagram of a video conference terminal, which is an example of various devices usable in the conference information management system 1 according to one embodiment. As illustrated in FIG. 47, the video conference terminal 700 includes, for example, a CPU 701, a ROM 702, a RAM 703, a flash memory 704, a solid state drive (SSD) 705, a media interface (I/F) 707, an operation button 708, a power switch 709, a bus line 710, a network interface (I/F) 711, a complementary metal oxide semiconductor (CMOS) sensor 712, an imaging element I/F 713, a microphone 714, a speaker 715, an audio input-output interface (I/F) 716, a display interface (I/F) 717, an external device connection interface (I/F) 718, a short-range communication circuit 719, and an antenna 719a of the short-range communication circuit 719.

The CPU 701 controls the operation of the video conference terminal 700 entirely. The ROM 702 stores programs used for driving the CPU 701, such as initial program loader (IPL). The RAM 703 is used as a work area of the CPU 701 of the video conference terminal 700. The flash memory 704 stores various data, such as communication program, image data, and audio data. The SSD 705 controls reading and writing of various data to the flash memory 704 under the control of the CPU 701. Further, a hard disk drive (HDD) may be used instead of the SSD. The media I/F 707 controls reading and writing (storing) of data to a recording medium 706, such as a flash memory. The operation button 708 is a button that is operated when selecting a destination of the video conference terminal 700. The power switch 709 is a switch for switching ON and OFF of the power supply of the video conference terminal 700.

The network I/F 711 is an interface for performing data communication using a communication network 100 such as the Internet.

The CMOS sensor 712 is a type of built-in imaging means for capturing images of objects and acquiring image data under the control of CPU 701. Further, the charge coupled device (CCD) sensor may be used an imaging means for the video conference terminal 700 instead of the CMOS sensor. The imaging element I/F 713 is a circuit for controlling the driving of the CMOS sensor 712.

The microphone 714 is a type of built-in circuit that converts audio signals into electrical signals. The speaker 715 is a type of built-in circuit that converts electrical signals into physical vibration to generate audio, such as music and voice. The audio input-output I/F 716 is a circuit that processes input and output of the audio signals with the microphone 714 and the speaker 715 under the control of the CPU 701.

The display I/F 717 is a circuit that transmits image data to an external display under the control of the CPU 701. The external device connection I/F 718 is an interface for connecting various external devices. The short-range communication circuit 719 is a communication circuit, such as near field communication (NFC) and Bluetooth (registered trademark).

The bus line 710 is an address bus and a data bus for electrically connecting each of the components, such as the CPU 701 illustrated in FIG. 47.

The display 720 is a type of display means, such as liquid crystal and an organic electro luminescence (OEL), which displays images of objects and operation icons. The display 720 is connected to the display I/F 717 using a cable. The cable may be a cable for analog RGB (VGA) signals, a cable for component video, or a cable for high-definition multimedia interface (HDMI: registered trademark) and digital video interactive (DVI) signal.

External devices, such as an external camera, an external microphone, and an external speaker may be connected to the external device connection I/F 718 using a universal serial bus (USB) cable or the like. When the external camera is connected to the external device connection I/F 718, the external camera is driven under the control of CPU 701 in preference to the internal CMOS sensor 712. Similarly, when the external microphone is connected to the external device connection I/F 718, or when the external speaker is connected to the external device connection I/F 718, the external microphone or the external speaker is under the control of CPU 701 in preference to the built-in microphone 714 or the built-in speaker 715.

The recording medium 706 is attachable to and detachable from the video conference terminal 700. Further, the video conference terminal 700 can include any non-volatile memory, in which data is read and written under the control of the CPU 701, such as the flash memory 704 and electrically erasable programmable read-only memory (EEPROM).

(Other Device: Projector)

Figure 48:
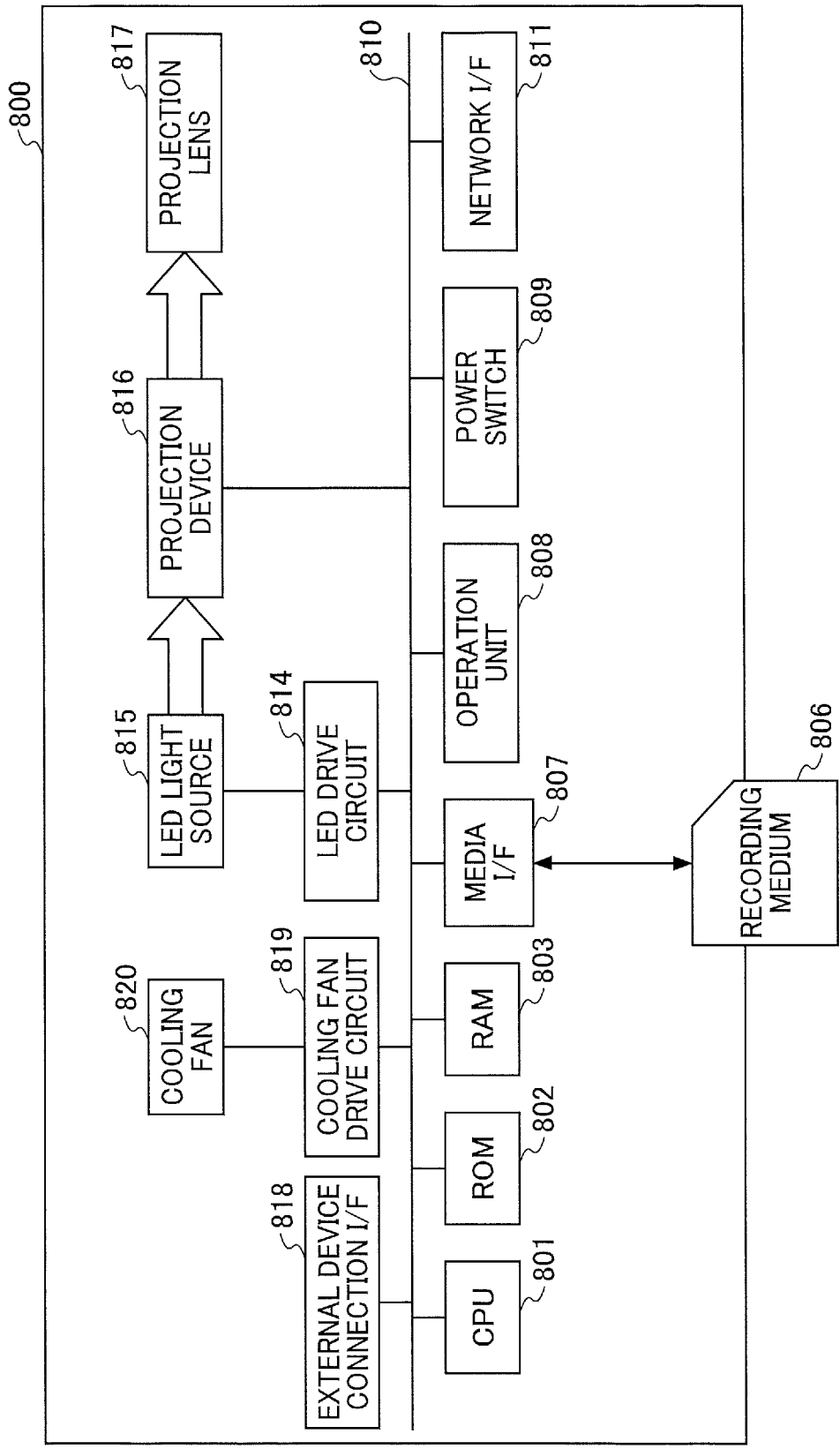
FIG. 48 is an example of a hardware block diagram of a projector, which is an example of various devices usable in a conference information management system according to an embodiment.

FIG. 48 is an example of a hardware block diagram of a projector 800, which is an example of various devices usable in the conference information management system 1. As illustrated in FIG. 48, the projector 800 includes, for example, a central processing unit (CPU) 801, a read only memory (ROM) 802, a random access memory (RAM) 803, a media interface (I/F) 807, an operation unit 808, a power switch 809, a bus line 810, a network interface (I/F) 811, a light emitting diode (LED) drive circuit 814, an LED light source 815, a projection device 816, a projection lens 817, an external device connection interface (I/F) 818, a cooling fan drive circuit 819, and a cooling fan 820.

The CPU 801 controls the operation of the projector 800 entirely. The ROM 802 stores programs used for driving the CPU 801. The RAM 803 is used as a work area of the CPU 801 of the projector 800.

The media I/F 807 controls reading and writing (storing) of data to a recording medium 806, such as a flash memory.

The operation unit 808 is provided with various keys, buttons and LEDs. A user uses the operation unit 808 perform various operations other than the power ON and OFF of the projector 800. For example, the operation unit 808 receives an instruction operation, such as an adjustment operation of the size of projection image, a color tone adjustment operation, a focus adjustment operation, and a keystone adjustment operation, and outputs the received operation contents to the CPU 801.

The power switch 809 is a switch for switching ON and OFF of the power supply of the projector 800.

The bus line 810 is an address bus and a data bus for electrically connecting each of the components, such as the CPU 801 illustrated in FIG. 48.

The network I/F 811 is an interface for performing data communication using a communication network such as the Internet.

The LED drive circuit 814 controls the lighting and turning off of the LED light source 815 under the control of the CPU 801.

When the LED light source 815 is lighted under the control of the LED drive circuit 814, the LED light source 815 irradiates the projection light to the projection device 816.

The projection device 816 projects the modulated light, acquired by modulating the projection light coming from the LED light source 815 by the spatial light modulation system, based on the image data provided by the external device connection I/F 818 as an image onto a projection surface, such as a screen through the projection lens 817. The projection device 816 uses, for example, a liquid crystal panel or digital micromirror device (DMD). The LED drive circuit 814, the LED light source 815, the projection device 816 and the projection lens 817 can collectively function as a projection unit (projection means) for projecting projection images onto the projection surface based on the image data.

The external device connection I/F 818 directly connects to a personal computer (PC) and acquires control signals and image data between from the PC.

The cooling fan drive circuit 819 is connected to the CPU 801, and drives and stops the cooling fan 820 based on the control signal from the CPU 801.

The cooling fan 820 rotates to exhaust air inside the projector 800 to cool the interior of the projector 800.

When the power supply power is supplied, the CPU 801 starts in accordance with the control program stored in the ROM 802 in advance, and supplies a control signal to the LED drive circuit 814 to turn on the LED light source 815. At the same time, the CPU 801 applies a control signal to the cooling fan drive circuit 819 to rotate the cooling fan 820 at a pre-set rated rotational speed. Further, when the supply of power from the power supply circuit 21 is started, the projector 800 sets the projection device 816 in an image display state, and supplies power from the power supply circuit to the other various components.

In the projector 800, when the power switch 809 is turned OFF, the power switch 809 transmits a power OFF signal to the CPU 801. When the CPU 801 detects the power OFF signal, the CPU 801 applies a control signal to the LED drive circuit 814 to turn off the LED light source 815. Then, after a pre-set period of time has elapsed, the CPU 801 applies a control signal to the cooling fan drive circuit 819 to stop the cooling fan 820. At the same time, the CPU 801 terminates the control processing of the CPU 801, and finally supplies an instruction to the power supply circuit to stop the power supply.

As to the above described conference information management system 1, the electronic information board apparatus 14 can acquire the authentication information of participant of conference, acquire the schedule information of conference from the schedule service 42 based on the acquired authentication information, set the acquired schedule information as the conference information of conference to be held using the electronic information board function of the electronic information board apparatus 14, updates the schedule information or creates the new schedule information in according with the conference state or situation, and store the schedule information existing at the end of the conference in the schedule service 42.

Thus, the conference information management system 1 can confirm the schedule the schedule information of actually-held conference (e.g., conference name, location, start time, end time, participant, organizer, and attachment file) from the schedule information remaining in the schedule service 42 after the conference is completed.

The conference information management system 1 can manage the participant of conference, and display the participant list of conference and the identification information identifying the organizer from the participant list. Thus, the conference information management system 1 can store the organizer information of conference in the schedule service 42, and can estimate who is the key person in each field by analyzing the schedule information stored in the schedule service 42 with agenda information of conference.

The conference information management system 1 can automatically set the participant who first acquired the authentication information as the organizer. Since a user who leads a conference typically logs in the conference information management system 1 firstly, by automatically setting the participant who first acquired the authentication information as the organizer, the operation workload can be reduced.

Further, the conference information management system 1 allows a user to select which participant becomes the organizer when the participant set as the organizer in the schedule information acquired from the schedule service 42 differs from the participant who first acquired the authentication information. Thus, the conference information management system 1 can change the organizer if the user automatically set as the organizer at first is not the true organizer.

The conference information management system 1 also has a user interface for changing the organizer. Therefore, the conference information management system 1 can easily change the organizer by using the user interface.

Further, as to the conference information management system 1, a plurality of schedule information associated with the authentication information can be acquired from the schedule service 42, and one schedule information selected by a user from the plurality of schedule information can be set as the conference information of conference to be held using the electronic information board function of the electronic information board apparatus 14. By reading the schedule of conference created in advance using the electronic information board apparatus 14 for the conference information management system 1, the manual workload of setting the conference information can be reduced.

Further, the conference information management system 1 can overwrite the schedule information stored in the schedule service 42 with the schedule information existing at the end of conference. Thus, the conference information management system 1 can update the schedule information stored in the schedule service 42 to the information of actually-held conference.

According to the above described embodiment, the discrepancy between the schedule information and the information of actually-held conference can be prevented.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein.

Any one of the above-described operations may be performed in various other ways, for example, in an order different from the one described above.

Further, the above described conference information management system 1 is just one example, and there are various examples of the system configuration depending on the applications and the purposes. Further, the above described processing and screen transitions can be combined and performed in any pattern.

Each function of the embodiments described above may be implemented by one or more processing circuits. Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

The tables described in this specification may be generated by the learning effect of the machine learning. The machine learning is a technology to acquire a learning ability similar to human learning ability on a computer, in which the computer autonomously generate algorithms necessary for processing data, such as determining data identification, from learning data acquired in advance, and perform predictions by applying the algorithms to the new data. The learning method for machine learning may be a supervised learning, unsupervised learning, semi-supervised learning, reinforcement learning, deep learning method, or a learning method combining these learning methods, and any learning method can be used for the machine learning.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. A conference information management system including an information processing apparatus, the conference information management system comprising:
    circuitry configured to
        acquire schedule information of a conference stored in a server, from the server;
        create conference information of the conference held or to be held using an electronic information board function of the information processing apparatus, based on the acquired schedule information;
        detect information provided during the conference through the information processing apparatus;
        update the created conference information based on the detecting of the information, such that the conference information corresponds to a conference situation; and
        store the updated conference information in a storage destination,
    wherein the schedule, information of the conference includes a plurality of participants of the conference and a candidate organizer, and
    wherein the circuitry is configured to
        determine whether the candidate organizer included in the schedule information of the conference differs from a first participant to join the conference from the plurality of participants included in the schedule information, and
        receive a user input to select an organizer among the plurality of participants included in the schedule information, in response to determining that the candidate organizer differs from the first participant.

2. The conference information management system according to claim 1, further comprising:
    a participant information acquisition device configured to acquire participant information about the plurality of participants of the conference to be held using the electronic information board function of the information processing apparatus,
    wherein the circuitry is further configured to use the acquired schedule information and the participant information to create the conference information.

3. The conference information management system according to claim 2, wherein the participant information acquisition device is configured to authenticate at least one of the plurality of participants.

4. The conference information management system according to claim 1, wherein the circuitry is configured to change the schedule information stored in the server based on the updated conference information.

5. The conference information management system according to claim 1, wherein the circuitry is further configured to manage participant information of the plurality of participants of the conference, and
    wherein the conference information management system further comprises a display configured to display a participant list of the conference and identification information identifying, the candidate organizer from the participant list based on the participant information managed by the circuitry.

6. The conference information management system according to claim 5, wherein the circuitry is further configured to set the first participant as the candidate organizer, among the plurality of participants of the conference included in the participant list.

7. The conference information management system according to claim 1, wherein the circuitry is configured to display a screen on the display to receive the user input.

8. The conference information management system according to claim 5, wherein the circuitry is configured to display a screen used for changing the candidate organizer on the display.

9. The conference information management system according to claim 2, wherein the circuitry is configured to acquire a plurality of schedule information of participant associated with the participant information from the server, and set one schedule information selected from the plurality of schedule information as the conference information of the conference to be held using the electronic information board function of the information processing apparatus.

10. The conference information management system according to claim 1, wherein the circuitry is configured to overwrite the schedule information stored in the server with the conference information that is updated at the end of the conference.

11. The conference information management system according to claim 10, wherein the circuitry is configured to transmit the conference information that is updated at the end of the conference to the server to update the schedule information stored in the server.

12. The conference information management system according to claim 1, wherein the circuit is configured to store the conference information that is updated at the end of the conference to another server, different from the server that stores the schedule information.

13. The conference information management system according, to claim 3, wherein the participant information acquisition device is an integrated circuit (IC) card reader provided for the information processing apparatus.

14. The conference information management system according to claim 3, wherein the participant information acquisition device is a touch display provided for the information processing apparatus.

15. The conference information management system according to claim 3, wherein the participant information acquisition device is a camera provided for the information processing apparatus.

16. An information processing apparatus comprising:
  circuitry configured to
    acquire schedule information of a conference stored in a server, from the server;
    create conference information of the conference held or to be held using an electronic information board function of the information processing apparatus, based on the acquired schedule information;
    detect information provided during the conference through the information processing apparatus:
    update the created conference information based on the detecting of the information, such that the conference information corresponds to a conference situation; and
    store the updated conference information in a storage destination,
  wherein the schedule information of the conference includes a plurality of participants of the conference and a candidate organizer, and
  wherein the circuitry is configured to
    determine whether the candidate organizer included in the schedule information of the conference differs from a first participant to join the conference from the plurality of participants included in the schedule information, and
    receive a user input to select an organizer among the plurality of participants included in the schedule information, in response to determining that the candidate organizer differs from the first participant.

17. A method of controlling a conference information using an information processing apparatus, comprising:
  acquiring schedule information of a conference stored in a server, from the server the schedule information of the conference including a plurality of participants of the conference and a candidate organizer;
  creating conference information of the conference held or to be held using an electronic information board function of the information processing apparatus, based on the acquired schedule information;
  detecting information provided during the conference through the information processing apparatus;
  updating the created conference information based on the detecting of the information, such that the conference information corresponds to a conference situation;
  storing the updated conference information in a storage destination;
  determining whether the candidate organizer included in the schedule information of the conference differs from a first participant to join the conference from the plurality of participants included in the schedule information; and
  receiving a user input to select an organizer among the plurality of participants included in the schedule information, in response to determining that the candidate organizer differs from the first participant.

* * * * *